US012671510B2

(12) United States Patent
Iguchi et al.

(10) Patent No.: US 12,671,510 B2
(45) Date of Patent: Jun. 30, 2026

(54) TRANSMISSION METHOD, RECEPTION METHOD, TRANSMISSION APPARATUS, AND RECEPTION APPARATUS

(71) Applicant: Panasonic Intellectual Property Management Co., Ltd., Osaka (JP)

(72) Inventors: Noritaka Iguchi, Osaka (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 18/909,312

(22) Filed: Oct. 8, 2024

(65) Prior Publication Data

US 2025/0030754 A1 Jan. 23, 2025

Related U.S. Application Data

(63) Continuation of application No. 18/221,983, filed on Jul. 14, 2023, now Pat. No. 12,143,430, which is a
(Continued)

(30) Foreign Application Priority Data

Jul. 31, 2015 (JP) ................................. 2015-152753

(51) Int. Cl.
*H04H 60/07* (2008.01)
*H04L 65/611* (2022.01)
(Continued)

(52) U.S. Cl.
CPC ........... *H04H 60/07* (2013.01); *H04L 65/611* (2022.05); *H04L 65/70* (2022.05); *H04L 65/756* (2022.05);
(Continued)

(58) Field of Classification Search
CPC ........ H04H 60/07; H04H 20/18; H04H 20/24; H04L 65/611; H04L 65/70; H04L 65/756;
(Continued)

(56) References Cited

U.S. PATENT DOCUMENTS

2004/0215851 A1 10/2004 LeBlanc
2006/0262793 A1 11/2006 Vare
(Continued)

FOREIGN PATENT DOCUMENTS

EP 2 658 247 10/2013

OTHER PUBLICATIONS

International Search Report of PCT application No. PCT/JP2015/004071 dated Nov. 10, 2015.
(Continued)

*Primary Examiner* — Brian Whipple
(74) *Attorney, Agent, or Firm* — Wenderoth, Lind & Ponack, L.L.P.

(57) ABSTRACT

A transmission method includes: generating a stream including a plurality of Internet Protocol (IP) data flows corresponding one-to-one with a plurality of services in broadcast, the IP data flows storing the corresponding services of the plurality of services; and transmitting the generated stream in a predetermined channel.

1 Claim, 45 Drawing Sheets

| CONTROL INFORMATION | VIDEO | AUDIO |
| | MPU, MFU | |

| MMT PACKET |
| IP PACKET |
| TLV PACKET |
| TRANSFER SLOT |

Related U.S. Application Data continuation of application No. 15/437,483, filed on Feb. 21, 2017, now Pat. No. 11,743,312, which is a continuation of application No. PCT/JP2015/004071, filed on Aug. 17, 2015.

(60) Provisional application No. 62/043,121, filed on Aug. 28, 2014.

(51) Int. Cl.

| | |
|---|---|
| *H04L 65/70* | (2022.01) |
| *H04L 65/756* | (2022.01) |
| *H04L 101/668* | (2022.01) |
| *H04N 21/2381* | (2011.01) |
| *H04N 21/643* | (2011.01) |
| *H04N 21/854* | (2011.01) |

(52) U.S. Cl.
CPC ... *H04N 21/2381* (2013.01); *H04N 21/64322* (2013.01); *H04N 21/85406* (2013.01); *H04L 2101/668* (2022.05)

(58) Field of Classification Search
CPC .......... H04L 2101/668; H04N 21/2381; H04N 21/64322; H04N 21/85406; H04N 21/6125; H04N 21/236; H04N 21/434
See application file for complete search history.

(56) References Cited

U.S. PATENT DOCUMENTS

| | | | |
|---|---|---|---|
| 2008/0130557 | A1 | 6/2008 | Kuchibhotla |
| 2008/0134269 | A1 | 6/2008 | Sim |
| 2009/0077585 | A1 | 3/2009 | Singhai et al. |
| 2009/0296624 | A1 | 12/2009 | Ryu et al. |
| 2011/0249193 | A1 | 10/2011 | Inoo |
| 2012/0163219 | A1 | 6/2012 | Lee |
| 2013/0097627 | A1* | 4/2013 | Hwang ................. H04H 60/73 725/54 |
| 2013/0232231 | A1 | 9/2013 | Laurent et al. |
| 2014/0269276 | A1 | 9/2014 | Rothstein |
| 2017/0257663 | A1 | 9/2017 | Aono |

OTHER PUBLICATIONS

Association of Radio Industries and Businesses Digital Broadcasting Systems Development Subcommittee, "Interim report on ultra-high-definition television broadcasting systems (multiplexing method), UHD4-2-5", pp. 1-34, pp. 53-54, Dec. 2013 with English translation.

Shuichi Aoki et al., "A Study on Implementation of MMT in Next Generation Broadcasting Systems", Forum on Information Technology 12(3), Aug. 2013, pp. 355-356 with English translation.

"Information technology-High efficiency coding and media delivery in heterogeneous environments—Part1: MPEG media transport (MMT)", ISO/IEC_DIS 23008-1, Apr. 26, 2013.

Transmission System for Advanced Wide Band Digital Satellite Broadcasting Arib Standard Arib STD-B44 Version 2.0, Jul. 31, 2014.

Extended European Search Report issued Aug. 10, 2017 in corresponding European patent Application No. 15836696.3.

Office Action and Search Report issued May 5, 2019 in Chinese Patent Application No. 201580041969.6, with English translation of Search Report.

Aoki et, al. "Effective Usage of MMT in Broadcasting System", 2013 IEEE international symposium on broadband multimedia system and broadcasting (BMSB), IEEE Xplore, Oct. 8, 2013.

ITU-R BT. 1896 "Multiplexing scheme for variable-length packets in digital multimedia broadcasting system", Mar. 30, 2010.

Shuichi Aoki, "Development of Media Transport Protocol for 8K Super Hi-Vision Satellite Broadcasting System Using MMT", Summer 2015.

* cited by examiner

FIG. 1

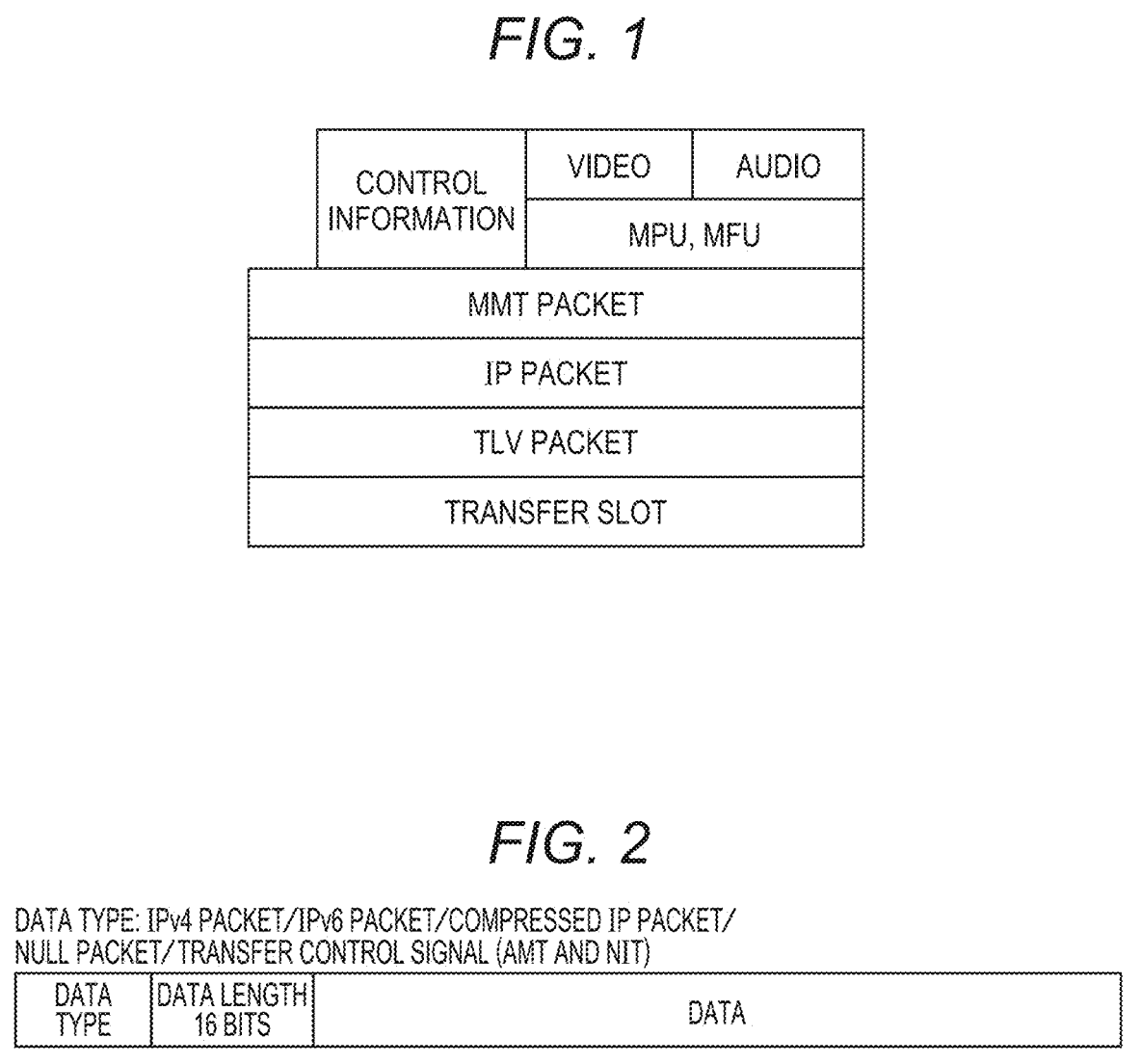

| CONTROL INFORMATION | VIDEO | AUDIO |
|---|---|---|
| | MPU, MFU | |
| MMT PACKET | | |
| IP PACKET | | |
| TLV PACKET | | |
| TRANSFER SLOT | | |

FIG. 2

DATA TYPE: IPv4 PACKET/IPv6 PACKET/COMPRESSED IP PACKET/
NULL PACKET/TRANSFER CONTROL SIGNAL (AMT AND NIT)

| DATA TYPE | DATA LENGTH 16 BITS | DATA |
|---|---|---|

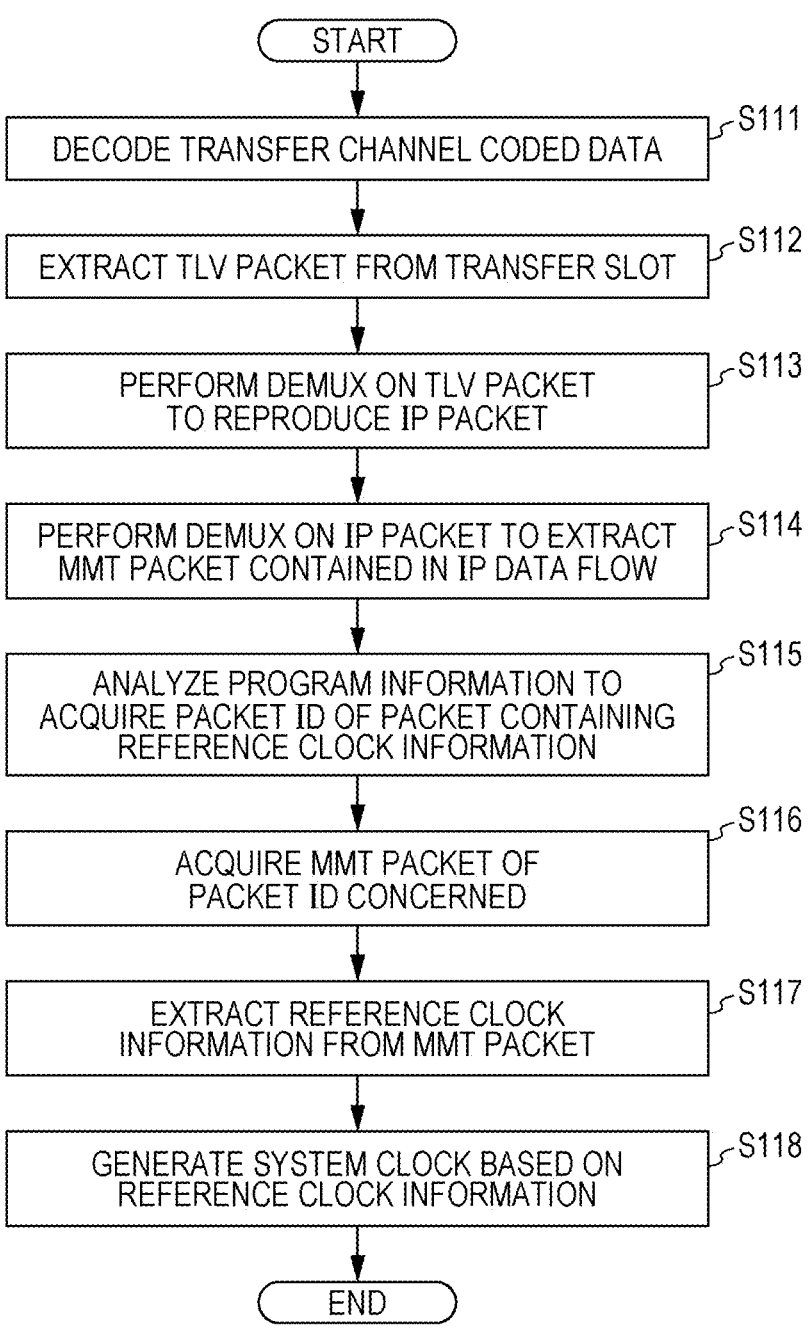

START

↓

DECODE TRANSFER CHANNEL CODED DATA ⌐S111

↓

EXTRACT TLV PACKET FROM TRANSFER SLOT ⌐S112

↓

PERFORM DEMUX ON TLV PACKET
TO REPRODUCE IP PACKET ⌐S113

↓

PERFORM DEMUX ON IP PACKET TO EXTRACT
MMT PACKET CONTAINED IN IP DATA FLOW ⌐S114

↓

ANALYZE PROGRAM INFORMATION TO
ACQUIRE PACKET ID OF PACKET CONTAINING
REFERENCE CLOCK INFORMATION ⌐S115

↓

ACQUIRE MMT PACKET OF
PACKET ID CONCERNED ⌐S116

↓

EXTRACT REFERENCE CLOCK
INFORMATION FROM MMT PACKET ⌐S117

↓

GENERATE SYSTEM CLOCK BASED ON
REFERENCE CLOCK INFORMATION ⌐S118

↓

END

FIG. 9

DATA TYPE = LONG-FORMAT NTP, DATA LENGTH = 64 BITS

| DATA TYPE | DATA LENGTH | REFERENCE CLOCK INFORMATION |
|-----------|-------------|-----------------------------|

FIG. 11

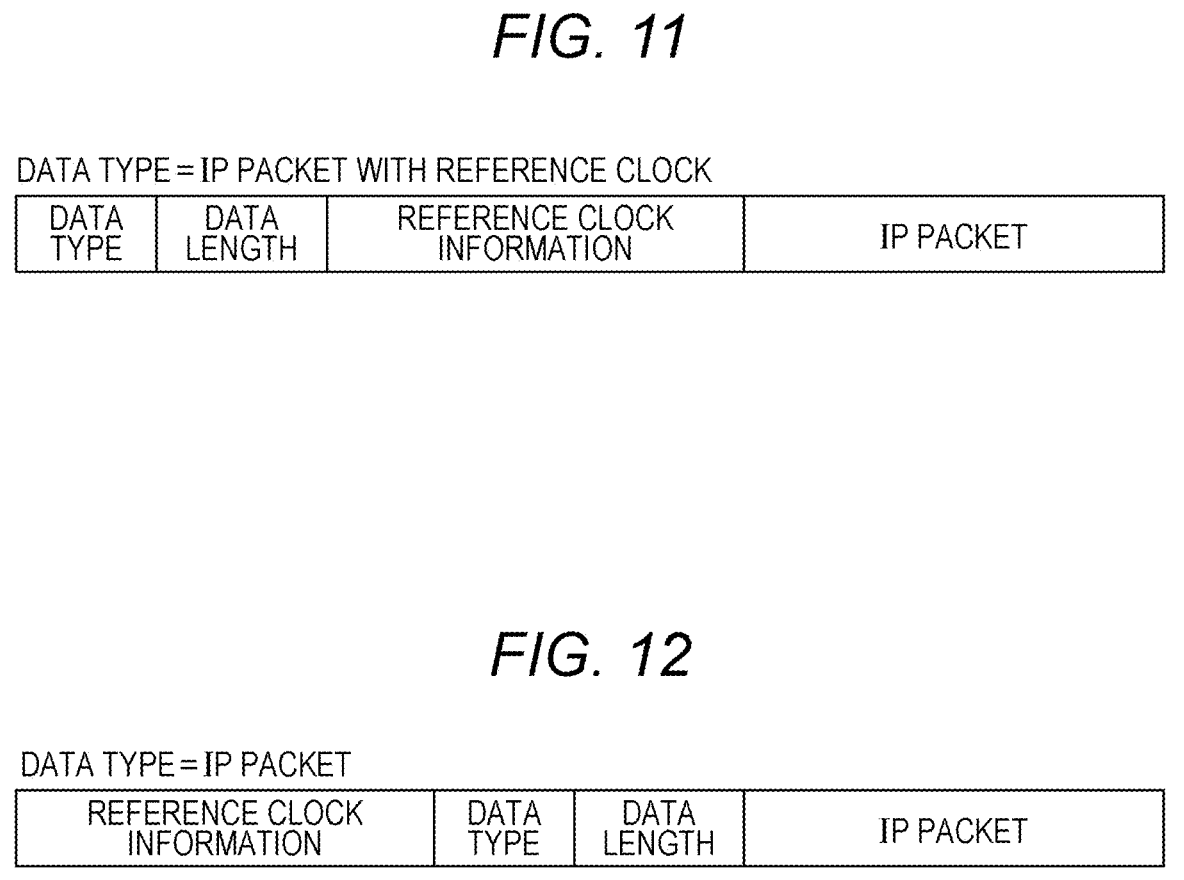

DATA TYPE = IP PACKET WITH REFERENCE CLOCK

| DATA TYPE | DATA LENGTH | REFERENCE CLOCK INFORMATION | IP PACKET |
|---|---|---|---|
| | | | |

FIG. 12

DATA TYPE = IP PACKET

| REFERENCE CLOCK INFORMATION | DATA TYPE | DATA LENGTH | IP PACKET |
|---|---|---|---|
| | | | |

FIG. 13

| | SLOT HEADER | TLV #1 | TLV #2 |
|---|---|---|---|
| SLOT #1 | SLOT HEADER | TLV #2 | TLV #3 |
| SLOT #2 | | | |
| SLOT #119 | SLOT HEADER | TLV #n | TLV #(n+1) |
| SLOT #120 | SLOT HEADER | TLV #(n+1) | TLV #(n+2) |

*FIG. 14*

| HEAD TLV INSTRUCTION | UNDEFINED |
|---|---|

*FIG. 15*

| HEAD TLV INSTRUCTION | F | UNDEFINED |
|---|---|---|

*FIG. 16*

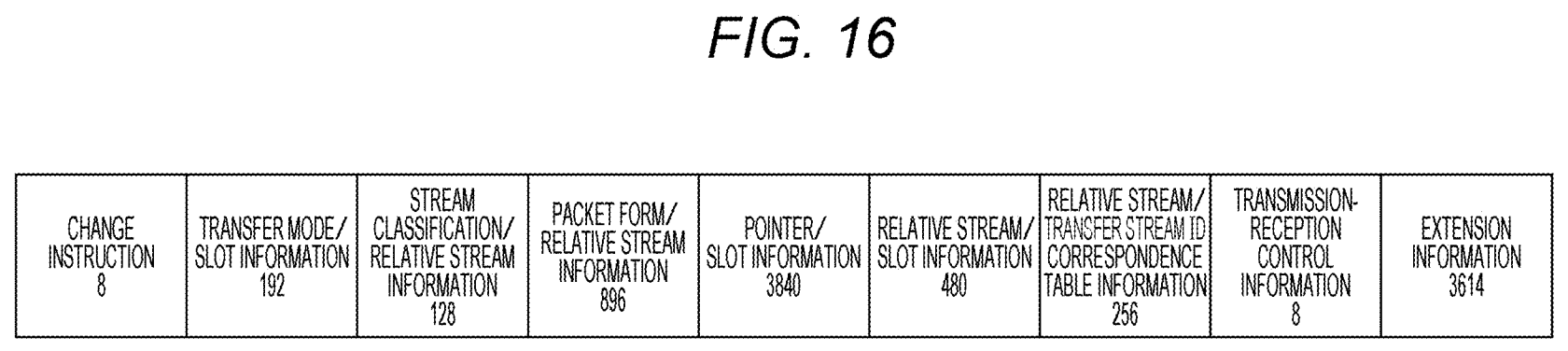

| CHANGE INSTRUCTION 8 | TRANSFER MODE/ SLOT INFORMATION 192 | STREAM CLASSIFICATION/ RELATIVE STREAM INFORMATION 128 | PACKET FORM/ RELATIVE STREAM INFORMATION 896 | POINTER/ SLOT INFORMATION 3840 | RELATIVE STREAM/ SLOT INFORMATION 480 | RELATIVE STREAM/ TRANSFER STREAM ID CORRESPONDENCE TABLE INFORMATION 256 | TRANSMISSION-RECEPTION CONTROL INFORMATION 8 | EXTENSION INFORMATION 3614 |
|---|---|---|---|---|---|---|---|---|

FIG. 17

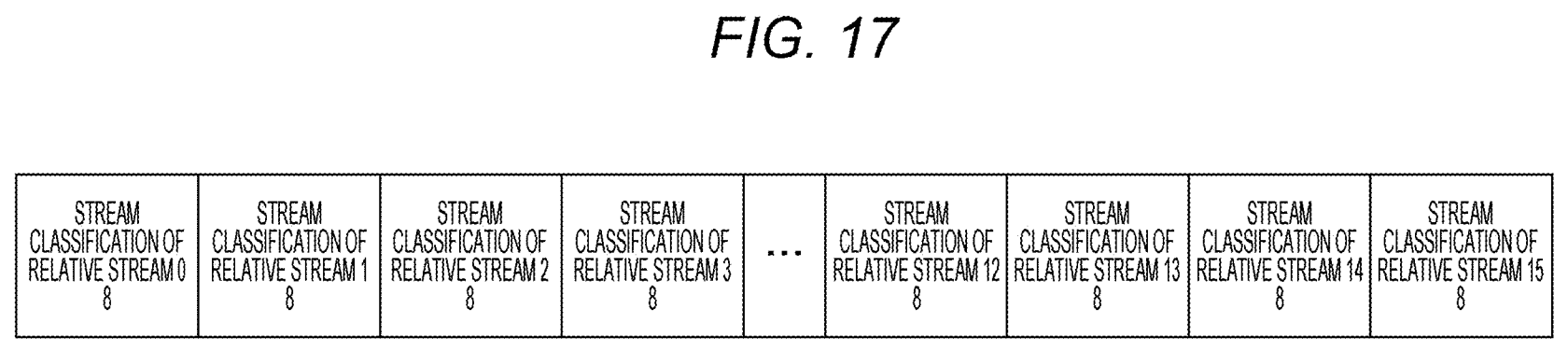

| STREAM CLASSIFICATION OF RELATIVE STREAM 0 8 | STREAM CLASSIFICATION OF RELATIVE STREAM 1 8 | STREAM CLASSIFICATION OF RELATIVE STREAM 2 8 | STREAM CLASSIFICATION OF RELATIVE STREAM 3 8 | ... | STREAM CLASSIFICATION OF RELATIVE STREAM 12 8 | STREAM CLASSIFICATION OF RELATIVE STREAM 13 8 | STREAM CLASSIFICATION OF RELATIVE STREAM 14 8 | STREAM CLASSIFICATION OF RELATIVE STREAM 15 8 |
|---|---|---|---|---|---|---|---|---|

*FIG. 18*

| HEAD TLV INSTRUCTION | REFERENCE CLOCK INFORMATION | UNDEFINED |
|---|---|---|

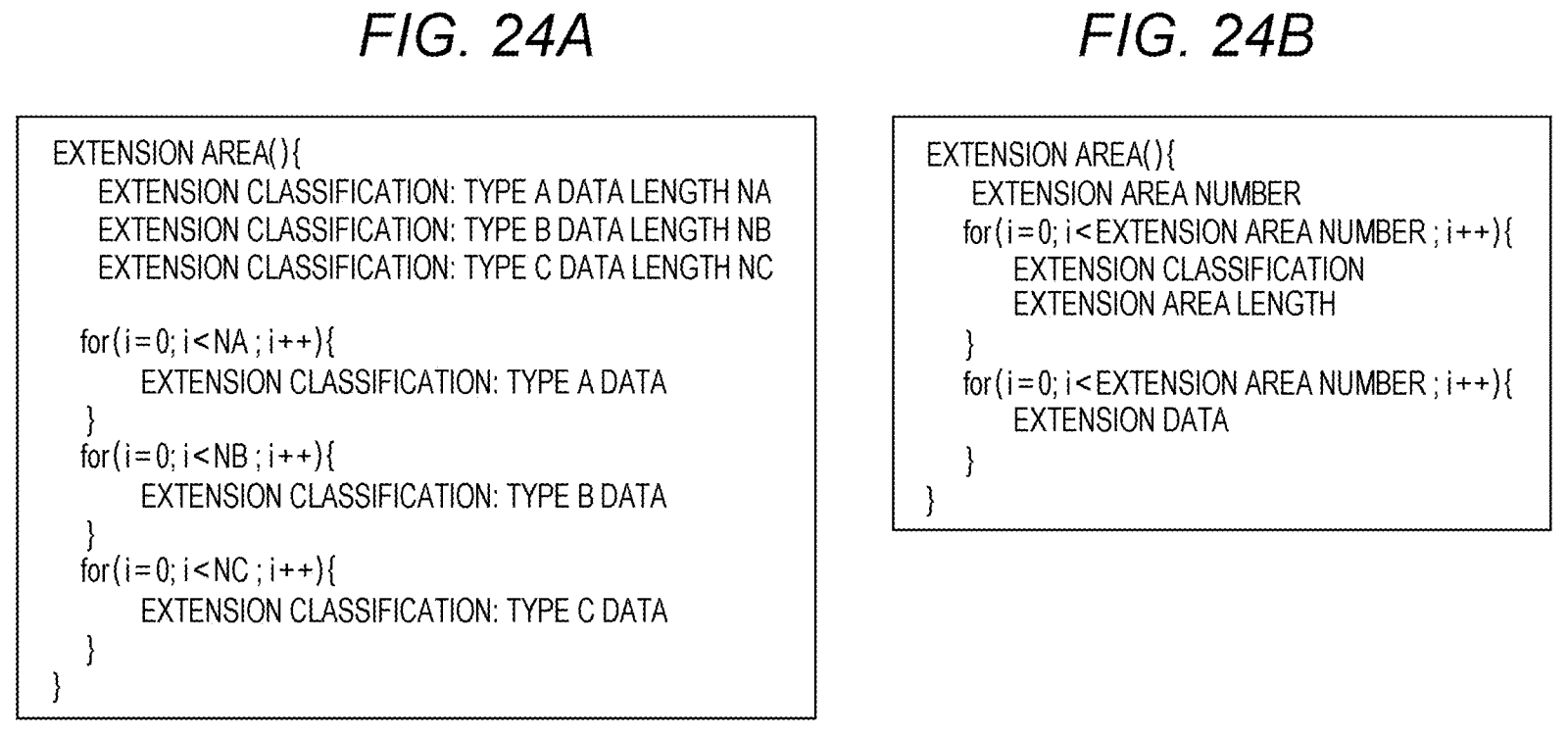

```
EXTENSION AREA(){
    EXTENSION CLASSIFICATION: TYPE A DATA LENGTH NA
    EXTENSION CLASSIFICATION: TYPE B DATA LENGTH NB
    EXTENSION CLASSIFICATION: TYPE C DATA LENGTH NC for(i=0;i<NA;i++){
        EXTENSION CLASSIFICATION: TYPE A DATA
    }
    for(i=0;i<NB;i++){
        EXTENSION CLASSIFICATION: TYPE B DATA
    }
    for(i=0;i<NC;i++){
        EXTENSION CLASSIFICATION: TYPE C DATA
    }
}
```

FIG. 24B

```
EXTENSION AREA(){
    EXTENSION AREA NUMBER
    for(i=0;i<EXTENSION AREA NUMBER;i++){
        EXTENSION CLASSIFICATION
        EXTENSION AREA LENGTH
    }
    for(i=0;i<EXTENSION AREA NUMBER;i++){
        EXTENSION DATA
    }
}
```

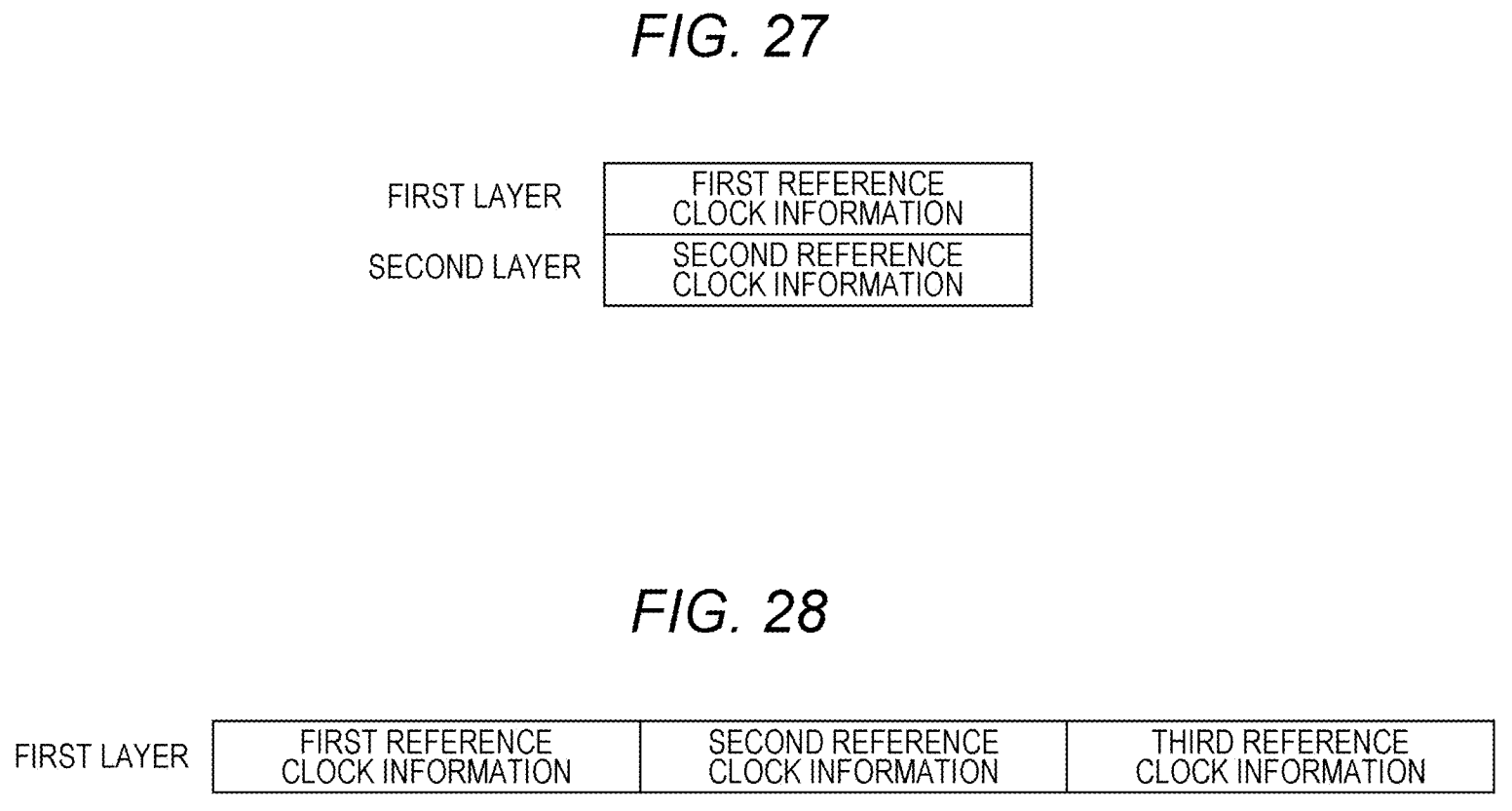

| | |
|---|---|
| FIRST LAYER | FIRST REFERENCE CLOCK INFORMATION |
| SECOND LAYER | SECOND REFERENCE CLOCK INFORMATION |

*FIG. 28*

| | | |
|---|---|---|
| FIRST LAYER | FIRST REFERENCE CLOCK INFORMATION | SECOND REFERENCE CLOCK INFORMATION | THIRD REFERENCE CLOCK INFORMATION |

*FIG. 31*

| | | |
|---|---|---|
| FRAME #n | BASE REFERENCE CLOCK INFORMATION | FIRST DIFFERENCE INFORMATION |
| FRAME #n+1 | BASE REFERENCE CLOCK INFORMATION | SECOND DIFFERENCE INFORMATION |
| FRAME #n+2 | BASE REFERENCE CLOCK INFORMATION | THIRD DIFFERENCE INFORMATION |

*FIG. 37*

TRANSMISSION METHOD, RECEPTION METHOD, TRANSMISSION APPARATUS, AND RECEPTION APPARATUS

CROSS REFERENCE TO RELATED APPLICATIONS

This application is a continuation of U.S. application Ser. No. 18/221,983 filed on Jul. 14, 2023, which is a continuation of U.S. application Ser. No. 15/437,483, now U.S. Pat. No. 11,743,312, filed on Feb. 21, 2017, which is a continuation of PCT International Patent Application Number PCT/JP2015/004071 filed on Aug. 17, 2015, claiming the benefit of priority of U.S. Provisional Application No. 62/043,121 filed on Aug. 28, 2014 and Japanese Patent Application No. 2015-152753, filed Jul. 31, 2015. The entire disclosures of the above-identified applications, including the specifications, drawings, and claims are incorporated herein by reference in their entirety.

BACKGROUND

1. Technical Field

The present disclosure relates to a transmission method, reception method, transmission apparatus, and reception apparatus.

2. Description of the Related Art

An MMT (MPEG Media Transport) scheme (refer to NPL 1) is a multiplexing scheme for multiplexing and packetizing content such as video and audio and for transmitting the content through one or more transfer channels such as broadcast and communication. When the MMT scheme is applied to broadcasting systems, reference clock information of a transmission apparatus is transmitted to a reception apparatus, and the reception apparatus generates a system clock in the reception apparatus based on the reference clock information.

CITATION LIST

Non-Patent Literature

NPL 1: Information technology-High efficiency coding and media delivery in heterogeneous environments-Part 1: MPEG media transport (MMT), ISO/IEC DIS 23008-1

NPL 2: ARIB Standard ARIB STD-B44 (Ver. 2.0), "TRANSMISSION SYSTEM FOR ADVANCED WIDE BAND DIGITAL SATELLITE BROADCASTING", Chapter 3: "Guideline for Time Information Transmission"

SUMMARY

In one general aspect, the techniques disclosed here feature a transmission method including: generating a stream including a plurality of Internet Protocol (IP) data flows corresponding one-to-one with a plurality of services in broadcast, the IP data flows respectively storing the corresponding services of the plurality of services; and transmitting the generated stream in a determined channel.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 1 is a diagram illustrating a protocol stack for performing transfer using an MMT scheme and an advanced BS transfer scheme;

FIG. 2 is a diagram illustrating data structure of a TLV packet;

FIG. 4 is a block diagram illustrating a functional configuration of the reception apparatus when reference clock information is stored in an extension field of an MMT packet header;

FIG. 7 is a flowchart illustrating the operation of the reception apparatus to acquire the reference clock information when the reference clock information is stored in the control information;

FIG. 9 is a diagram illustrating an example in which a long-format NTP is stored in the TLV packet;

FIG. 11 is a diagram illustrating structure in which the reference clock information is appended immediately before an IP packet header;

FIG. 12 is a diagram illustrating structure in which the reference clock information is appended immediately before the TLV packet;

FIG. 13 is a diagram illustrating structure of a transfer slot;

FIG. 14 is a diagram illustrating structure of a slot header of the transfer slot;

FIG. 15 is a diagram illustrating an example in which a flag is stored in an undefined area of the slot header;

FIG. 16 is a diagram illustrating structure of TMCC control information under a transfer scheme for advanced broadband satellite digital broadcast;

FIG. 17 is a diagram illustrating stream classification/relative stream information of the TMCC control information;

FIG. 18 is a diagram illustrating an example in which the reference clock information is stored in an undefined field of the slot header;

FIG. 19 is a block diagram illustrating the functional configuration of the reception apparatus when information indicating that the reference clock information is contained within the slot header is stored in TMCC control information;

FIG. 24A is a diagram illustrating an example of syntax when the extension classification is used;

FIG. 24B is a diagram illustrating another example of syntax when the extension classification is used;

FIG. 25 is a block diagram illustrating a functional configuration of a reception apparatus according to a second exemplary embodiment;

FIG. 27 is a diagram schematically illustrating an example in which the reference clock information is stored in each of a plurality of layers;

FIG. 28 is a diagram illustrating an example in which a plurality of pieces of reference clock information is stored in one layer;

FIG. 31 is a diagram illustrating a variation of the transmission method of difference information;

FIG. 37 is a block diagram of a reception apparatus according to a fourth exemplary embodiment;

DETAILED DESCRIPTION

Figure 3:
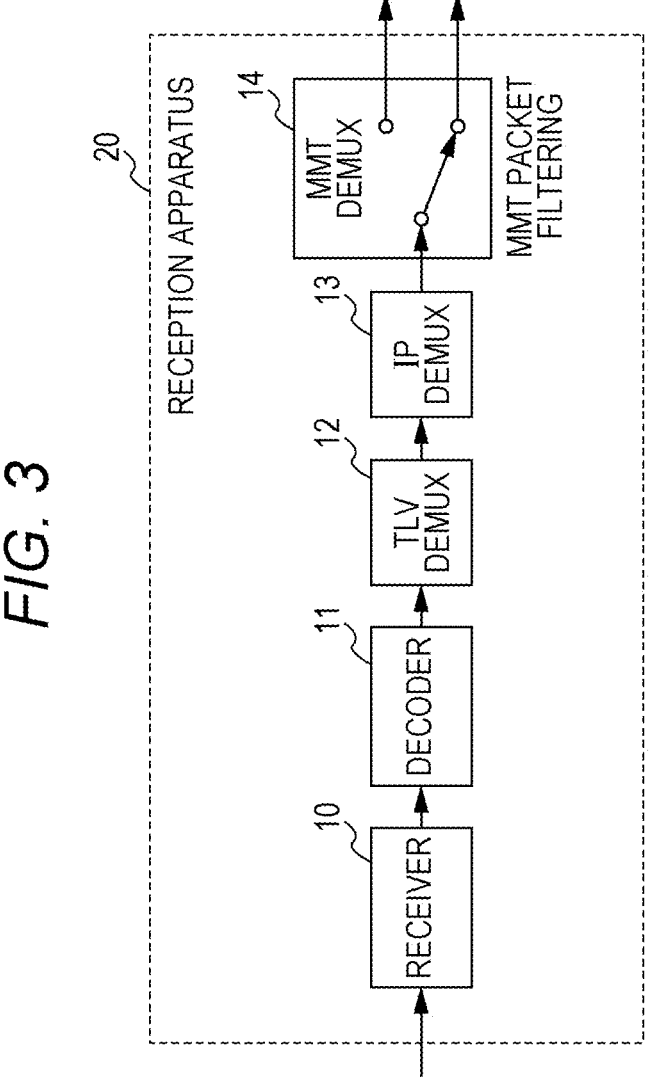
FIG. 3 is a block diagram illustrating a basic configuration of a reception apparatus.

The present disclosure relates to a method and apparatus in which a reception apparatus receives reference clock information transmitted from a transmission apparatus and generates (reproduces) a reference clock in a hybrid delivery system using an MMT (MPEG Media Transport) scheme which is under standardization by MPEG (Moving Picture Expert Group).

The MMT scheme is a multiplexing scheme for multiplexing and packetizing video and audio to transmit the video and audio via one or more transfer channels, such as broadcast and communication.

When the MMT scheme is applied to a broadcasting system, the reference clock of the transmission apparatus is synchronized with an NTP (Network Time Protocol) prescribed by IETF RFC 5905, and based on the reference clock, a time stamp such as PTS (Presentation Time Stamp) and DTS (Decode Time Stamp) is added to a medium. Furthermore, the transmission apparatus transmits the reference clock information to the reception apparatus, and the reception apparatus generates the reference clock (hereinafter referred to as a system clock) in the reception apparatus based on the reference clock information.

In the broadcasting system, a 64-bit long-format NTP capable of indicating absolute time is preferably used as the reference clock information. However, although the conventional MMT scheme prescribes storing a 32-bit short-format NTP in an MMT packet header and transferring the 32-bit short-format NTP, the conventional MMT scheme does not prescribe transferring the long-format NTP, and it is difficult for a reception apparatus to acquire high-precision reference clock information.

In contrast, for control information, such as a message, a table, and a descriptor, the reference clock information is defined using the long-format NTP. It is possible to append the MMT packet header to the control information for transfer. An MMT packet, which is the control information to which the MMT packet header is appended, is stored in an IP packet, and is transferred through a broadcast transfer channel or a communication transfer channel.

When the MMT packet is transferred using an advanced BS transfer scheme prescribed by the ARIB standard (STD-B44: transfer scheme of an advanced broadband satellite digital broadcast), after encapsulation of the MMT packet into the IP packet and encapsulation of the IP packet into a TLV (Type Length Value) packet, the MMT packet is stored in a transfer slot prescribed by the advanced BS transfer scheme.

However, when the transmission apparatus stores the reference clock information in an MMT packet layer, in order to obtain the reference clock information, the reception apparatus extracts the TLV packet from the transfer slot, extracts the IP packet from the TLV packet, extracts the MMT packet from the IP packet, and further extracts the reference clock information from the header or a payload of the MMT packet. Therefore, the reception apparatus involves many processes for acquiring the reference clock information, and needs longer time until the acquisition.

In addition, processes in layers equal to or higher than an IP layer are software processes. Accordingly, when the reference clock information is stored in the MMT packet, the reference clock information is extracted and reproduced by a software program. Therefore, the reference clock information to be acquired may contain jitter depending on throughput of a CPU, interruption by and priority of other software programs, and the like.

Also, the reception apparatus may need to process unnecessary data. For example, the reception apparatus may need to process data that is not watched depending on data structure. Specifically, a phenomenon occurs that, in a case of transmitting a plurality of services as one channel data, when the plurality of services are included in one IP data flow, it is necessary to process data of service that is not watched in order to acquire data of service that is watched.

A transmission method according to one aspect of the present disclosure includes: generating a stream including a plurality of Internet Protocol (IP) data flows corresponding one-to-one with a plurality of services in broadcast, the IP data flows respectively storing the corresponding services of the plurality of services; and transmitting the generated stream in a determined channel.

Accordingly, the reception apparatus may process the IP data flow corresponding to the service to be watched in one stream. This allows reduction in an amount of processes of the reception apparatus.

For example, the generated stream may further include an IP data flow different from the plurality of IP data flows, the IP data flow storing program control information that indicates correspondence between each of the plurality of services and specification information that specifies the plurality of IP data flows that stores the plurality of services.

Accordingly, data of an arbitrary service can be designated from data of the plurality of services extending over the plurality of IP data flows by using the program control information.

For example, each of the plurality of services may be stored in an MMT (MPEG Media Transport) packet in the corresponding IP data flow.

For example, each of the IP data flows may be stored in a TLV (Type Length Value) packet.

A reception method according to one aspect of the present disclosure includes: receiving a stream including a plurality of Internet Protocol (IP) data flows corresponding one-to-one with a plurality of services in broadcast in a determined channel, the IP data flows respectively storing the corresponding services of the plurality of services; and reproducing one of the plurality of services from the received stream.

Accordingly, the reception apparatus may process the IP data flow corresponding to the service to be watched in one stream. This allows reduction in the amount of processes of the reception apparatus.

For example, the received stream may include an IP data flow different from the plurality of IP data flows, the IP data flow storing program control information that indicates correspondence between each of the plurality of services and specification information that specifies the plurality of IP data flows that stores the corresponding services of the plurality of services, and the reception method may include: specifying the IP data flow corresponding to the service to be reproduced from the plurality of IP data flows based on the program control information; and reproducing the service stored in the specified IP data flow.

Accordingly, data of an arbitrary service can be designated from data of the plurality of services extending over the plurality of IP data flows by using the program control information.

For example, each of the corresponding services may be stored in an MMT (MPEG Media Transport) packet in the corresponding IP data flow.

For example, each of the IP data flows may be stored in a TLV (Type Length Value) packet.

A transmission apparatus according to one aspect of the present disclosure includes: a generator that generates a stream including a plurality of Internet Protocol (IP) data flows corresponding one-to-one with a plurality of services in broadcast, the IP data flows respectively storing the corresponding services of the plurality of services; and a transmitter that transmits the generated stream in a determined channel.

Accordingly, the reception apparatus may process the IP data flow corresponding to the service to be watched in one stream. This allows reduction in the amount of processes of the reception apparatus.

A reception apparatus according to one aspect of the present disclosure includes: a receiver that receives a stream including a plurality of Internet Protocol (IP) data flows corresponding one-to-one with a plurality of services in broadcast in a determined channel, the IP data flows respectively storing the corresponding services of the plurality of services; and a reproducer that reproduces one of the plurality of services from the received stream.

Accordingly, the reception apparatus may process the IP data flow corresponding to the service to be watched in one stream. This allows reduction in the amount of processes of the reception apparatus.

Note that these general or specific aspects may be implemented using a system, an apparatus, a method, an integrated circuit, a computer program, or a computer-readable recording medium such as a CD-ROM. Also, these general or specific aspects may be implemented using any combination of a system, an apparatus, a method, an integrated circuit, a computer program, and a recording medium.

Exemplary embodiments will be specifically described below with reference to the drawings.

Note that each of the exemplary embodiments below describes a comprehensive or specific example. Numerical values, shapes, materials, elements, arranged positions and connection forms of the elements, steps, the order of the steps, and the like described in the following exemplary embodiments are merely an example, and do not intend to limit the present disclosure. Also, among elements described in the following exemplary embodiments, elements that are not included in an independent claim which represents the highest concept are described as optional elements.

First Exemplary Embodiment

[Basic Configuration of an MMT Scheme]

First, a basic configuration of an MMT scheme will be described. FIG. 1 illustrates a protocol stack diagram for performing transfer using the MMT scheme and an advanced BS transfer scheme.

Under the MMT scheme, information such as video and audio is stored in a plurality of MPUs (Media Presentation Units) and a plurality of MFUs (Media Fragment Units), and is MMT-packetized with an MMT packet header being added.

Meanwhile, under the MMT scheme, the control information such as an MMT message is MMT-packetized with the MMT packet header being added. The MMT packet header is provided with a field that stores a 32-bit short-format NTP, and this field may be used for QoS control of communication lines, etc.

MMT-packetized data is encapsulated into an IP packet having a UDP header or IP header. At this time, in the IP header or UDP header, when a set of packets with an identical source IP address, destination IP address, source port number, destination port number, and protocol classification is an IP data flow, headers of the plurality of IP packets contained in one IP data flow are redundant. Therefore, header compression of some IP packets is performed in one IP data flow.

Next, a TLV packet will be described in detail. FIG. 2 is a diagram illustrating data structure of the TLV packet.

As illustrated in FIG. 2, the TLV packet stores an IPv4 packet, IPv6 packet, compressed IP packet, NULL packet, and transfer control signal. These pieces of information are identified using an 8-bit data type. Examples of the transfer control signal include an AMT (Address Map Table) and NIT (Network Information Table). In addition, in the TLV packet, a data length (byte unit) is indicated using a 16-bit field, and a value of data is stored after the data length. Since there is 1-byte header information before the data type (not illustrated in FIG. 2), the TLV packet has a total of 4-byte header area.

The TLV packet is mapped to a transfer slot under the advanced BS transfer scheme. Pointer/slot information that indicates a head position of a first packet and a tail position of a last packet which are contained in every slot are stored in TMCC (Transmission and Multiplexing Configuration Control) control information (control signal).

Next, a configuration of a reception apparatus when the MMT packet is transferred by using the advanced BS transfer scheme will be described. FIG. 3 is a block diagram illustrating the basic configuration of the reception apparatus. Note that the configuration of the reception apparatus of FIG. 3 is simplified. More specific configuration will be described later individually according to a manner in which reference clock information is stored.

Reception apparatus 20 includes receiver 10, decoder 11, TLV demultiplexer (DEMUX) 12, IP demultiplexer (DEMUX) 13, and MMT demultiplexer (DEMUX) 14.

Receiver 10 receives transfer channel coded data.

Decoder 11 decodes the transfer channel coded data received by receiver 10, applies error correction and the like, and extracts the TMCC control information and TLV data. The TLV data extracted by decoder 11 undergoes DEMUX processing by TLV demultiplexer 12.

The DEMUX process performed by TLV demultiplexer 12 differs according to the data type. For example, when the data type is a compressed IP packet, TLV demultiplexer 12 performs processes such as decompressing the compressed header and passing the header to an IP layer.

IP demultiplexer 13 performs processing such as header analysis of an IP packet or UDP packet, and extracts the MMT packet for each IP data flow.

MMT demultiplexer 14 performs a filtering process (MMT packet filtering) based on a packet ID stored in the MMT packet header.

[Method for Storing the Reference Clock Information in the MMT Packet]

Under the MMT scheme described with reference to FIG. 1 to FIG. 3 described above, although the 32-bit short-format NTP can be stored in the MMT packet header for transfer, there exists no method for transferring a long-format NTP.

Hereinafter, a method for storing the reference clock information in the MMT packet will be described. First, the method for storing the reference clock information within the MMT packet will be described.

When a descriptor, a table, or a message for storing the reference clock information is defined and the control information is stored in the MMT packet, the descriptor indicating the reference clock information and an identifier indicating the table or message are indicated within the control information. Then, the control information is stored in the MMT packet in the transmission apparatus.

This allows reception apparatus 20 to identify the reference clock information based on the identifier. Note that the reference clock information may be stored in the MMT packet by using existing descriptors (for example, CRI_descriptor( ) etc.).

Next, a method for storing the reference clock information in the MMT packet header will be described.

For example, there is a method for storing the reference clock information by using a header_extension field (hereinafter referred to as an extension field). The extension field becomes effective when an extension_flag of the MMT packet header is set to '1'.

An extension field type indicating data classification of data to be stored in the extension field is stored in the extension field. Information indicating that the data is reference clock information (for example, a 64-bit long-format NTP) is stored in the extension field type. The reference clock information is stored in the extension field.

When header_extension_flag of the MMT packet header is '1', reception apparatus 20 refers to the extension field of the MMT packet. When the extension field type indicates that the data is reference clock information, reception apparatus 20 extracts the reference clock information and reproduces a clock.

Note that the reference clock information may be stored in an existing header field. In addition, when there is an unused field or when there is a field unnecessary for broadcast, the reference clock information may be stored in these fields.

In addition, the reference clock information may be stored by using the existing field and the extension field together. For example, the existing 32-bit short-format NTP field and the extension field may be used together.

Regarding the reference clock information, in order to maintain compatibility with an existing field, of the 64-bit long-format NTP, a 32-bit section corresponding to a short-format format may be stored in the existing field, and remaining 32 bits may be stored in the extension field.

Here, the reference clock information is, for example, time when a head bit of the MMT packet in which the reference clock information is stored passes a predetermined position (for example, when the head bit is output from a specific component of a transmission apparatus). However, the reference clock information may be time when a bit of another position passes the predetermined position.

When the reference clock information is stored in the MMT packet as the control information, the MMT packet containing the control information is transmitted at predetermined transmission intervals.

When the reference clock information is stored in the extension field of the MMT packet, the reference clock information is stored in the extension field of a predetermined MMT packet header. Specifically, for example, at least one or more pieces of the reference clock information are stored in the header extension fields of the MMT packets at intervals of 100 ms.

Note that, when the reference clock information is stored in the MMT packet, the packet ID of the MMT packet that stores the reference clock information is stored in program information. Reception apparatus 20 analyzes the program information and acquires the MMT packet in which the reference clock information is stored. At this time, the packet ID of the MMT packet in which the reference clock information is stored may be prescribed in advance as a fixed value. This allows reception apparatus 20 to acquire the reference clock information without analyzing the program information.

[Operation Flow when the Reference Clock Information is Stored in the MMT Packet]

Next, an operation flow when the reference clock information is stored in the MMT packet (acquisition flow of the reference clock information) will be described.

Figure 4:
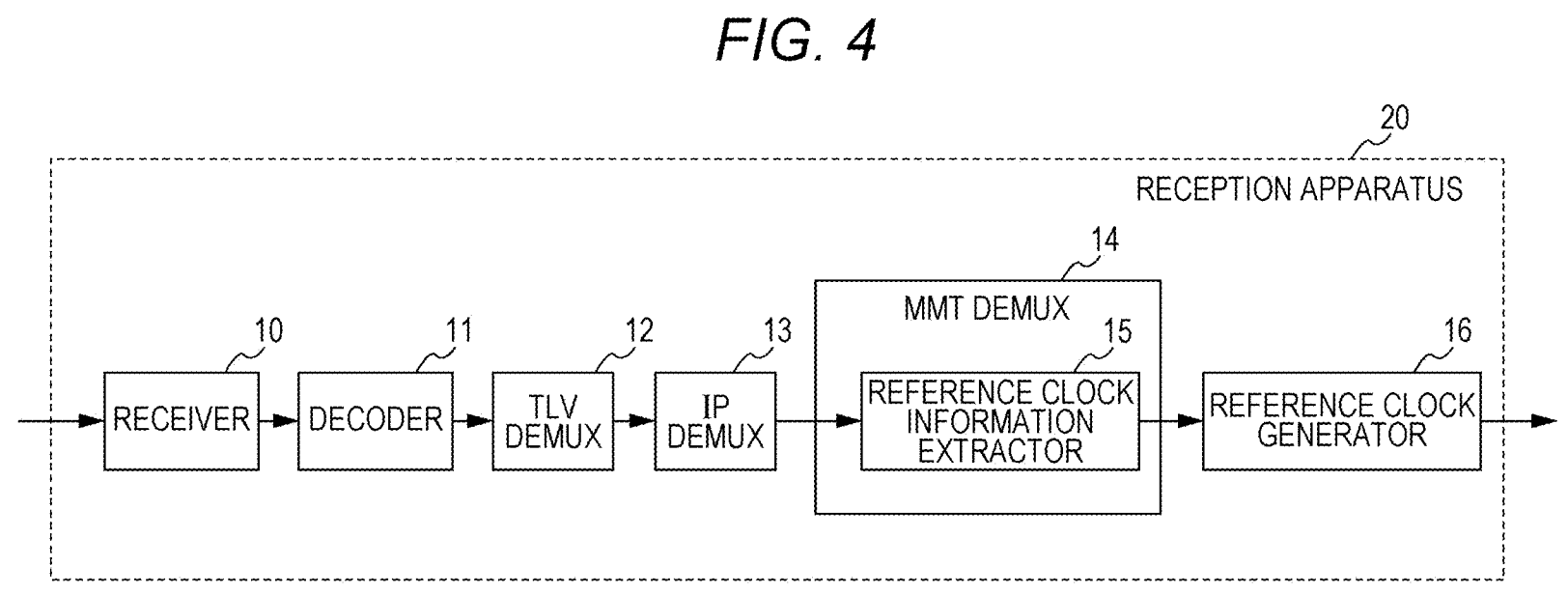
Figure 5:
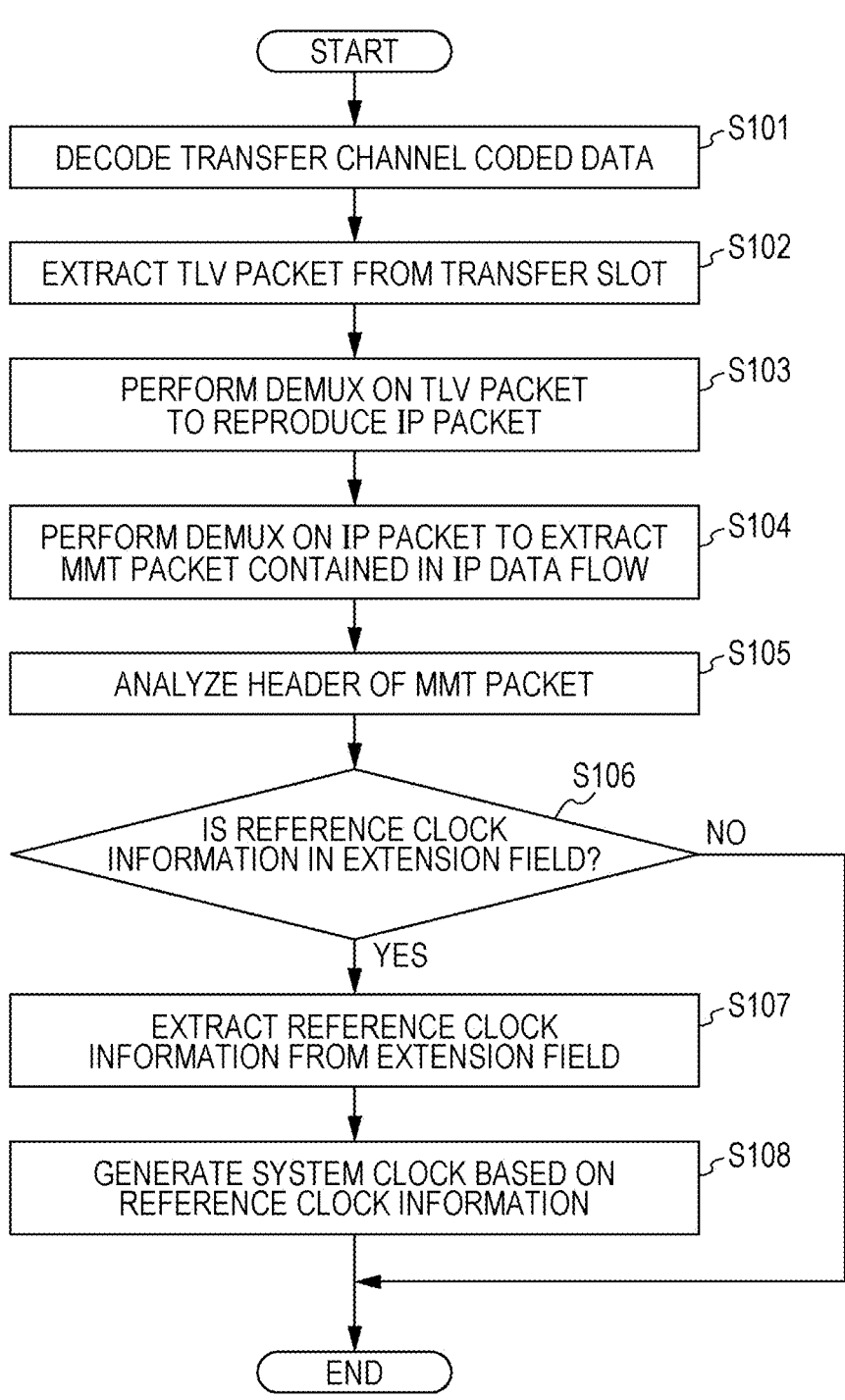
FIG. 5 is a flowchart illustrating an operation of the reception apparatus to acquire the reference clock information when the reference clock information is stored in the extension field of the MMT packet header.

First, the following describes the acquisition flow of the reference clock information performed by reception apparatus 20 when the reference clock information is stored in the extension field of the MMT packet header. FIG. 4 is a block diagram illustrating a functional configuration of reception apparatus 20 when the reference clock information is stored in the extension field of the MMT packet header. FIG. 5 is a diagram illustrating the acquisition flow of the reference clock information performed by reception apparatus 20 when the reference clock information is stored in the extension field of the MMT packet header.

In FIG. 4, when the reference clock information is stored in the extension field of the MMT packet header, MMT demultiplexer 14 includes reference clock information extractor 15 (an example of an extractor), and reference clock generator 16 (an example of a generator) is provided downstream of MMT demultiplexer 14.

In the flow of FIG. 5, decoder 11 of reception apparatus 20 decodes the transfer channel coded data received by receiver 10 (S101), and extracts the TLV packet from the transfer slot (S102).

Next, TLV demultiplexer 12 performs DEMUX on the extracted TLV packet to extract the IP packet (S103). At this time, the header of the compressed IP packet is reproduced.

Next, IP demultiplexer 13 performs DEMUX on the IP packet, acquires the specified IP data flow, and extracts the MMT packet (S104).

Next, MMT demultiplexer 14 analyzes the header of the MMT packet, and determines whether the extension field is used and whether the reference clock information is in the extension field (S106). When there is no reference clock information in the extension field (No in S106), the process ends.

On the other hand, when the determination is made such that the reference clock information is in the extension field (Yes in S106), reference clock information extractor 15 extracts the reference clock information from the extension field (S107). Then, reference clock generator 16 generates the system clock based on the extracted reference clock information (S108). The system clock is, in other words, a clock for reproducing content.

Figure 6:
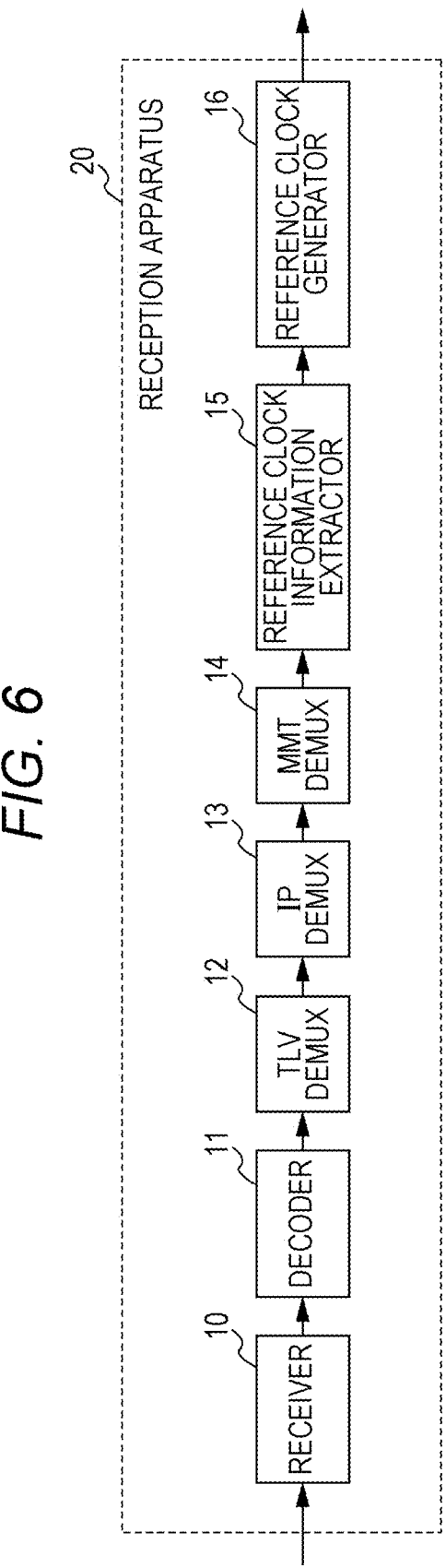
FIG. 6 is a block diagram illustrating the functional configuration of the reception apparatus when the reference clock information is stored in control information.

Next, the acquisition flow of the reference clock information by reception apparatus 20 when the reference clock information is stored in the control information will be described. FIG. 6 is a block diagram illustrating the functional configuration of reception apparatus 20 when the reference clock information is stored in the control information. FIG. 7 is a diagram illustrating the acquisition flow of the reference clock information performed by reception apparatus 20 when the reference clock information is stored in the control information.

As illustrated in FIG. 6, when the reference clock information is stored in the control information, reference clock information extractor 15 is disposed downstream of MMT demultiplexer 14.

In the flow of FIG. 7, the processes of step S111 to step S114 are identical to the flow of step S101 to step S104 described in FIG. 5.

Subsequently to step S114, MMT demultiplexer 14 acquires the packet ID of the packet containing the reference clock information from the program information (S115), and acquires the MMT packet of the packet ID (S116). Subsequently, reference clock information extractor 15 extracts the reference clock information from the control signal contained in the extracted MMT packet (S117), and reference clock generator 16 generates the system clock based on the extracted reference clock information (S118).

[Method for Storing the Reference Clock Information in the TLV Packet]

As described in FIG. 5 and FIG. 7, when the reference clock information is stored in the MMT packet, in order that the reception apparatus obtains the reference clock information, reception apparatus 20 extracts the TLV packet from the transfer slot, and extracts the IP packet from the TLV packet.

Furthermore, reception apparatus 20 extracts the MMT packet from the IP packet, and further extracts the reference clock information from the header or a payload of the MMT packet. When the reference clock information is stored in the MMT packet, reception apparatus 20 has many processes for acquiring the reference clock information, and much time is required until the acquisition, which needs to be addressed.

Therefore, a method will be described for implementing a process of adding a time stamp to a medium, such as video and audio, based on the reference clock, and a process of transferring the medium by using the MMT scheme, and for performing transfer of the reference clock information by using a lower layer, lower protocol, or lower multiplexing scheme than the MMT layer.

Figure 8:
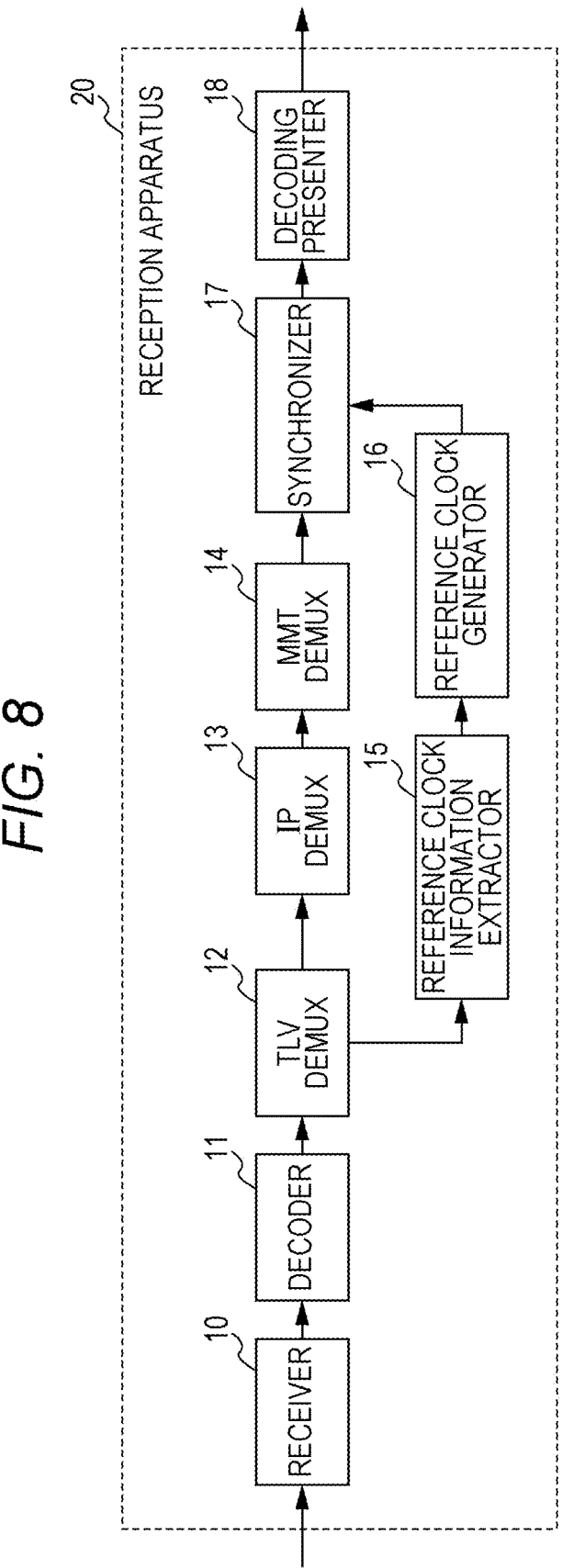
FIG. 8 is a block diagram illustrating the configuration of the reception apparatus when the reference clock information is stored in the TLV packet.

First, a method for storing the reference clock information in the TLV packet for transfer will be described. FIG. 8 is a block diagram illustrating the configuration of reception apparatus 20 when the reference clock information is stored in the TLV packet.

Reception apparatus 20 in FIG. 8 differs from reception apparatus 20 in FIG. 4 and FIG. 6 in placement of reference clock information extractor 15 and reference clock generator 16. In addition, synchronizer 17 and decoding presenter 18 are also illustrated in FIG. 8.

The TLV packet includes the 8-bit data type, 16-bit data length, and 8*N-bit data, as illustrated in aforementioned FIG. 2. In addition, 1-byte header which is not illustrated in FIG. 2 exists before the data type, as described above. Here, the data type is specifically prescribed, for example, as 0x01: IPv4 packet, 0x03: header-compressed IP packet, etc.

In order to store new data in the TLV packet, an undefined area of the data type is used to prescribe the data type. In order to indicate that the reference clock information is stored in the TLV packet, the data type describes that the data is the reference clock information.

Figure 9:
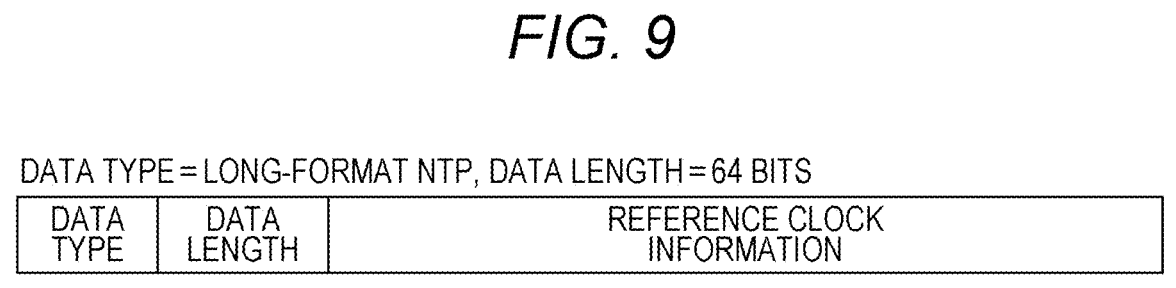

Note that the data type may be prescribed for each kind of the reference clock. For example, the data types that indicate the short-format NTP, long-format NTP, and PCR (Program Clock Reference) may be prescribed individually. FIG. 9 is a diagram illustrating an example in which the long-format NTP is stored in the TLV packet. The long-format NTP is stored in a data field.

In this case, reference clock information extractor 15 analyzes the data type of TLV packet. When the reference clock information is stored, reference clock information extractor 15 analyzes the data length, and extracts the reference clock information from the data field.

Here, when the data length is uniquely determined by the data type, reference clock information extractor 15 may acquire the reference clock information without analyzing a data length field. For example, when the data type indicates a 64-bit long-format NTP, reference clock information extractor 15 may extract a section from (4 bytes+1 bit)-th bit to (4 bytes+64 bits)-th bit. Also, reference clock information extractor 15 may extract a desired bit from 64-bit data.

Figure 10:
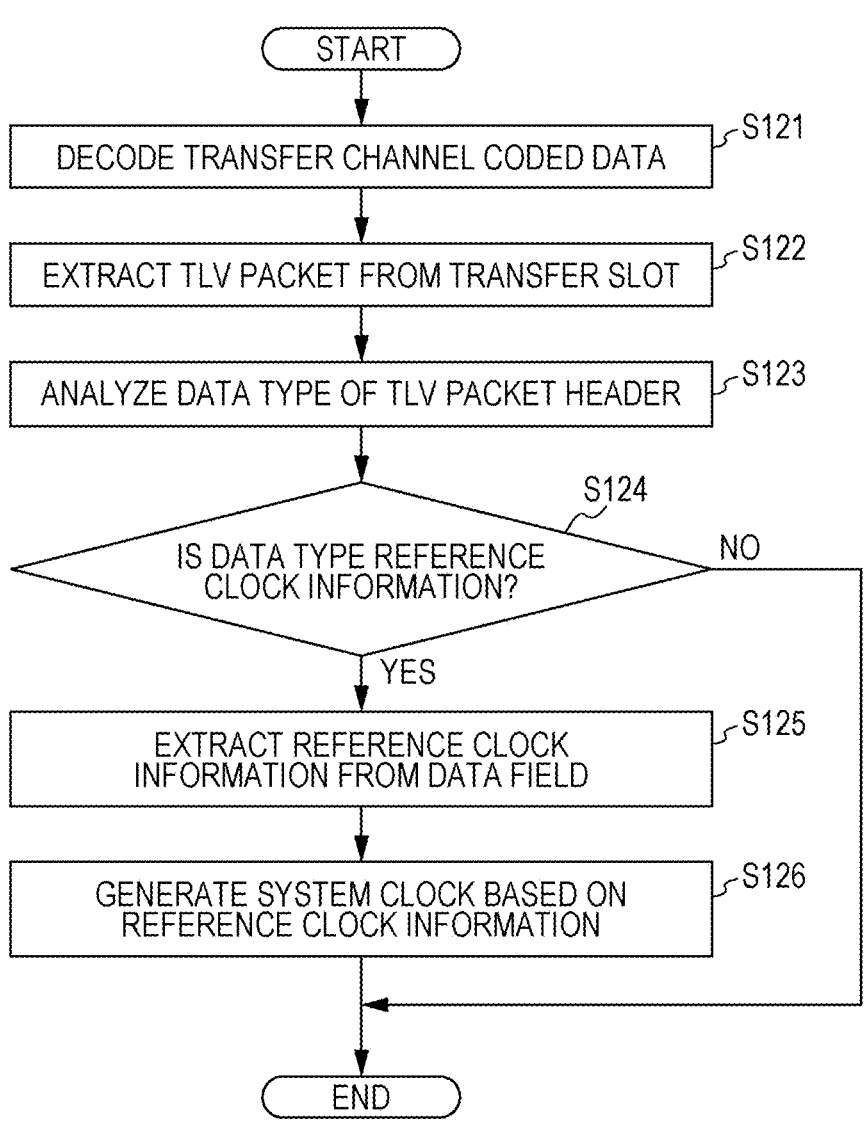
FIG. 10 is a flowchart illustrating the operation of the reception apparatus to acquire the reference clock information when the reference clock information is stored in the TLV packet.

Next, the operation flow of reception apparatus 20 when the reference clock information is stored in the TLV packet (acquisition flow of the reference clock information) will be described with reference to FIG. 10. FIG. 10 is a diagram illustrating the acquisition flow of the reference clock information performed by reception apparatus 20 when the reference clock information is stored in the TLV packet.

In the flow of FIG. 10, first, decoder 11 decodes the transfer channel coded data received by receiver 10 (S121), and extracts the TLV packet from the transfer slot (S122).

Next, TLV demultiplexer 12 analyzes the data type of TLV packet (S123), and determines whether the data type is the reference clock information (S124). When the data type is the reference clock (Yes in S124), reference clock information extractor 15 extracts the reference clock information from the data field of the TLV packet (S125). Then, reference clock generator 16 generates the system clock based on the reference clock information (S126). On the other hand, when the data type is not the reference clock information, (No in S124), the acquisition flow of the reference clock information ends.

In addition, in an unillustrated flow, IP demultiplexer 13 extracts the IP packet according to the data type. Then, the IP DEMUX process and MMT DEMUX process are performed on the extracted IP packet, and the MMT packet is extracted. Furthermore, synchronizer 17 outputs video data to decoding presenter 18 with timing with which the time stamp of the video data contained in the extracted MMT packet coincides with the reference clock generated in step S126. Decoding presenter 18 decodes and presents the video data.

In a transmission method described above, the type data of the TLV packet indicates a storage place of the reference clock information, and the reference clock information is stored in the data field of the TLV packet. Thus, by storing and transmitting the reference clock information by the transmission apparatus by using a lower layer or lower protocol than the MMT layer, reception apparatus 20 can reduce the processes and time until extraction of the reference clock information.

In addition, since reception apparatus 20 can extract and reproduce the reference clock information in a lower layer extending over the IP layers, reception apparatus 20 may extract the reference clock information by hardware implementation. This allows reception apparatus 20 to reduce more influence of jitter or the like than extracting the reference clock information by software implementation, and makes it possible to generate higher-precision reference clock.

Next, other methods for storing the reference clock information will be described.

When the data length is uniquely determined according to the data type in the aforementioned flow of FIG. 10, the data length field does not need to be transmitted. Here, when the data length field is not transmitted, an identifier is stored indicating that the data length field is data that is not transmitted.

Although the reference clock information is stored in the data field of the TLV packet according to the description of FIG. 10, the reference clock information may be appended immediately before or after the TLV packet. Also, the reference clock information may be appended immediately before or after data to be stored in the TLV packet. In these cases, a data type that allows specification of a position where the reference clock information is appended is added.

For example, FIG. 11 is a diagram illustrating structure in which the reference clock information is appended immediately before the IP packet header. In this case, the data type indicates an IP packet with reference clock information. When the data type indicates an IP packet with reference clock information, reception apparatus 20 (reference clock information extractor 15) can acquire the reference clock information by extracting bits of a previously prescribed predetermined length of the reference clock information from a head of the data field of the TLV packet.

At this time, the data length may specify the length of data that includes the length of the reference clock information, and may specify the length that does not include the length of the reference clock information. When the data length specifies the length of data that includes the length of the reference clock information, reception apparatus 20 (reference clock information extractor 15) acquires data of a length obtained by subtracting the length of the reference clock information from the data length from immediately after the reference clock information.

When the data length specifies the length of data that does not include the length of the reference clock information, reception apparatus 20 (reference clock information extractor 15) acquires data of the length specified by the data length from immediately after the reference clock information.

Figure 13:
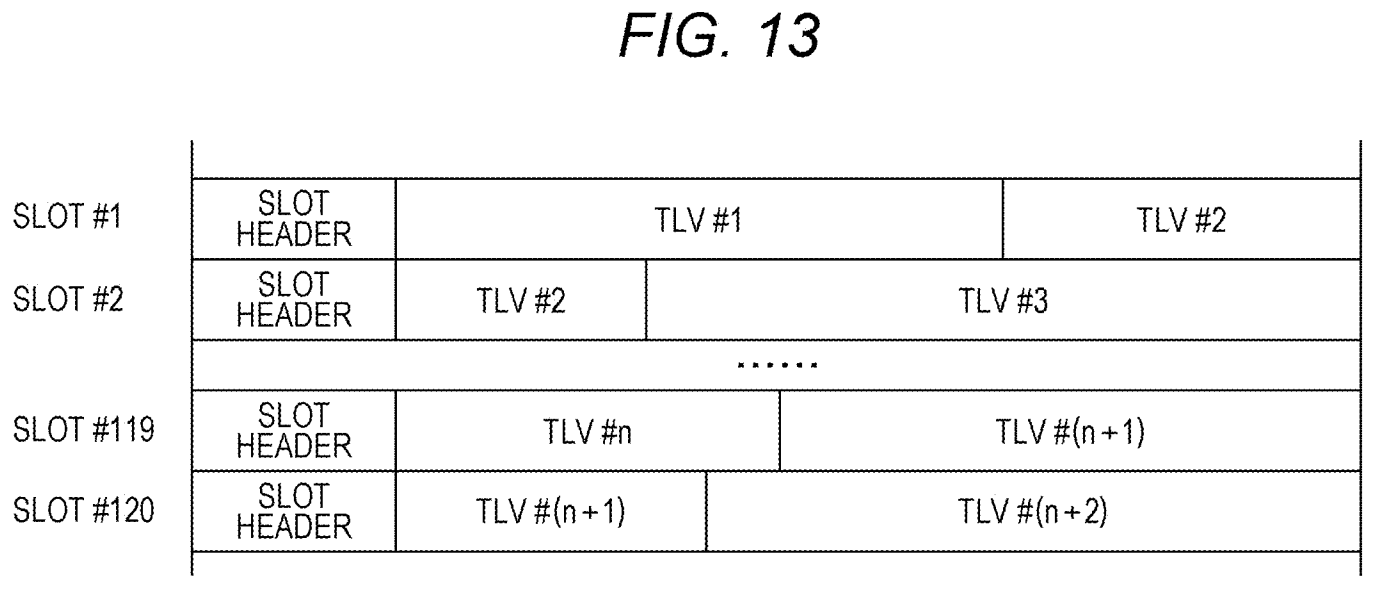

In addition, FIG. 12 is a diagram illustrating structure in which the reference clock information is appended immediately before the TLV packet. The data type is a conventional data type. An identifier indicating that the TLV packet is a TLV packet with reference clock information is stored, for example, in a slot header of the transfer slot or the TMCC control information. FIG. 13 is a diagram illustrating structure of the transfer slot, and FIG. 14 is a diagram illustrating structure of the slot header of the transfer slot.

In FIG. 13, the transfer slot includes a plurality of slots (120 slots of Slot #1 to Slot #120 in the example of FIG. 13). A bit number contained in each slot is a fixed bit number uniquely determined based on a coding rate of error correction. Each slot has a slot header, and one or more TLV packets are stored. Note that, in FIG. 13, the TLV packet has a variable-length.

In FIG. 14, in a head TLV instruction field (16 bits) of the slot header is stored a value of a position of a head byte in a first TLV packet within the slot indicated with a number of bytes from a slot head except the slot header. Remaining 160 bits of the slot header is undefined.

The transfer slot includes 120 slots per frame as described above, and a modulation scheme is assigned to the slots in 5-slot unit. In addition, up to 16 streams can be transferred within one frame.

Note that the plurality of streams included in one transfer slot has, for example, different pieces of content (or a company that provides the content) transferred by the streams. In addition, each stream includes one or more slots, and one slot does not extend over the plurality of streams.

When the identifier indicating that the TLV packet is a TLV packet with reference clock information is stored in the slot header, for example, information that allows specification of a position of the TLV packet with reference clock information, kind of the reference clock information, data length, and the like are stored in the slot obtained by extending (using) an undefined field of the slot header.

Note that all pieces of information including the information that allows specification of the position of the TLV packet with reference clock information, kind of the reference clock information, and data length do not need to be stored in the slot header. The slot may indicate information that allows specification of and reference to the TLV packet with reference clock information.

For example, when definition is made that the reference clock information is the 64-bit long-format NTP, that one TLV packet with reference clock information may be stored in one slot, and that the one TLV packet with reference clock information is always the head TLV packet, a flag may be stored in the undefined area of the slot header in the slot. FIG. 15 is a diagram illustrating an example in which the flag is stored in the undefined area of the slot header.

In FIG. 15, the flag (described as "F" in the diagram) indicating whether the reference clock information is contained in the slot is stored in the undefined area of the slot header. With such a flag, reception apparatus 20 may determine that the head TLV packet is a TLV packet with reference clock information.

In addition, the identifier (information) indicating that the TLV packet is a TLV packet with reference clock information may be stored in the TMCC control information. FIG. 16 is a diagram illustrating structure of the TMCC control information under a transfer scheme for advanced broadband satellite digital broadcast.

The information for specifying and referencing the TLV packet with reference clock information may be stored in extension information within the TMCC control information illustrated in FIG. 16, and may be stored in another place within the TMCC control information. For example, stream classification/relative stream information in the TMCC control information may be used as information for specifying and referencing the TLV packet with reference clock information. FIG. 17 is a diagram illustrating the stream classification/relative stream information in the TMCC control information.

In FIG. 17, in the stream classification/relative stream information, the stream classification of each of 16 streams is indicated in 8 bits. That is, 1-frame transfer slot can transfer up to 16 (16-classification) streams. For example, the stream classification of an MPEG2-TS (Transport Stream) stream is "00000000", and the stream classification of a TLV stream is "00000010". However, under the current circumstances, the classifications of other streams are unassigned or undefined.

Therefore, when the stream classification of the TLV stream with reference clock is defined, for example, as "00000100" and the relative stream is a TLV stream with a reference clock, "00000100" is stored in the stream classification/relative stream information in the TMCC control information. Here, in the stream with the stream classification of "00000100", the TLV packet containing reference clock information is stored, for example, once per 5-slot unit, which is a slot assignment unit, or once per frame unit.

Reception apparatus 20 analyzes the stream classification/relative stream information in the TMCC control information. When the stream classification is "00000100", reception apparatus 20 acquires the TLV packet with a reference clock from the slot determined in advance.

Note that a case may be considered where the stream classification including download type TLV packets and the stream classification including stream type TLV packets, such as video and audio, are defined. In such a case, reception apparatus 20 may determine that the reference clock information is contained in the stream when the stream classification of the received stream is a stream type TLV packet. This is because the reference clock information is not used in reproduction of download type TLV packets.

In addition, when the information for specifying and referencing the TLV packet with reference clock information is stored in the extension information of the TMCC control information, for example, information for each of the 16 relative streams is stored in the extension area of the TMCC control information.

Figure 18:
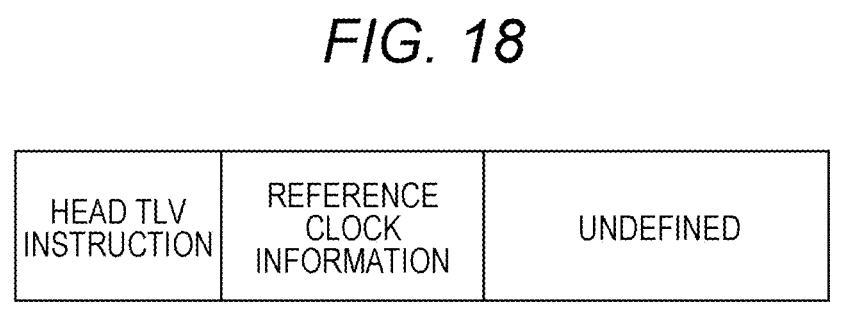

In addition, as illustrated in FIG. 18, an area into which the reference clock information is stored may be newly defined in the undefined field of the slot header. FIG. 18 is a diagram illustrating an example in which the reference clock information is stored in the undefined field of the slot header.

In addition, the reference clock information may be stored in a previously determined slot, and information indicating that the reference clock information is contained may be stored within the slot header. Here, the previously determined slot is, for example, a head slot of the transfer slot (Slot #1 in the example of FIG. 13), and the reference clock information stored in the IP packet may be contained in the head TLV packet within this slot.

Also, when the plurality of streams are contained in the transfer slot, the previously determined slot may be, for example, a head slot of each stream contained in the transfer slot, and the reference clock information stored in the IP packet may be contained in the head TLV packet within this slot.

In addition, the TMCC control information may store information for specifying and referencing the slot header containing the reference clock information. Note that the storage method of the information for specifying and referencing the slot header containing reference clock information in the TMCC control information is similar to the aforementioned storage method of the information for specifying and referencing the TLV packet with reference clock information, and thus description thereof will be omitted.

Reception apparatus 20 analyzes the TMCC control information, and when determination is made such that the reference clock information is in the slot header, reception apparatus 20 extracts the reference clock information from the slot header.

Figure 19:
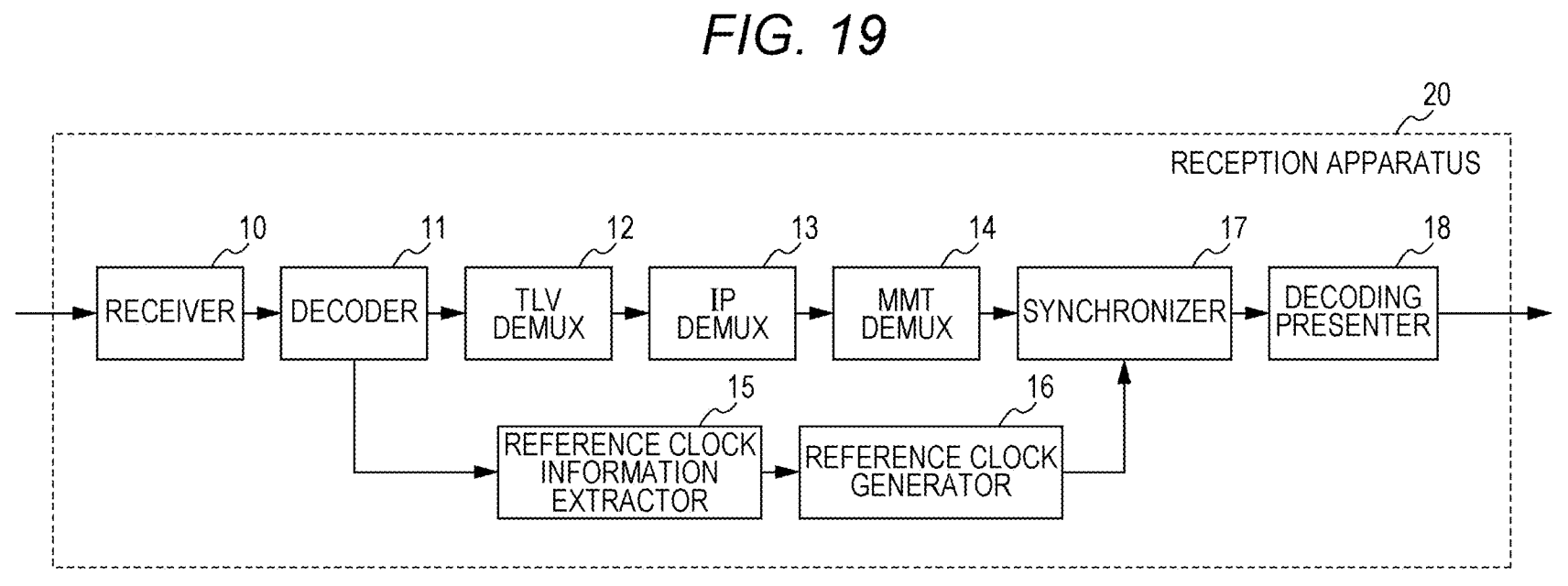
Figure 20:
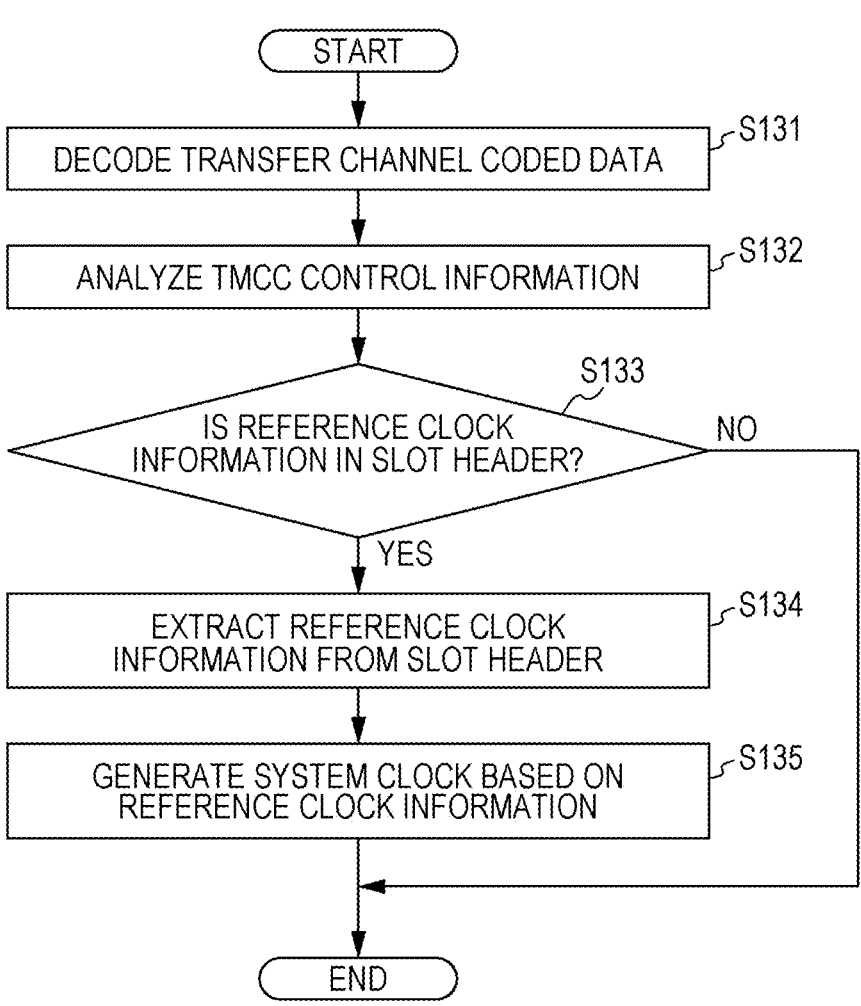
FIG. 20 is a flowchart illustrating the operation of acquiring the reference clock information when the TMCC control information stores the information indicating that the reference clock information is included in the slot header.

In addition, the TMCC control information may store information indicating that the reference clock information is contained. FIG. 19 is a block diagram illustrating a functional configuration of reception apparatus 20 when the information indicating that the reference clock information is contained within the slot header is stored in the TMCC control information. FIG. 20 is an acquisition flow of the reference clock information when the information indicating that the reference clock information is contained in the slot header is stored in the TMCC control information.

In FIG. 19, when the information indicating that the reference clock information is contained within the slot header is stored in the TMCC control information, reference clock information extractor 15 of reception apparatus 20 acquires the reference clock signal from the transfer slot that is output from decoder 11.

In the flow of FIG. 20, decoder 11 decodes the transfer channel coded data (S131), analyzes the TMCC control information (S132), and determines whether the reference clock information is in the slot header within the transfer slot (S133). When the reference clock information is in the slot header (Yes in S133), reference clock information extractor 15 extracts the reference clock information from the slot header (S134), and reference clock generator 16 generates the reference clock of the system (system clock) based on the reference clock information (S135). On the other hand, when the reference clock information is not in the slot header (No in S133), the acquisition flow of the reference clock information ends.

Such reception apparatus 20, which can acquire the reference clock information in the layer of the transfer slot, can acquire the reference clock information more quickly than a case where the reference clock information is stored in the TLV packet.

As described above, by storing the reference clock information in the TLV packet or transfer slot, reception apparatus 20 can reduce the processes until the acquisition of the reference clock information, and can shorten acquisition time of the reference clock information.

In addition, by storing the reference clock information in a physical layer, reception apparatus 20 can easily implement acquisition and reproduction of the reference clock information by hardware, and clock reproduction with high-precision is possible compared to the case of acquisition and reproduction of the reference clock information by software.

In addition, in the aforementioned transmission method according to the first exemplary embodiment, in a system in which a plurality of layers (protocols) exists including the IP layer, the transmission apparatus adds the time stamp of a medium based on the reference clock information in the layers upper than the IP layer, and transmits the reference clock information in the layers lower than the IP layer. This allows reception apparatus 20 to easily process the reference clock information by hardware.

Based on a similar idea, the reference clock information may be stored in a condition of not being stored in the MMT packet within the IP packet. Even in such a case, reception apparatus 20 can reduce the processes for acquiring the reference clock information as compared with the case where the reference clock information is stored in the MMT packet.

[Transmission Cycle of the Reference Clock Information]

A transmission cycle of the reference clock information will be supplemented below.

In the case of storing the reference clock information in the TLV packet, for example, the transmission apparatus stores time when a head bit of the TLV packet is transmitted as the reference clock information. In addition, not the transmission time of the head bit but predetermined time determined differently may be stored as the reference clock information.

The TLV packet that contains the reference clock information is transmitted at predetermined intervals. In other words, the TLV packet that contains the reference clock information is contained in the transfer slot and is transmitted in a predetermined transmission cycle. For example, at least one or more pieces of the reference clock information may be stored in the TLV packets for transfer at intervals of 100 ms.

In addition, the transmission apparatus may place the TLV packets that contain the reference clock information at predetermined intervals at predetermined positions of the transfer slot under the advanced BS transfer scheme. In addition, the transmission apparatus may store the TLV packet containing the reference clock information once every 5-slot unit, which is a slot assignment unit of the TLV packet, and may store the reference clock information in the head TLV packet of the first slot of the 5-slot unit. That is, the transmission apparatus may place the TLV packet that contains the reference clock information at a head within the head slot within the transfer slot (that is, immediately after the slot header).

In addition, the transmission apparatus may place the TLV packets that contain the reference clock information at predetermined intervals at predetermined positions of the transfer slot under the transfer scheme of the advanced broadband satellite digital broadcasting. For example, the transmission apparatus may store the reference clock information once every 5-slot unit, which is a slot assignment unit, in the head TLV packet of the first slot. That is, the TLV packet positioned at a head within the head slot of each stream contained in the transfer slot may contain the reference clock information. In addition, the reference clock information may be stored in the first slot within the relative stream.

In addition, the transmission cycle and transmission interval of the reference clock information may be changed according to a modulation scheme or coding rate of the transfer channel coding scheme.

[Method for Acquiring the Reference Clock Information in the Upper Layer Quickly]

Next, a method will be described for shorten time to the acquisition of the reference clock information by reception apparatus 20 performing batch DEMUX processing from the lower layer to the upper layer.

Here, a method will be described by which the transmission apparatus stores the reference clock information in the upper layer such as the MMT packet, and stores in the IP packet the MMT packet in which the reference clock information is stored. In the method described below, by defining a protocol for storing in the TLV packet the IP packet in which the reference clock information is stored, the reception apparatus makes a direct reference to the MMT packet, which is the upper layer, from the lower layer such as the TLV packet, and acquires the reference clock information contained in the MMT packet without performing normal DEMUX processing.

The transmission apparatus contains the reference clock information in the aforementioned control information stored in the MMT packet. The previously determined packet ID is added to the control information containing the reference clock information. Then, the transmission apparatus stores the MMT packet that contains the reference clock information in a dedicated IP data flow, and adds the previously determined source IP address, destination IP address, source port number, destination port number, and protocol classification.

On receipt of the generated transfer channel coded data, reception apparatus 20 can extract the IP packet that contains the reference clock information by TLV demultiplexer 12 acquiring the previously determined IP data flow.

Note that, when the IP packet undergoes header compression processing, the reception apparatus adds, for example, an identifier indicating that the IP packet contains the reference clock information to a context identifier that indicates identical IP data flow. The context identifier is stored in a compressed IP packet header. In this case, reception apparatus 20 can extract the IP packet that contains the reference clock information with reference to the context identifier in the compressed IP packet header.

In addition, the IP packet containing the reference clock information may be prescribed not to undergo the header compression, and may be prescribed to always undergo the header compression. It may be prescribed that the previously determined context identifier is added to the IP packet containing the reference clock information, and that all the headers are compressed.

In addition, such a method is also possible that a TLV data type field defines an identifier indicating that the TLV packet is an IP packet that belongs to the IP data flow containing the reference clock information, or an identifier indicating that the TLV packet is a compressed IP packet that belongs to the IP data flow containing the reference clock information. Also, such an identifier may be defined in a field other than the TLV data type field.

When a direct reference to the reference clock information is made from the lower layer, the reference clock information is stored at a previously determined position, and packets in which the reference clock information is stored (such as the MMT packet, IP packet, and TLV packet) are packets dedicated to the reference clock information. In addition, a length of the field before the reference clock information is fixed by a packet header length being fixed.

However, the length of the field before the reference clock information does not need to not be fixed. The reception apparatus needs to specify the length of the field before the reference clock information in the lower layer. For example, when information on the length to the reference clock information includes two types, A and B, reception apparatus 20 can specify the position of the reference clock information by signaling which of A and B the length information is in the lower layer. Alternatively, by the transmission apparatus storing, in the lower layer, positional information on the reference clock information that allows a direct reference to the reference clock information in the upper layer, reception apparatus 20 may make a reference from the lower layer based on the positional information.

The following specifically describes a method for shortening acquisition time of the reference clock information in the upper layer.

Reception apparatus 20 determines the TLV data type. On determination that the reference clock information is contained, reception apparatus 20 acquires the reference clock information contained within the MMT packet directly from the IP packet.

Reception apparatus 20 may extract the reference clock information contained in the MMT packet by extracting a bit string at a specific position from the IP packet or compressed IP packet, with analysis of the IP address, port number, or context identifier omitted. "Extracting a bit string at a specific position" means, for example, extracting information of a specific length from a position that is offset by fixed-length bytes from the TLV packet header. Reception apparatus 20 acquires the reference clock information by "extracting a bit string at a specific position".

The offset length of the fixed-length bytes for extracting the reference clock information is uniquely determined for each of the IP packet and the compressed IP packet. Therefore, reception apparatus 20 can acquire the reference clock information by extracting the information of the specific length from the position that is offset by the fixed-length bytes immediately after determining the TLV data type. Note that the extraction of the information may be performed not from the position that is offset by the fixed length from the TLV packet header but from a position that is offset by the fixed length from a specific field of TLV.

Note that the aforementioned method is one example, and the reference clock information in the upper layer may be acquired from the lower layer through definition of another protocol or identifier. For example, an identifier indicating whether the IP packet contains the reference clock information may be stored in a field other than the TLV data type field.

In addition, for example, reception apparatus 20 may extract reference time information contained in the MMT packet by extracting the bit string at a specific position from the IP packet or compressed IP packet, with analysis of the IP address, port number, or context identifier omitted.

When it is difficult to determine the IP data flow that contains the reference clock information from identification information on the IP data flow, reception apparatus 20 may specify the MMT packet that contains the reference clock information based on unique identification information (packet ID) added to the MMT packet that contains the reference clock information. In this case, the reference clock information is extracted from the specific field as described above.

In addition, when the reference clock information contained in the MMT packet is not stored at a position determined in advance or when it is difficult to specify the position where the reference clock information contained in the MMT packet is stored, reception apparatus 20 specifies the MMT packet that contains the reference clock information by using the aforementioned method, specifies the position of the reference clock information based on MMT packet header information, and extracts the reference clock information.

Note that, although an example has been described above in which the MMT packet is stored in the IP packet, data to be stored in the IP packet does not need to be the MMT packet, but may be, for example, data that has another data structure. That is, the reference clock information may be contained in the IP packet in data structure different from data structure of the MMT packet. Even for the data in different data structure, in a similar manner to the afore-mentioned example, data containing the reference clock information is stored in a dedicated IP data flow, and identification information indicating that the data contains the reference clock information and identification informa-tion indicating that the data is an IP data flow containing the reference clock information are added.

Reception apparatus 20 identifies that the data is data containing the reference clock information, or that the data is an IP data flow containing data containing the reference clock information. When the reference clock information is contained, reception apparatus 20 extracts the reference clock information. In addition, when the reference clock information is stored at a specific position of data, reception apparatus 20 can extract the reference clock information contained in the data with reference to the specific position from packet structure of the lower layer.

In the aforementioned example, in order to extract the reference clock information from the IP packet or the compressed IP packet, based on whether the data is the IP packet or the compressed IP packet, reception apparatus 20 extracts the reference clock information from fixed-length offset positions different from each other. However, if it is predetermined that header compression processing is omit-ted on the IP packet that contains the reference clock information, or if it is predetermined that all the IP packets that contain the reference clock information undergo header compression, reception apparatus 20 may omit the determi-nation on whether the data is the IP packet or the compressed IP packet. In addition, reception apparatus 20 may perform determination on whether the reference clock information is contained, after the header of the compressed IP packet is decompressed.

Figure 21:
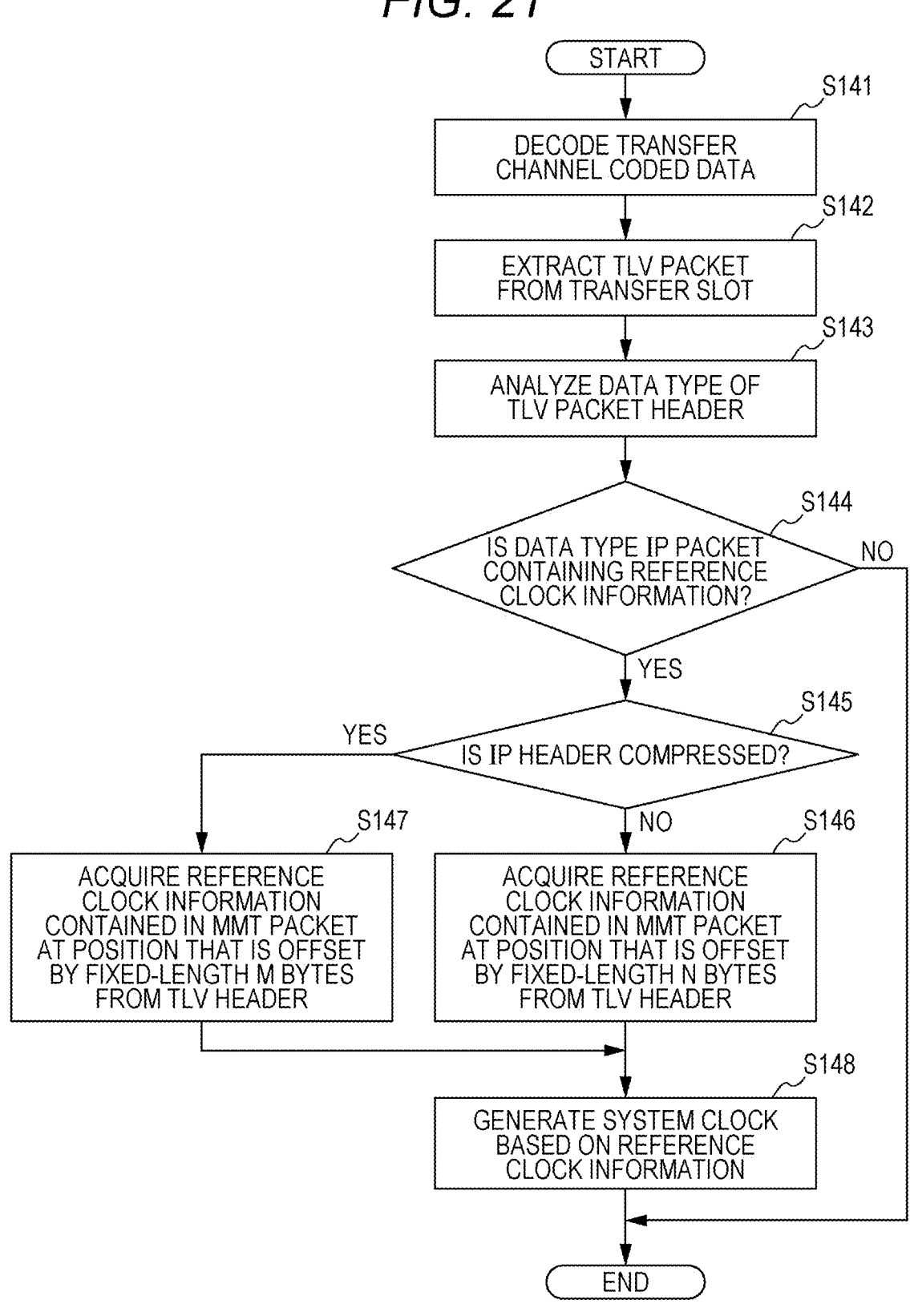
FIG. 21 is a flowchart illustrating an operation of extracting a bit string of a specified position from the IP packet or compressed IP packet.

A reception method for extracting the bit string at a specific position from the IP packet or compressed IP packet will be described below with reference to the flowchart. FIG. 21 is a flowchart for extracting the bit string at a specific position from the IP packet or compressed IP packet. Note that the configuration of reception apparatus 20 is similar to the block diagram illustrated in FIG. 8.

In the flow of FIG. 21, first, decoder 11 decodes the transfer channel coded data received by receiver 10 (S141), and extracts the TLV packet from the transfer channel slot (S142).

Next, TLV demultiplexer 12 analyzes the data type of TLV packet (S143), and determines whether the data type is an IP that contains reference clock information (S144). When the determination is made such that the data type is not an IP packet that contains reference clock information (No in S144), the flow ends. When the determination is made such that the data type is an IP packet that contains reference clock information (Yes in S144), TLV demulti-plexer 12 determines whether the IP header is compressed (S145).

When the IP header is not compressed (No in S145), reference clock information extractor 15 acquires the reference clock information contained within the MMT packet at a position that is offset by fixed-length N bytes from the TLV header (S146). When the IP header is compressed (Yes in S145), reference clock information extractor 15 acquires the reference clock information contained within the MMT packet at a position that is offset by fixed-length M bytes from the TLV header (S147).

For example, when the determination is made in step S145 that the IP header undergoes compression processing, in step S146, reference clock information extractor 15 acquires the reference clock information contained in the MMT packet from the position that is offset by N bytes from the TLV header. On the other hand, when the determination is made in step S145 such that the IP header does not undergo compression processing, in step S147, reference clock information extractor 15 acquires the reference clock information contained in the MMT packet from the position that is offset by M bytes from the TLV header.

Finally, reference clock generator 16 generates the system clock based on the reference clock information (S148).

Note that, since data structure of the IP packet header differs according to whether the IP packet is IPv4 or IPv6, the fixed-length N bytes and M bytes have different values.

While the normal MMT packet containing audio, video, control signal, and the like undergoes DEMUX processing in normal steps, the MMT packet containing the reference clock information undergoes batch DEMUX processing from the lower layer to the upper layer. This allows the reception apparatus to acquire the reference clock informa-tion in the lower layer even when the reference clock information is stored in the upper layer. That is, the reception apparatus can reduce the processes for acquisition of the reference clock information, shorten time to the acquisition of the reference clock information, and facilitate hardware implementation.

Second Exemplary Embodiment

Currently, as a method for using an extension area in TMCC control information (hereinafter also simply referred to as TMCC) under an advanced BS transfer scheme, ARIB (Association of Radio Industries and Businesses) is studying a method for transmitting urgent information and the like as a payload.

However, a proposed conventional method for using the extension area in the TMCC control information is limited to a method for transmitting a data payload, such as text and images, by using the TMCC control information extending over several frames. Therefore, the method for using the extension area in the TMCC control information will be limited, which needs to be addressed.

For example, it is difficult to store control information (control signal) that does not change in value for each frame, such as a conventional transfer mode and slot information, or control information that changes in value for each frame, such as reference clock information, in the extension area of the TMCC control information simultaneously with payload data extending over several frames.

Therefore, the second exemplary embodiment describes a method for making it possible to store data with different reception processing simultaneously in the extension area of the TMCC control information, by dividing the extension area of the TMCC control information in accordance with a classification of information and data to be stored in the extension area of the TMCC control information. The pres-ent disclosure can enhance flexibility of extension by pro-viding extensibility to the use of the extension area. In addition, the reception apparatus can perform reception and analysis of the TMCC control information by reception methods different for each classification based on the classification of data.

In addition, the method according to the present disclosure allows payload data extending over several frames and payload data of one frame to be included together in the extension area. Since the reception apparatus can acquire the payload data of one frame first even while it is difficult to receive the payload data extending over several frames, urgent information can be acquired and presented more quickly.

[Structure of TMCC Extension Information]

Structure of TMCC extension information will be described below. Note that basic structure of the TMCC control information is structure illustrated in FIG. 16. The control information to be stored in the TMCC control information is classified roughly into a first type and a second type below.

The first type is control information regarding frames, and is control information that does not change in value for each frame. A minimum update interval of the control information that does not change in value for each frame is a frame unit. Here, when the value of the control information is changed, the control information after the change is transmitted two frames ahead. In addition, when the value of the control information is changed, notification is made by increment of an 8-bit change instruction. Specifically, information other than pointer information and slot information corresponds to the control information that does not change in value for each frame.

The second type of control information relates to frames, and changes in value for each frame. Since the control information that changes in value for each frame is information that changes in value for each frame, the change instruction is not made. Specifically, such control information is the pointer information and the slot information.

Figures 22A, 22B:
FIG. 22A is a diagram illustrating an example of structure of TMCC extension information.
FIG. 22B is a diagram illustrating another example of structures of TMCC extension information.

FIG. 22 is a diagram illustrating an example of structure of the TMCC extension information. FIG. 22B is a diagram illustrating another example of structures of TMCC extension information. In FIG. 22A, the TMCC extension information includes 16-bit extension identification and 3598-bit extension area. Setting a value other than all 0 in the extension identification validates the extension area.

FIG. 22B is a diagram illustrating an example of a conventionally proposed bit assignment method when the extension area is used as a payload. In FIG. 22B, when the extension area is used as a payload, a number of pages includes 16 bits, and indicates over how many frames of the TMCC control information during transfer an additional information payload is transferred.

A page number includes 16 bits, and indicates in which page the TMCC control information during transfer is among the number of pages. An additional information classification includes 8 bits, and specifies the classification of the additional information. Specifically, the additional information classification is, for example, superimposed characters (subtitles), graphics, audio, and the like.

All of the extension area will be used as a payload, and thus it is difficult to store control information such as the conventional TMCC control information in the extension area.

[Extension Method of the TMCC Extension Area]

Here, a method will be described for storing data with different reception processing in the TMCC extension area, by dividing the TMCC extension area in accordance with the classification of information and data to be stored in the TMCC extension area.

The classification of information and data to be stored in the TMCC extension area (hereinafter referred to as an extension classification) is classified as follows, for example.

Type A:

Type A indicates control information that relates to frames, and does not change in value for each frame. The minimum update interval is a frame unit. When there is a change in value, information after the change is transmitted two frames ahead.

In addition, when there is a change in value, notification of the change is made by increment of the 8-bit change instruction.

Type B:

Type B indicates control information that relates to frames, and changes in value for each frame.

Type B indicates information that changes in value for each frame, and the change instruction is not made.

Type C:

Type C indicates information or data that is used as a payload (conventional extension scheme).

However, for the change instruction, a change instruction field which is identical to TMCC which is not the extension area may be used, and the change instruction field may be independently prescribed in the extension area.

Figure 23:
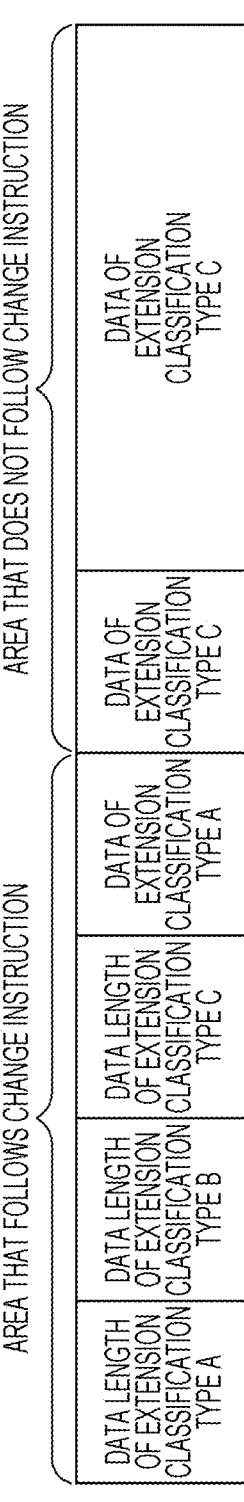
FIG. 23 is a diagram illustrating an example of data structure of an extension area in which an extension classification classified in this way is used.

FIG. 23 is a diagram illustrating an example of data structure (bit arrangement) of the extension area where the classified extension classification is used. FIG. 24A is a diagram illustrating an example of syntax when the extension classification is used. FIG. 24B is a diagram illustrating another example of syntax when the extension classification is used.

In FIG. 23, the aforementioned three types are defined as the extension classification. In addition, in FIG. 24A, subsequent to storage of a data length in each of the three types of extension classification, extension data with a length indicated in the data length is stored for each extension classification. The reception apparatus extracts data with the length indicated in the data length from the extension area for each extension classification, and performs processing.

For example, regarding data of Type A, the reception apparatus acquires the data when there is a change instruction. When there is a change in the data of Type A, the reception apparatus considers that the control information is changed, and performs processing on the control information in accordance with the change.

In addition, regarding data of Type B, since the data of Type B changes in value for each frame, the reception apparatus acquires the data for every frame. For example, when the reference clock information that changes in value for each frame is stored in the TMCC control information, the reference clock information is stored in a data area of Type B.

Data of Type C contains payload information of the conventional extension scheme. Regarding the data of Type C, the reception apparatus performs operation in accordance with acquisition under the conventional extension scheme.

In the aforementioned example, details of data structure for each extension classification are separately prescribed. When prescribed separately, an identifier similar to the additional information classification and an object service specification method in the data of Type C in FIG. 22B may be prescribed in other types. Note that the additional information classification may be defined using a common table, and the extension identification and the additional information classification may be merged.

In addition, information that may change in data length on the way may be considered as a classification similar to the data of Type A. When there is a change in data length, a change instruction may be made through transmission of information after the change two frames ahead. When there is a change instruction, the reception apparatus confirms whether there is any change in the data length with reference to the data length of the extension classification.

Note that the data structure is not limited to the structure as illustrated in FIG. 23. For example, when the data length of the extension classification is fixed in advance, transmission of the data length may be omitted. Specifically, when the data length with the extension classification of Type A is fixed-length in FIG. 23, placement of the data length with the extension classification of Type A may be omitted within the data structure. In addition, when the data length with the extension classification of Type A and the data length with the extension classification of Type B are fixed-length, placement of the data length of all types may be omitted. In addition, a flag that indicates whether there is any data of the extension classification may be provided within the data structure.

In addition, syntax for using the extension classification is not limited to syntax illustrated in FIG. 24A. For example, in FIG. 24B, an extension area number is set, and the extension classification and extension area length are stored for each extension area number in the syntax. Subsequently, the extension data of the extension area number is stored in the syntax.

The syntax in FIG. 24A and FIG. 24B supports addition of the extension classification in the future. In addition, since the syntax in FIG. 24 and FIG. 24B enables storage of a plurality of pieces of data with identical extension classification, it is not necessary to determine details of data structure for each identical extension classification in advance. In addition, even when used as a payload (as Type C), the syntax in FIG. 24 and FIG. 24B allows description of a plurality of pieces of data with different number of pages, such as video and audio, in an identical frame.

Note that, in the syntax of FIG. 24B, the extension area number, extension classification, and extension area length may be classifications similar to Type A. That is, these pieces of information may be prescribed to be information that follows the change instruction. Therefore, the reception apparatus can easily make a determination of presence of changes by continuous storage of data that follows the change instruction.

In addition, an undefined area may be provided in the extension classification in preparation for future extension. As an extension classification to be introduced in the future, for example, the following classifications are assumed.

This is a control signal to be updated for each several frames, and the change instruction is not made.

For an urgent signal, the change instruction is made in a similar manner to Type A. However, processing of value change is performed in the frame after acquisition of the change instruction, instead of after acquisition of information that is two frames ahead.

In addition, for the aforementioned urgent signal, an urgent flag may be transmitted using the extension classification accompanied by the change instruction, and urgent data may be transmitted using a payload. In addition, the extension classification may be classified in accordance with whether to follow the change instruction.

[Detailed Configuration and Operation Flow]

Figure 25:
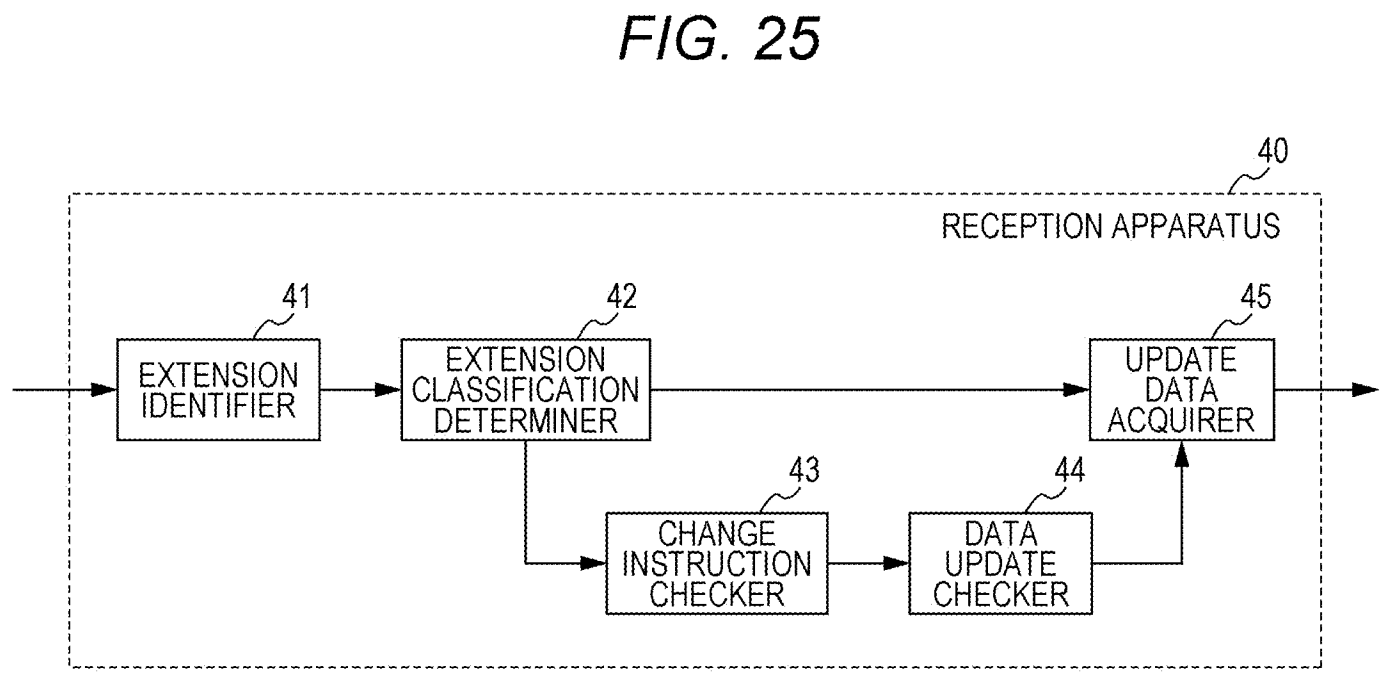
Figure 26:
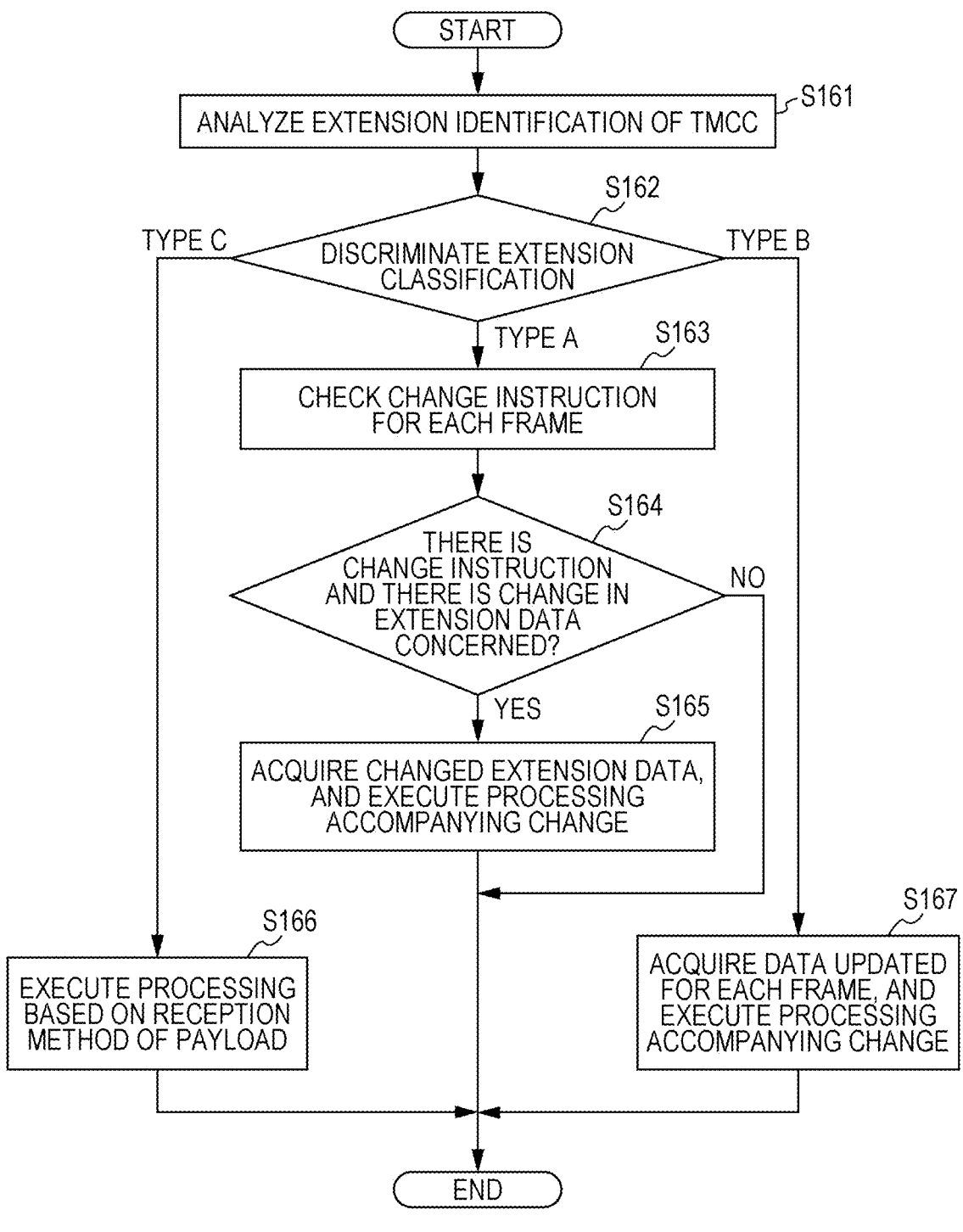
FIG. 26 is a flowchart illustrating an operation of the reception apparatus according to the second exemplary embodiment.

A functional configuration and operation flow of the reception apparatus as described above will be described. FIG. 25 is a block diagram illustrating the functional configuration of the reception apparatus according to the second exemplary embodiment. FIG. 26 is a diagram illustrating the operation flow of the reception apparatus according to the second exemplary embodiment. Note that, in the following description, the extension classification includes three types, Type A, Type B, and Type C, as described above.

As illustrated in FIG. 25, reception apparatus 40 includes extension identifier 41, extension classification determiner 42, change instruction checker 43, data update checker 44, and update data acquirer 45.

First, extension identifier 41 analyzes the extension identification of the TMCC control information (S161). When the extension identification is other than all 0 here, extension identifier 41 determines that the extension area is effective, and reception apparatus 40 executes the following processing for each extension area.

Next, extension classification determiner 42 discriminates (determines) the extension classification (S162). When it is discriminated that the extension classification is Type A (Type A in S162), data of an area specified by the extension area length is control information which does not change in value for each frame, the control information following the change instruction. Therefore, change instruction checker 43 checks the change instruction for each frame (S163).

Subsequently, data update checker 44 determines data update (S164). When it is determined that there is a change instruction and that there is a change in the extension data (Yes in S164), update data acquirer 45 acquires updated extension data and executes processing accompanying the change (S165).

On the other hand, when it is not determined as described above in step S164 (No in S164), update data acquirer 45 determines that there is no change in the extension data.

In addition, when it is discriminated in step S162 that the extension classification is Type B (Type B in S162), update data acquirer 45 references data specified by the extension area length, acquires data updated for each frame, and executes processing accompanying the change (S167).

When it is discriminated in step S162 that the extension classification is Type C (Type C in S162), update data acquirer 45 executes processing based on the conventional reception method under the payload extension scheme (S166).

Note that, when it is discriminated that the extension area number, extension classification, and extension area length are classifications similar to Type A that follows the change instruction as described above, update data acquirer 45 checks change instructions. When there is a change instruction, update data acquirer 45 checks whether information is updated.

Note that reception apparatus 40 may determine reception processing based on the extension classification, and may determine in which processing block the data processing should be performed. Reception apparatus 40 may determine, for example, to process the data of Type A and the data of Type B by hardware, and to process the data of Type C by software.

Advantageous Effects, Etc.

As described above, the second exemplary embodiment has described the method for dividing the TMCC extension area under the advanced BS transfer scheme for each extension classification, and for storing the extension data in the TMCC extension area. Reception apparatus 40 determines the extension data processing method based on the extension classification.

Accordingly, the TMCC extension area can store a plurality of pieces of data with different reception processing simultaneously. That is, the present disclosure makes it possible to provide extensibility to the method for using the TMCC extension area.

Specifically, for example, the TMCC extension area can store the payload and the reference clock information simultaneously.

In addition, it is possible to cause the payload data extending over several frames and the payload data of one frame to be included together in the TMCC extension area. Accordingly, even when it is difficult to receive the payload data extending over several frames, reception apparatus 40 can first acquire the payload data of one frame. Therefore, reception apparatus 40 can acquire and present urgent information more quickly.

Third Exemplary Embodiment

A third exemplary embodiment describes a method for transmitting a plurality of pieces of reference clock information that belong to different layers.

SUMMARY

FIG. 27 is a diagram schematically illustrating an example in which the pieces of reference clock information are stored in the respective plurality of layers.

In FIG. 27, a first layer is a layer upper than a second layer, and the first layer stores first reference clock information. The second layer stores second reference clock information.

A transmission apparatus performs MUX processing in the second layer after performing MUX processing in the first layer. In addition, a reception apparatus performs DEMUX processing in the first layer after performing DEMUX processing in the second layer.

When storing the first reference clock information in the first layer and storing the second reference clock information in the second layer, as information that indicates a relationship between the first reference clock information and the second reference clock information, the transmission apparatus stores, for example, the following information.

As a first example, the transmission apparatus allows a transmission signal (for example, a transfer frame) to include information indicating that the plurality of pieces of reference clock information is stored within the transmission signal.

Specifically, in at least one or more layers among the layers in which the reference clock information is contained, the transmission apparatus stores information indicating that the reference clock information is stored also in layers other than the aforementioned layers.

In addition, in a layer in which the reference clock information is not contained, the transmission apparatus may indicate that the plurality of pieces of reference clock information is stored. For example, the transmission apparatus may store, in the lower layer (second layer), information that indicates whether the reference clock information is contained in the upper layer (first layer). The reception apparatus may determine whether to perform acquisition of the reference clock information and reproduction of a reference clock in the lower layer in processing of the lower layer taking into consideration whether the reference clock information is contained in the upper layer.

As a second example, the transmission apparatus allows the transmission signal to include information regarding the first reference clock information and the second reference clock information.

Specifically, the transmission apparatus stores, in each layer, information that indicates a type of reference clock information contained in the layer. Alternatively, the transmission apparatus stores, in each layer, information that indicates a type of reference clock information contained in a layer other than the aforementioned layer.

The reference clock information is, for example, a plurality of types of information, such as 32-bit NTP, 64-bit NTP, and 24-bit SMPTE (Society of Motion Picture and Television Engineers) time code. The information that indicates the type of reference clock information is information that can specify a format (including information such as precision) of the reference clock information.

Note that, when it is known in advance that a predetermined type of reference clock information is contained, the layer does not need to contain the information that indicates the type of reference clock information.

As a third example, the transmission apparatus allows the transmission signal to include information that indicates a relative relationship between the first reference clock information and the second reference clock information.

Specifically, the transmission apparatus allows the transmission signal to include information that indicates a relative relationship of precision of the reference clock information. For example, the transmission apparatus allows the transmission signal to include information that indicates whether precision of the second reference clock information is high or low with respect to precision of the first reference clock information.

In addition, the information that indicates the relative relationship may be information that indicates the relative relationship based on size of a total bit number of the reference clock information, and may be information that indicates the relative relationship of a dynamic range based on size of a bit number of an integer part.

Alternatively, the information that indicates the relative relationship may be information that indicates the relative relationship of precision of resolving power (resolution) based on size of a bit number of a decimal part. In addition, the information that indicates the relative relationship may be information that indicates the relative relationship of precision at a time of acquisition of the reference clock information, based on a difference in precision resulting from a difference in reliability of the reference clock information in the transmission apparatus, quality of a transfer channel, and throughput in transmission processing and reception processing.

In addition, the information that indicates the relative relationship may be information that indicates a difference in precision between the pieces of reference clock information. For example, when there is a difference in the decimal bit number, the information that indicates the relative relationship may be information that indicates the difference in the decimal bit number. The information that indicates the relative relationship may be information that indicates information that indicates whether the precision differs for each. When the precision differs for each, the information that indicates the relative relationship may be stored. Note that, when the relative relationship of precision is known in advance, the information that indicates the relative relationship of precision does not need to be included.

By the transmission apparatus transmitting the information that indicates the relative relationship of precision, when the transmitted information indicates that precision of the second reference clock information is low with respect to precision of the first reference clock information, the reception apparatus can perform control including avoiding performing acquisition and reproduction of the second reference clock information, performing acquisition and reproduction of the first reference clock information, and performing synchronous reproduction based on the first reference clock information. Alternatively, when the transmitted information indicates that precision of the second reference clock information is high with respect to precision of the first reference clock information, the reception apparatus can perform control including avoiding performing acquisition and reproduction of the first reference clock information, performing acquisition and reproduction of the second reference clock information, and performing synchronous reproduction based on the second reference clock information.

As a fourth example, the transmission apparatus allows the transmission signal to include information that indicates a relative relationship of time between the pieces of reference clock information. Specifically, the transmission apparatus transmits information that indicates relative time between the first reference clock information and the second reference clock information. For example, the transmission apparatus transmits the information that indicates relative time by using CRI_descriptor in an MMT scheme. Note that information that indicates whether the first reference clock information and the second reference clock information are generated based on an identical reference clock may be included in the transmission signal.

When each of the pieces of reference clock information is generated based on an identical reference clock, in the reception apparatus, a difference may arise in acquisition timing between the first reference clock information and the second reference clock information. That is, a fixed time difference arises between End-to-End delays of respective pieces of reference clock information.

Therefore, the transmission apparatus calculates a time difference $\Delta\_A$ between imparting timing of the first reference clock information and imparting timing of the second reference clock information, and stores the calculated time difference $\Delta\_A$ in the transmission signal as time corresponding to acquisition timing of the first reference clock information and the second reference clock information. The reception apparatus acquires the time difference $\Delta\_A$ from the transmission signal, and corrects the End-to-End delay difference between the first reference clock information and the second reference clock information based on the time difference $\Delta\_A$.

In addition, when each piece of the first reference clock information and the second reference clock information is generated based on the reference clock of an identical format and when each piece of the first reference clock information and the second reference clock information has a fixed delay difference $\Delta\_B$, the transmission apparatus stores and transmits information that indicates the fixed delay difference $\Delta\_B$ of the reference clock information. The reception apparatus acquires the delay difference $\Delta\_B$, and corrects the fixed delay difference of the reference clock based on the delay difference $\Delta\_B$.

In addition, when the reference clock on which each piece of the first reference clock information and the second reference clock information is based has the fixed delay $\Delta\_B$, the transmission apparatus transmits a transmission signal that includes the fixed delay $\Delta\_B$ in the second layer, which is a lower layer.

In addition, when each piece of the first reference clock information and the second reference clock information is generated based on the reference clock of an identical format, the second reference clock information may be represented with a difference from the first reference clock information based on the first reference clock information. Note that the first reference clock information may be represented with a difference from the second reference clock information based on the second reference clock information.

As a fifth example, when the plurality of pieces of reference clock information is stored, the transmission apparatus allows the transmission signal to include information on whether to use the reference clock information stored in a different layer. The transmission apparatus allows the transmission signal to include, for example, information as to instructions to use, in the first layer, the second reference clock information stored in the second layer. Based on the information included in the transmission signal, the reception apparatus can generate the second reference clock information and output the generated second reference clock information in the first layer.

The information described above is stored in at least one or more layers. For example, regarding the information described above, the above-described information may be stored in the first layer among the plurality of layers, may be stored in the second layer, and may be stored in the first layer and the second layer. In addition, regarding the information described above, in each layer, information regarding the reference clock information in the layer may be stored, and information that indicates the relative relationship may be stored in at least one or more layers.

Note that the information that indicates the relative relationship is preferably stored in the lower layer (second layer). In addition, the information that indicates the relative relationship may be stored in a layer lower than the second layer (not illustrated in FIG. 27). The reception apparatus, which can acquire information regarding the reference clock information in the upper layer (first layer) when performing DEMUX processing in the lower layer (second layer), can perform higher-speed processing.

Note that a combination of the first layer and the second layer may be any combination. For example, the combination of the first layer and the second layer may be a combination of an MMT layer and an IP layer, a combination of an MMT layer and a transfer layer, and a combination of an IP layer and a transfer layer. In addition, for MMToverTS, the combination of the first layer and the second layer may be a combination of MMT and TS.

In addition, the information described above is stored in a control signal of each layer. For example, under the MMT scheme, the information described above is stored in a descriptor, table, message, or packet header information. Under an MPEG2-TS scheme, the information described above is stored in a descriptor, table, section, or header information. In addition, the information described above may be stored in TMCC or a slot header in the transfer layer. When a transfer scheme is DVB (Digital Video Broadcasting), the information described above is stored in TPS (Transmission Parameters Signaling), L1 data, L2 data, P1 data, P2 data, and the like.

Note that the first reference clock information and the second reference clock information may be pieces of reference clock information of an identical type, and may be pieces of reference clock information of different types. In addition, the first reference clock information and the second reference clock information may be pieces of reference clock information with different precision. The first reference clock information and the second reference clock information may be pieces of reference clock information based on an identical reference clock, and may be pieces of reference clock information based on different reference clocks.

In addition, the transmission apparatus may transmit three or more pieces of reference clock information, and may store the three or more pieces of reference clock information in three or more respective layers for transmission. In addition, the transmission apparatus may store the respective pieces of reference clock information in different fields within data structure in an identical layer. In addition, another layer may exist between the first layer and the second layer.

The reference clock information, which is, for example, NTP, time code, and PTP (Precision Time Protocol), may be reference clock information other than these examples. In addition, the reference clock information may be another piece of information regarding time (for example, TOT (Time Offset Table) and TDT (Time Date Table)).

FIG. 28 is a diagram schematically illustrating an example in which a plurality of pieces of reference clock information is stored in one layer. In FIG. 28, the first layer contains three pieces of reference clock information, that is, first reference clock information, second reference clock information, and third reference clock information.

The transmission apparatus may store information regarding the first reference clock information and the second reference clock information, information that indicates a relative relationship (of precision or time) between the first reference clock information and the second reference clock information, and the like.

Figures 29, 30:
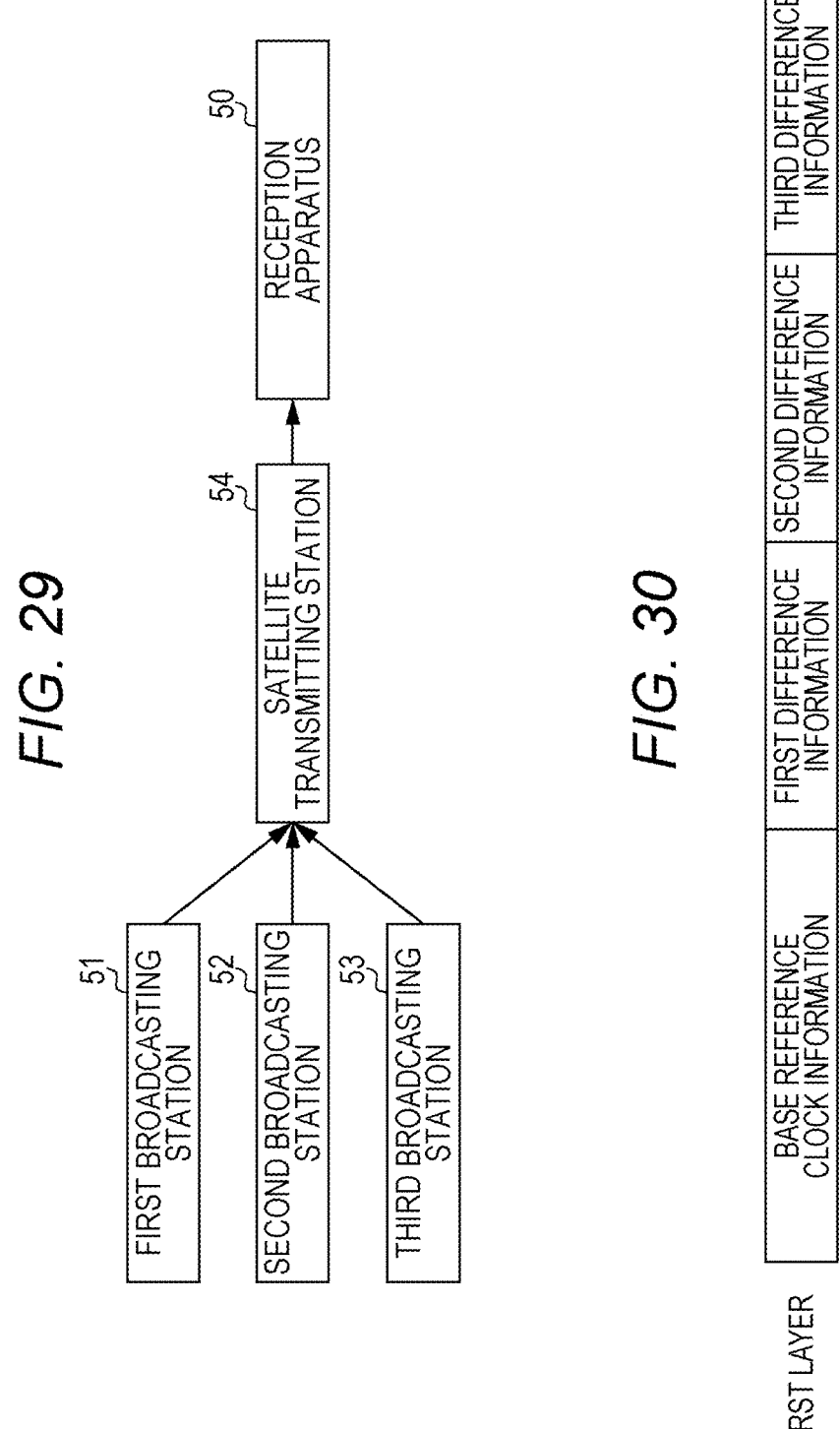
FIG. 29 is a block diagram illustrating an example in which data of different broadcasting station apparatuses is stored in separate streams.
FIG. 30 is a diagram illustrating one example of a transmission method of difference information.

As one example, a case will be described of storing a plurality of pieces of reference clock information in TMCC. As described in FIG. 17, a broadcasting station apparatus may transmit 16 streams under an advanced BS transfer scheme, and it is assumed that, for example, pieces of data generated by different broadcasting station apparatuses are stored in separate streams. FIG. 29 is a block diagram for describing an example in which the pieces of data generated by different broadcasting station apparatuses are stored in separate streams.

In FIG. 29, each of first broadcasting station apparatus 51, second broadcasting station apparatus 52, and third broadcasting station apparatus 53 transmits data generated in each broadcasting station apparatus to satellite transmitting station apparatus 54 by using cables, such as an optical network, and radio. Satellite transmitting station apparatus 54 multiplexes the streams of respective broadcasting station apparatuses into an identical transfer channel under the advanced BS transfer scheme. Satellite transmitting station apparatus 54 stores in TMCC the pieces of reference clock information corresponding to the respective streams of the first, second, and third broadcasting station apparatuses, and transfers the pieces of reference clock information to reception apparatus 50.

In FIG. 28, the first reference clock information corresponds to the reference clock information of first broadcasting station apparatus 51, the second reference clock information corresponds to the reference clock information of second broadcasting station apparatus 52, and the third reference clock information corresponds to the reference clock information of third broadcasting station apparatus 53.

In a case where each broadcasting station apparatus performs processing based on common reference clock information, such as NTP, in satellite transmitting station apparatus 54, the pieces of reference clock information in respective broadcasting station apparatuses 51, 52, 53 have a time difference due to a difference in the End-to-End delay caused by a reception processing delay or a transfer delay until arrival at satellite transmitting station apparatus 54.

When the common reference clock information to be used in respective broadcasting station apparatuses 51, 52, 53 is NTP_base, the first reference clock information in satellite transmitting station apparatus 54 is denoted as NTP_base+Δ1, the second reference clock information is denoted as NTP_base+Δ2, and the third reference clock information is denoted as NTP_base+Δ3.

FIG. 30 is a diagram for describing a transmission method of pieces of difference information. In FIG. 30, the transmission apparatus (satellite transmitting station apparatus 54) may transmit the common reference clock information NTP_base, and may transmit the pieces of difference information between respective pieces of reference clock information and the common reference clock information (Δ1, Δ2, Δ3). In addition, for example, out of 64-bit reference clock information, by representing base reference clock information with top 16 bits, and representing the difference information with remaining 48 bits, the transmission apparatus can reduce an amount of information (size) for transferring the reference clock information.

Note that the base reference clock information (reference value) does not need to be NTP_base, but may be the earliest (with small delay) reference clock information among the plurality of pieces of reference clock information. Alternatively, the base reference clock information (reference value) may be a value smaller than a value of the earliest reference clock information.

In addition, FIG. 31 is a diagram for describing a variation of the transmission method of the difference information. In FIG. 31, the base reference clock information and the difference information may be transmitted at different frequencies; for example, the base reference clock information is transmitted for every frame, and the difference information is transmitted in order for every three frames. By the transmission method in FIG. 31, the transmission apparatus can reduce the amount of information (size) for transferring the reference clock information.

Reception apparatus 50 uses the base reference clock information to reproduce the base reference clock. After reproduction of the base reference clock information, reception apparatus 50 may use the difference information to generate each reference clock.

[Detailed Configuration and Operation Flow]

Figure 32:
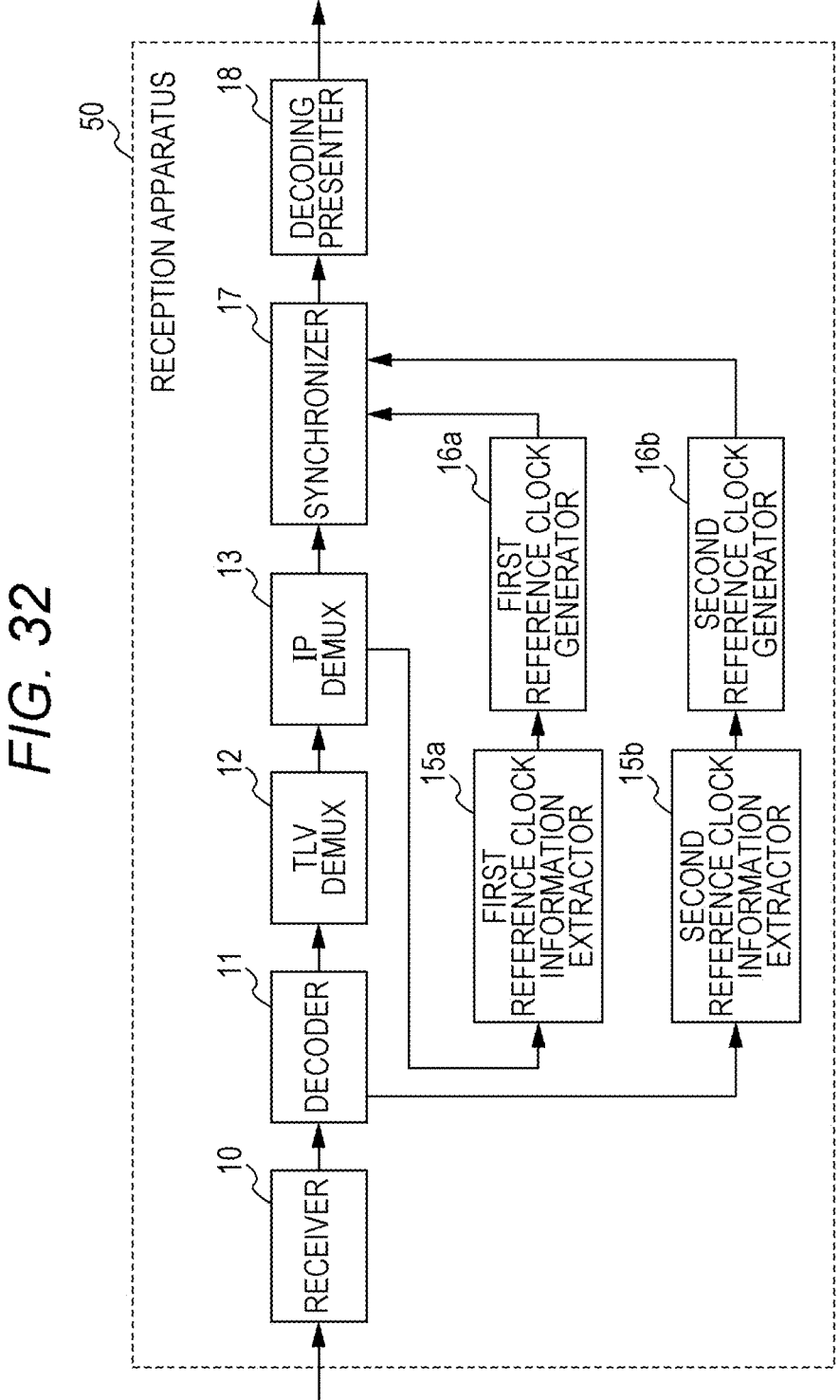
FIG. 32 is a block diagram illustrating a functional configuration of a reception apparatus according to a third exemplary embodiment.
Figure 33:
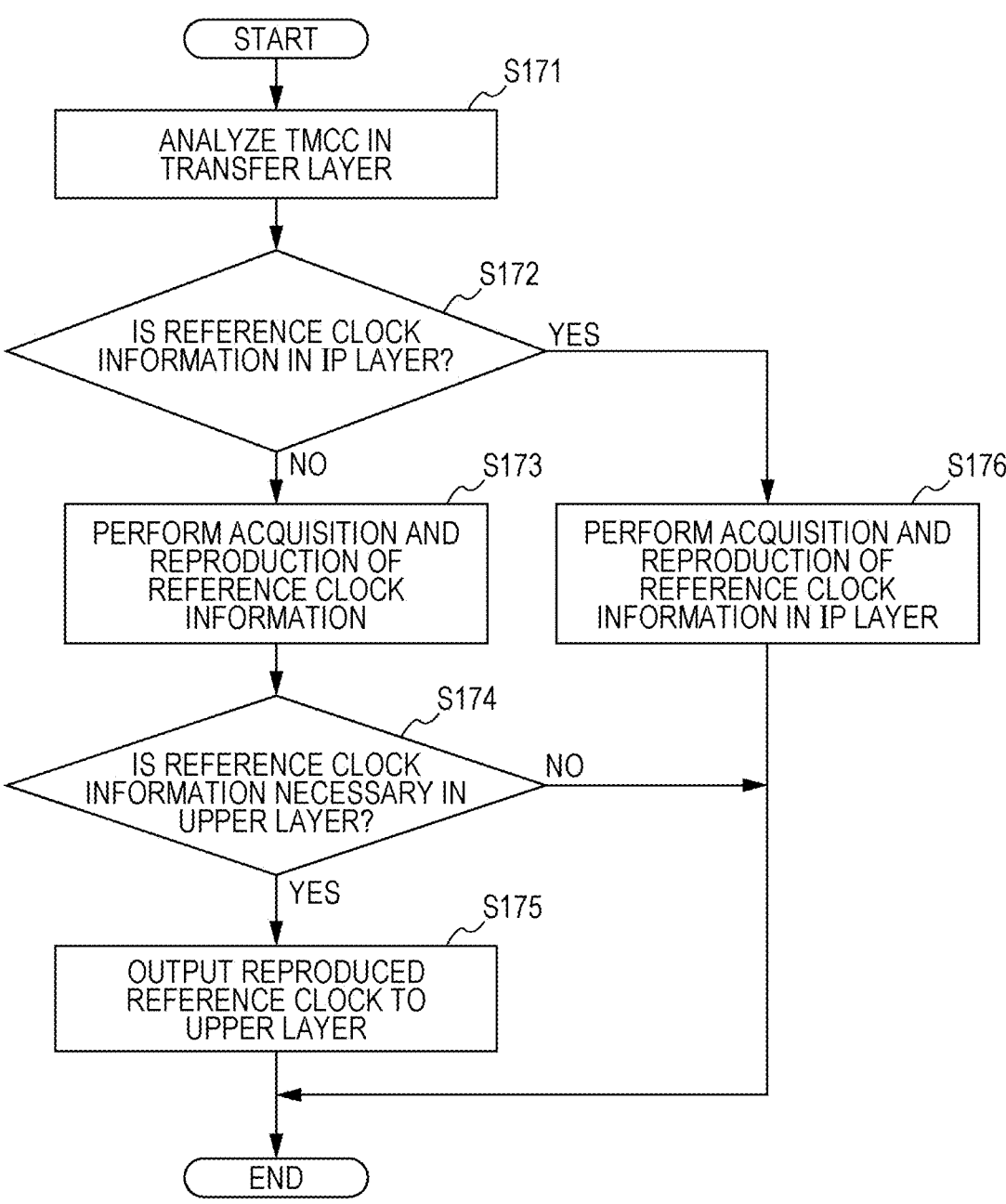
FIG. 33 is a flowchart illustrating an operation of the reception apparatus according to the third exemplary embodiment.

Here, a functional configuration and operation flow of reception apparatus 50 will be described. FIG. 32 is a block diagram illustrating the functional configuration of reception apparatus 50. FIG. 33 is a diagram illustrating the operation flow of reception apparatus 50. Here, the following describes an example in which the reference clock information is stored in either one of the IP layer and the transfer layer, and based on the reference clock information in either layer, reception apparatus 50 reproduces the reference clock.

Reception apparatus 50 includes receiver 10, decoder 11, TLV demultiplexer 12, IP demultiplexer 13, MMT demultiplexer 14, synchronizer 17, and decoding presenter 18. In addition, reception apparatus 50 includes first reference clock information extractor 15a, second reference clock information extractor 15b, first reference clock generator 16a, and second reference clock generator 16b.

Control information of the transfer layer (such as slot header and TMCC, herein TMCC) stores a flag that indicates whether the reference clock information is in the IP layer. In addition, when there is no reference clock information in the IP layer, the control information of the transfer layer stores the reference clock information.

In addition, the control information of the transfer layer stores, when there is no reference clock information in the IP layer, a flag that indicates whether the reference clock information acquired in the transfer layer is necessary for processing in the upper layer, or a flag that indicates whether the reproduced reference clock information is necessary for processing in the upper layer.

For example, when the reference clock information is 64-bit NTP, NTP is stored in a 64-bit field that indicates reference clock information. In addition, a flag that indicates whether the reference clock information is in the IP layer may be provided in the field for reference clock information. Since the transfer layer does not need to store the reference clock information when the reference clock information is stored in the IP layer, the field may be utilized.

For example, when the reference clock information is in the IP layer and a predetermined value (for example, ALL 1) is in the field for reference clock information, reception apparatus 50 determines that the value is not reference clock information but is the flag that indicates that the reference clock information is in the IP layer. Alternatively, a value based on a predetermined rule may be used as a flag; for example, when ALL 1 is indicated once in the field for reference clock information, reception apparatus 50 determines that the reference clock information is in the field, and when ALL 1 is indicated continuously more often than a predetermined number of times, reception apparatus 50 determines that the reference clock information is in the IP layer.

Decoder 11 of reception apparatus 50 analyzes TMCC, which is control information, in the transfer layer, and analyzes various flags and the reference clock information (S171). Then, decoder 11 makes a determination based on the aforementioned flags (S172). When it is determined that the reference clock information is not in the IP layer (the reference clock information is in the transfer layer) (No in S172), second reference clock information extractor 15b acquires (extracts) the reference clock information in the transfer layer, and second reference clock generator 16b reproduces (generates) the reference clock.

Next, decoder 11 makes a determination on whether the reference clock reproduced in the transfer layer is necessary for processing in the upper layer (S174). When it is determined that the reference clock reproduced in the transfer layer is necessary for processing in the upper layer (Yes in S174), second reference clock generator 16b outputs the reference clock reproduced in step S174 to the upper layer (S175). When it is not determined that the reference clock reproduced in the transfer layer is necessary for processing in the upper layer (No in S174), the processing ends.

On the other hand, when it is determined that the reference clock information is in the IP layer (the reference clock information is not in the transfer layer) (Yes in S172), decoder 11 does not perform acquisition of the reference clock information and reproduction of the reference clock in the transfer layer. In this case, first reference clock information extractor 15a and first reference clock generator 16a respectively perform acquisition of the reference clock information and reproduction of the reference clock in the IP layer (S176).

Note that, when reproduction of the reference clock is not necessary in the transfer layer, and when the upper layer does not need the reference clock, decoder 11 does not need to perform acquisition of the reference clock information and reproduction of the reference clock in the transfer layer (S173).

In addition, when the reference clock is necessary in the upper layer, instead of outputting the reproduced reference clock, reception apparatus 50 may pass the reference clock information to the upper layer, and perform reproduction of the reference clock in the upper layer. In addition, based on the reference clock reproduced in the transfer layer, reception apparatus 50 may newly generate reference clock information, and may output the generated reference clock information to the upper layer.

Methods for outputting the reference clock to the upper layer include a method for outputting the reproduced reference clock as it is, and a method for storing or converting and outputting the acquired reference clock information or the newly generated reference clock information into data structure to be output to the upper layer.

[Another Example of Operation Flow]

Figure 34:
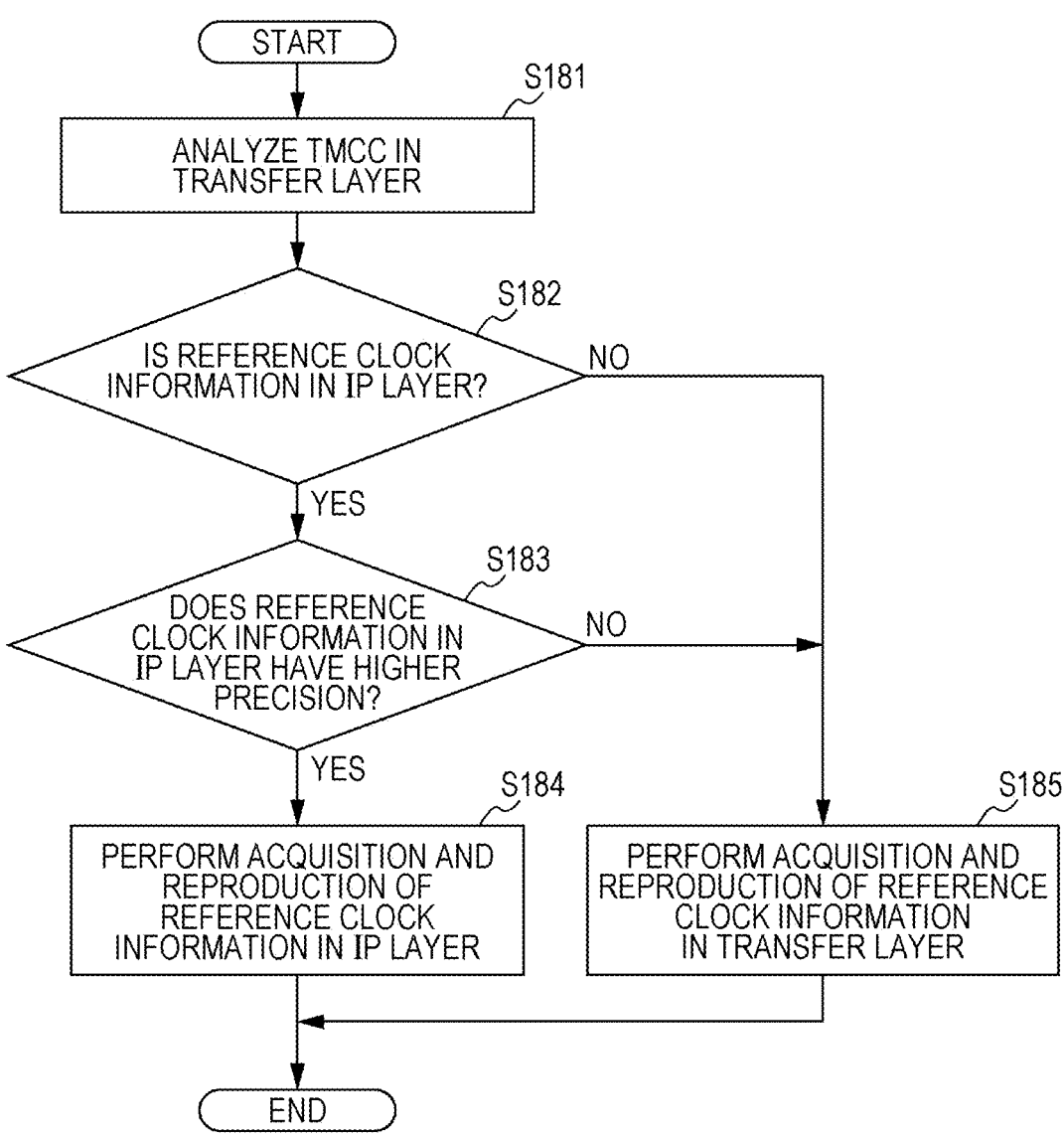
FIG. 34 is a flowchart illustrating another operation of the reception apparatus according to the third exemplary embodiment.

Next, another operation flow of reception apparatus 50 will be described. FIG. 34 is a diagram illustrating another operation flow of reception apparatus 50. Note that the configuration of reception apparatus 50 is similar to the configuration of FIG. 32.

In FIG. 34, the reference clock information is stored in each of the IP layer and the transfer layer. When a plurality of pieces of reference clock information is stored, relative information on precision of the pieces of reference clock information is stored in either layer.

Decoder 11 analyzes TMCC (S181) and makes a determination based on the flags (S182). When it is determined that the reference clock information is not in the IP layer (No in S182), decoder 11 performs acquisition of the reference clock information and reproduction of the reference clock in the transfer layer (S185).

On the other hand, when it is determined in step S182 that the reference clock information is in the IP layer (Yes in S182), decoder 11 determines which of the reference clock information in the transfer layer and the reference clock information in the IP layer has higher precision (S183). When it is determined that precision of the reference clock information in the IP layer is higher than precision of the reference clock information in the transfer layer (Yes in S183), decoder 11 performs acquisition of the reference clock information and reproduction of the reference clock in the IP layer (S184). When it is determined that precision of the reference clock information in the IP layer is lower than precision of the reference clock information in the transfer layer (No in S183), decoder 11 performs acquisition of the reference clock information and reproduction of the reference clock in the transfer layer (S185).

Advantageous Effects, Etc.

As described above, the transmission apparatus may transmit a plurality of pieces of reference clock information in one or more layers. When the plurality of pieces of reference clock information is transmitted, reception apparatus 50 may select either one piece of the reference clock information to be used for generation of the reference clock (system clock), and may use both pieces of the reference clock information to generate the reference clock. Reception apparatus 50 may select high-precision reference clock information, and may select reference clock information that can be acquired more quickly.

In addition, when the reference clock information is transmitted in a plurality of layers, the transmission apparatus may store information indicating that the reference clock information is transmitted in the plurality of layers. In addition, the transmission apparatus may transmit, in the lower layer, information indicating that the reference clock information is transmitted in the plurality of layers, or information related to the layers or protocols in which the reference clock information is transmitted. Furthermore, the transmission apparatus may transmit information that indicates a relationship between the pieces of reference clock information stored in different layers.

Reception apparatus 50 can determine that the reference clock information is contained in the upper layer during DEMUX processing in the lower layer, and can decide which reference clock information to use based on this determination. Reception apparatus 50 may decide which reference clock information to use based on which layer of reference clock reproduction reception apparatus 50 supports, and recommended reference clock reproduction may be specified by broadcasting station apparatuses.

When the reference clock information is transmitted in the plurality of layers, reception apparatus 50 may extract the reference clock information in the lower layer, and may extract, from the lower layer, the reference clock information contained in the upper layer. Then, reception apparatus 50 may use at least one or more pieces of extracted reference clock information to generate the reference clock.

Here, the transmission apparatus may transmit the plurality of pieces of reference clock information through a plurality of transfer channels. The transmission apparatus may transmit the plurality of pieces of reference clock information through the plurality of transfer channels, and may transmit information related to the transfer channels through which the reference clock information is transferred.

Other Exemplary Embodiments

While the exemplary embodiments have been described above, the present disclosure is not limited to the aforementioned exemplary embodiments.

For example, it is assumed that, in addition to the conventional 32-bit short-format NTP contained in the MMT packet header, higher-precision reference clock information is transmitted. In such a case, the transmission apparatus further transmits information for allowing the reception apparatus to use the high-precision reference clock information to reproduce the 32-bit short-format NTP. The aforementioned information is, for example, time information indicating a relative relationship between each of clocks, and a configuration for transmitting the information by using CRI_descriptor( ) etc. may be considered.

Note that, when the reception apparatus can reproduce the 32-bit short-format NTP, the reception apparatus does not need the conventional NTP field contained in the MMT packet header. Therefore, the transmission apparatus may store another piece of information in the NTP field, and may perform header compression processing by reducing the NTP field. When the header compression processing is performed, the transmission apparatus transmits information indicating that the NTP field is reduced. When the NTP field is reduced, the reception apparatus generates the reference clock by using another piece of reference clock information, and reproduces the 32-bit short-format NTP.

In addition, when the MMT packet is transferred using a communication transfer channel, the reception apparatus may use not the reference clock information but the 32-bit short-format NTP for QoS control. Accordingly, the transmission apparatus does not need to transmit the reference clock information through the communication transfer channel. In addition, when the End-to-End delay of the communication transfer channel is within a certain value, the reception apparatus may use the reference clock information for clock reproduction.

Note that, although the aforementioned first exemplary embodiment has described the case where the MMT/IP/TLV scheme is used as an example, schemes other than the MMT scheme may be used as a multiplexing scheme. For example, the present disclosure may also be applied to an MPEG2-TS scheme, RTP (Real-time Transport Protocol) scheme, or MPEG-DASH (Dynamic Adaptive Streaming over HTTP) scheme.

In addition, methods for header compression processing of IP packets may be RoHC (Robust Header Compression) and HCfB (Header Compression for Broadcasting).

Schemes for storing IP packets in broadcast may be a GSE (Generic Stream Encapsulation) scheme and IPoverTS scheme using ULE (Unidirectional Light-weight. Encapsulation) in addition to the TLV scheme.

The present disclosure may be applied to a case where any of such schemes is used. Application of the present disclosure allows the reception apparatus to achieve shortening of time to the acquisition of the reference clock information and reduction in the processes, and to achieve high precision of the clock by hardware implementation.

Note that, while the reference clock information in the aforementioned exemplary embodiments is NTP when the multiplexing scheme is MMT, for example, the reference clock information is PCR (Program Clock Reference) when the multiplexing scheme is the MPEG2-TS scheme. In addition, when the multiplexing scheme is MMT, the transmission apparatus may transfer PTP prescribed by IEEE 1588 in an NTP form, and may transfer part of bits of NTP. That is, the reference clock information may be information indicating time that is set by the transmission apparatus. Note that NTP does not mean an NTP value in an NTP server commonly used on the Internet.

Figures 35, 36:
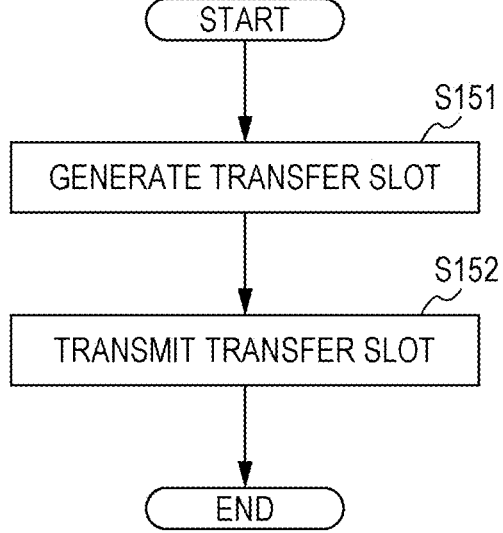
FIG. 35 is a block diagram illustrating a functional configuration of a transmission apparatus.
FIG. 36 is a flowchart illustrating an operation of the transmission apparatus.

In addition, the present disclosure may be implemented as a transmission apparatus (transmission method) that transmits the transfer slot that stores the reference clock information by the aforementioned method. A configuration of the transmission apparatus will be supplemented below. FIG. 35 is a block diagram illustrating a functional configuration of the transmission apparatus. FIG. 36 is an operation flow of the transmission apparatus.

In FIG. 35, transmission apparatus 30 includes generator 31 and transmitter 32. Note that each component of transmission apparatus 30 is specifically implemented by a microcomputer, a processor, a dedicated circuit, or the like.

Transmission apparatus 30 is specifically a broadcasting server, and is an example of the aforementioned "transmission apparatus" of the first exemplary embodiment.

Generator 31 generates, for example, a transfer slot that stores a plurality of slots that each store one or more TLV packets that each store an IP packet (S151 of FIG. 36).

Generator 31 allows the IP packet stored in the TLV packet positioned at a head within the head slot within the transfer slot (hereinafter this IP packet is also referred to as an object IP packet) to contain the first reference clock information, such as NTP, that indicates time for reproduction of content (for example, broadcast content such as video and audio). The object IP packet is an IP packet that does not undergo header compression, and the first reference clock information is stored, for example, within the object IP packet in data structure different from data structure of the MMT packet.

In addition, generator 31 stores the second reference clock information that indicates time for reproduction of content in control information (TMCC) within the transfer slot.

Specifically, generator 31 includes a coder that codes the broadcast content, MMT multiplexer, IP multiplexer, TLV multiplexer, and the like. Here, the TLV packet is an example of a first transfer unit, the slot is an example of a second transfer unit, and the transfer slot is an example of a transfer frame.

Transmitter 32 transmits the transfer slot generated by generator 31 (transfer channel coded data containing the transfer slot) through broadcast (S152 of FIG. 36).

As also described in the aforementioned exemplary embodiments, transmission apparatus 30 can simplify the processes by which the reception apparatus acquires the reference clock information. Therefore, the reception apparatus can shorten time until acquiring the reference clock information.

In addition, by the second reference clock information that indicates time for reproduction of the content being stored in the control information within the frame, the reception apparatus can select which reference clock information to use from among the first reference clock information and the second reference clock information.

Fourth Exemplary Embodiment

The present exemplary embodiment describes a method for passing reference clock information to an upper layer and an interface thereof in a reception apparatus.

Figure 37:
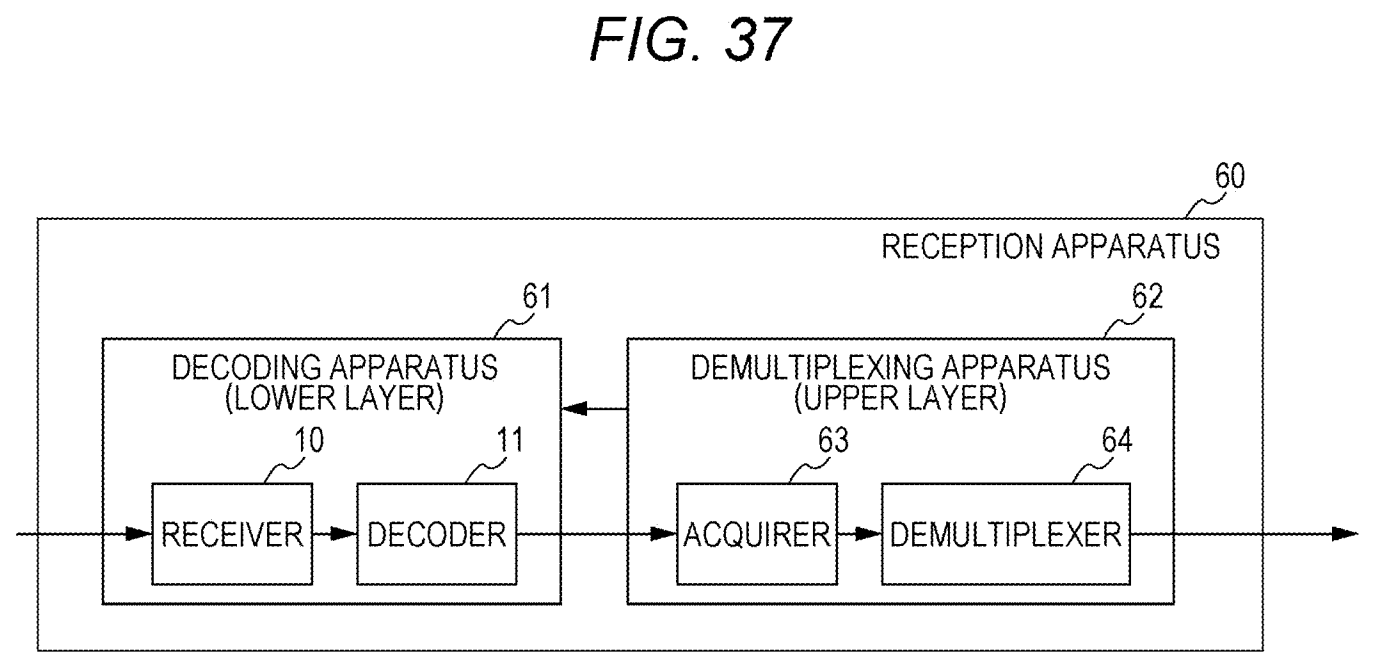

FIG. 37 is a block diagram illustrating a configuration of reception apparatus 60 according to the present exemplary embodiment. Reception apparatus 60 includes decoding apparatus 61 that performs processes in a lower layer and demultiplexing apparatus 62 that performs processes in an upper layer. For example, decoding apparatus 61 and demultiplexing apparatus 62 are formed as different LSIs. Note that decoding apparatus 61 and demultiplexing apparatus 62 may be formed as a single LSI.

Decoding apparatus 61 includes receiver 10 and decoder 11. Receiver 10 receives transfer channel coded data. Decoder 11 extracts a TLV packet by decoding the transfer channel coded data received by receiver 10, and outputs the TLV packet to demultiplexing apparatus 62.

Demultiplexing apparatus 62 includes acquirer 63 and demultiplexer 64. Acquirer 63 acquires the TLV packet that is output from decoding apparatus 61. Demultiplexer 64 demultiplexes the TLV packet. For example, demultiplexer 64 includes processors other than receiver 10 and decoder 11 among processors illustrated in FIG. 32. Note that demultiplexer 64 may include processors other than receiver 10 and decoder 11 among processors included in reception apparatuses described in other exemplary embodiments. In addition, demultiplexer 64 does not need to include all of these processors, and may include some of these processors. In addition, demultiplexing apparatus 62 controls output of decoding apparatus 61.

In FIG. 32 and FIG. 33, when the reference clock information is contained in the lower layer, decoding apparatus 61 of the lower layer outputs the reference clock information to demultiplexing apparatus 62 without outputting a reproduced reference clock to demultiplexing apparatus 62 of the upper layer, and demultiplexing apparatus 62 reproduces the reference clock. This method will be supplemented and details will be described below.

The following describes a method described in NPT 2 (Chapter 3: "Guideline for Time Information Transmission" in ARIB Standard ARIB STD-B44 (Ver. 2.0) "TRANSMIS-SION SYSTEM FOR ADVANCED WIDE BAND DIGI-TAL SATELLITE BROADCASTING"), and transmission and reception of the reference clock based on data structure.

Although the aforementioned standard describes a method for storing the reference clock information in TMCC, this standard does not prescribe specific transmission time information and operations in the reception apparatus, and it is difficult for the reception apparatus to acquire accurate time information. For example, although this standard describes that "the reference clock information to be stored in TMCC is time when this TMCC signal leaves a transmission server", this is not a specific definition.

TMCC control information (TMCC control signal) is generated in a separate system from a main signal of a main line system for each transfer frame in a transmission apparatus. After error correction coding and an interleave process are performed, the TMCC control information is dispersively mapped in the main signal for one frame (the main signal is also a signal after the error correction coding and interleave process are performed).

Figure 38:
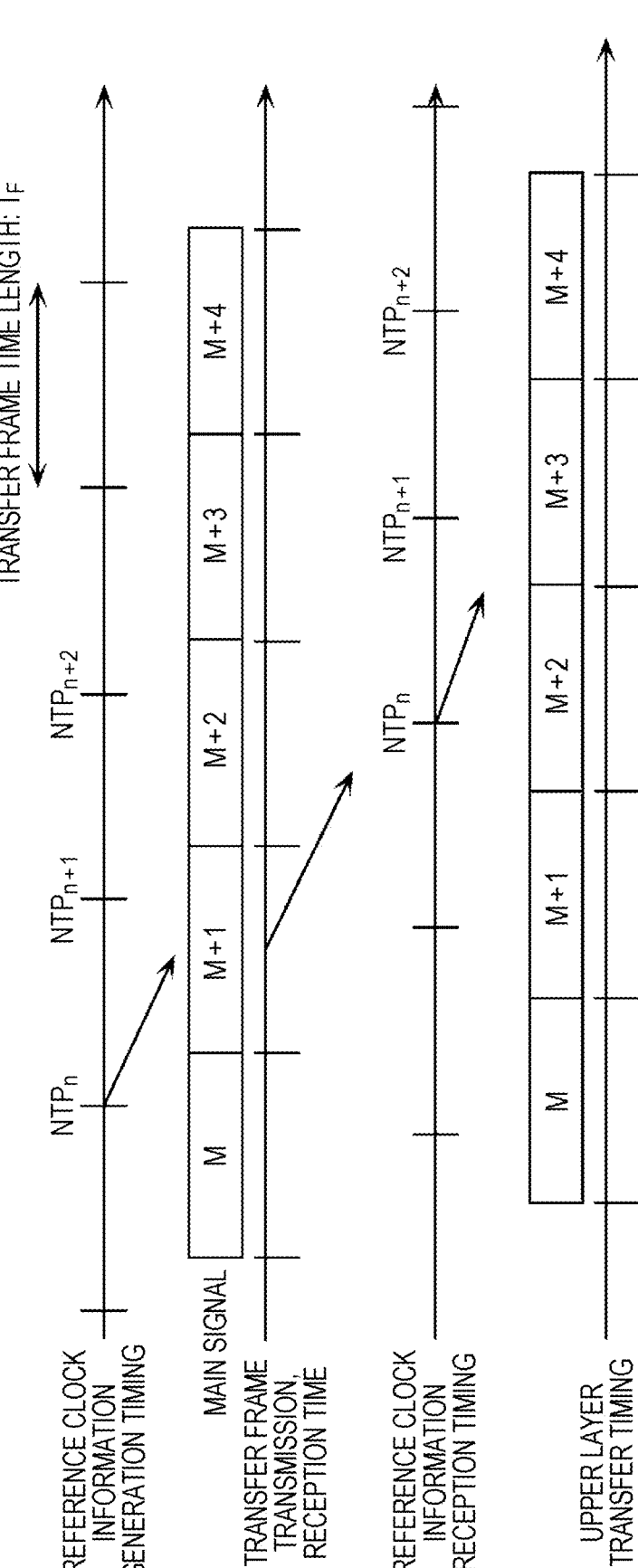
FIG. 38 is a diagram illustrating timing of a main signal and reference clock information according to the fourth exemplary embodiment.

FIG. 38 is a diagram illustrating timing of the main signal and the reference clock information.

When the reference clock information is stored in the TMCC control information, the reference clock information (NPTn, NPTn+1, . . . in FIG. 38) is generated at intervals of a transfer frame time length ($T_F$). After being generated, the reference clock information is transmitted in a transfer frame unit. At this time, during a period from generation of the reference clock information to transmission of the transfer frame, processing delay occurs caused by error correction coding, interleave process, transfer frame transmission timing, and the like. In FIG. 38, NTPn is stored in transfer frame M+1 and transferred, whereas NTPn+1 is stored in transfer frame M+2 and transferred. Here, description is provided assuming that transfer delay is 0 and transmission time and reception time of the transfer frame are identical.

The reception apparatus receives data of one transfer frame, performs the error correction process and deinter-leave process, and then extracts the TMCC control information. Accordingly, reception timing of the reference clock information is delayed by one or more frames.

Similarly, processing delay also occurs in transmission and reception of the main signal of the main line system due to error correction and interleave process.

However, since delay time differs in each of transmission and reception between the main line system and a TMCC control information system, a phenomenon occurs in which it is unclear to which time of the main line system time the time of the reference clock information acquired by the reception apparatus corresponds. In addition, the above standard has no description about prescription for timing at which to store in the upper layer the reference clock information acquired by the reception apparatus.

Therefore, according to the present exemplary embodiment, the reference clock information is stored in the TMCC control information by the following method.

The transmission apparatus sets, for example, time when the transfer frame of the main signal is transmitted from a server (for example, time when a head packet of the transfer frame is transmitted from the server) as the reference clock information to be stored in the TMCC control information.

The reception apparatus stores the reference clock information extracted from the TMCC control information at a head position of the next transfer frame, and then transfers the reference clock information to the upper layer.

By the above-described operation, a relative relationship caused by a difference in processing delay between the main line system and the TMCC control information system is an integral multiple of the transfer frame ($N \times T_F$) (N is an integer).

Furthermore, correction of $N \times T_F$ is performed in order to match a time relationship between the main line system and the reference clock information extracted from the TMCC control information.

When N is uniquely determined in advance, the transmission apparatus may store the time on which the $N \times T_F$ correction is performed in the TMCC control information, and the reception apparatus may correct the time. When N is not uniquely determined, the reception apparatus estimates N and corrects the time.

In addition, when the reference clock information is transferred in the main signal (TLV packet) in addition to the TMCC control information, the transmission apparatus stores, in the TMCC control information, time identical to time to be stored in the TLV packet. Alternatively, the transmission apparatus stores in the TMCC control information the time obtained by performing correction according to $N \times T_F$ on the time to be stored in the TLV packet.

By applying correction of $N \times T_F$ to time information extracted from the TMCC control information, the reception apparatus calculates the time identical to the time to be stored in the main signal, and outputs the calculated time to the upper layer.

Note that as a method for extracting the reference clock information from the TMCC control information and transferring the corrected reference clock information to the upper layer, the reception apparatus may replace and output the reference clock information within the TLV packet.

In addition, since time that serves as reference is identical between in the reference clock information stored in the TMCC control information and in the reference clock information stored in the TLV packet, it is possible to handle these pieces of reference clock information as identical information in the upper layer.

In addition, reception apparatus 60 may switch with a selecting switch or the like between a method for outputting one of the reference clock information stored in the TMCC control information and the reference clock information stored in the TLV packet as a main signal (TLV packet), and a method for outputting both pieces of the information. In addition, demultiplexing apparatus 62 in the upper layer may select this switching in the lower layer. In addition, when decoding apparatus 61 is physically different from demultiplexing apparatus 62, one of the methods may be selected with a register or the like. In addition, when one of the reference clock information stored in the TMCC control information and the reference clock information stored in the TLV packet is output, selection may be made which one to output.

Here, when the reference clock information is transferred in the main signal (TLV packet), the reference clock information is stored in a head TLV packet of a head slot of the TLV stream in the transfer frame. Therefore, decoding apparatus 61 can uniquely identify the TLV packet in which the reference clock information is stored in the transfer layer.

However, since it is difficult for demultiplexing apparatus 62 of the upper layer to know boundary information of the transfer frame, demultiplexing apparatus 62 of the upper layer can determine whether the received TLV packet contains the reference clock information after analysis of the TLV packet header and the IP packet header. Therefore, according to the present exemplary embodiment, decoding apparatus 61 of the lower layer performs signaling (notification) to demultiplexing apparatus 62 of the upper layer such that the TLV packet is a head of the TLV stream in the transfer frame, or that the TLV packet contains the reference clock information. Accordingly, demultiplexing apparatus 62 of the upper layer can detect that the TLV packet contains the reference clock information without analyzing the IP packet header.

Examples of the method for performing signaling that the TLV packet is a head of the TLV stream in the transfer frame or that the TLV packet contains the reference clock information include a method for utilizing an undefined region in a packet type of the TLV packet.

For example, when the reference clock information is contained in an IPv4 packet, decoding apparatus 61 rewrites the TLV type from the TLV type that indicates the IPv4 packet to the TLV type that indicates the IPv4 packet containing the reference clock information. Then, decoding apparatus 61 outputs the rewritten TLV packet to demultiplexing apparatus 62. In addition, when the reference clock information is contained in an IPv6 packet, decoding apparatus 61 rewrites the TLV type from the TLV type that indicates the IPv6 packet to the TLV type that indicates the IPv6 packet containing the reference clock information. Then, decoding apparatus 61 outputs the rewritten TLV packet to demultiplexing apparatus 62.

In addition, reception apparatus 60 may have a switch or the like that allows selection whether decoding apparatus 61 performs signaling to demultiplexing apparatus 62 that the TLV packet contains the reference clock information. For example, this selection may be performed by demultiplexing apparatus 62.

The above processes enable acquisition of high-precision reference clock information and clock reproduction.

Figure 39:
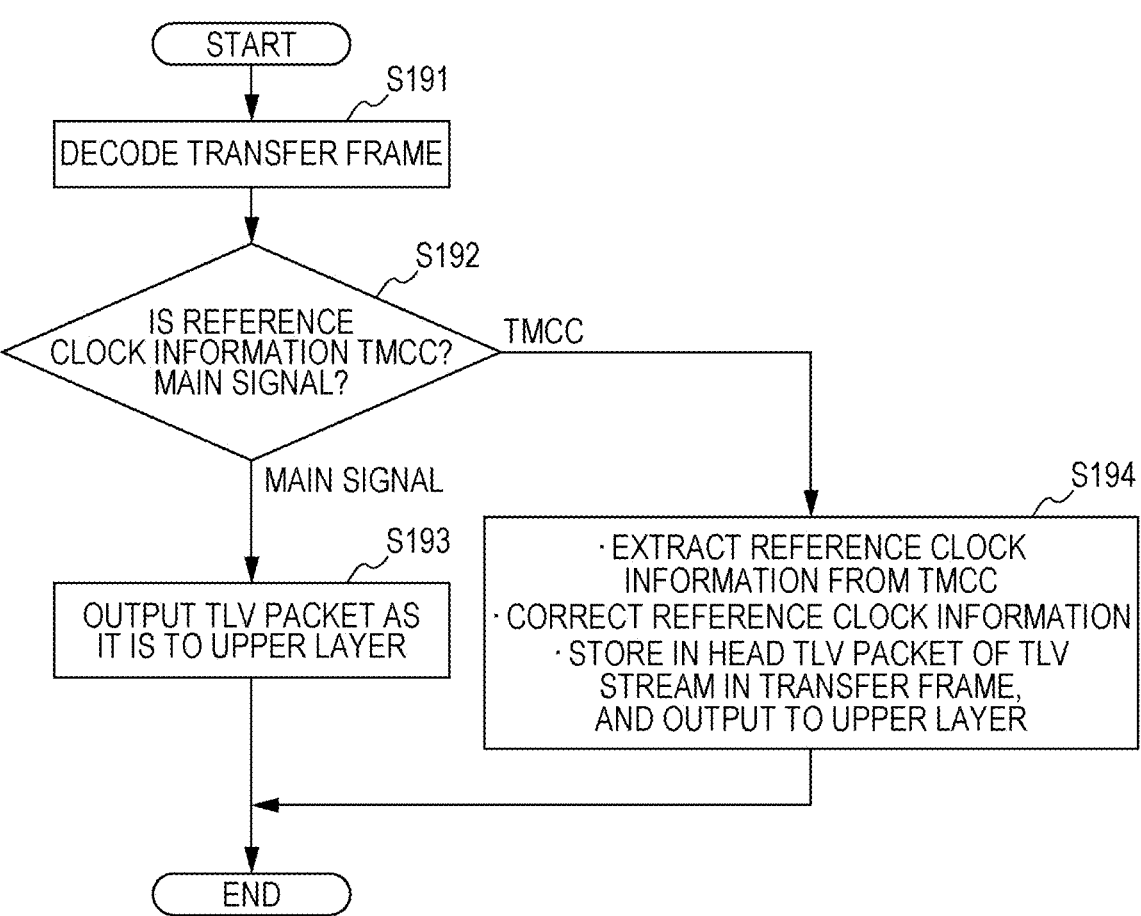
FIG. 39 is a flowchart illustrating an operation of a decoder according to the fourth exemplary embodiment.

FIG. 39 is a diagram illustrating an operation flow in decoder 11 of reception apparatus 60.

First, decoder 11 decodes the transfer frame (S191), and subsequently determines whether the reference clock information to be processed is the reference clock information stored in TMCC or the reference clock information stored in the main signal (S192). When processing the reference clock information stored in the main signal (main signal in S192), decoder 11 outputs the TLV packet as it is to the upper layer (S193). Meanwhile, when processing the reference clock information stored in the TMCC control information (TMCC in S192), decoder 11 extracts the reference clock information from the TMCC control information, corrects the extracted reference clock information, stores the corrected reference clock information in the head TLV packet of the TLV stream in the transfer frame, and outputs the TLV packet to demultiplexing apparatus 62 (S194).

Figure 40:
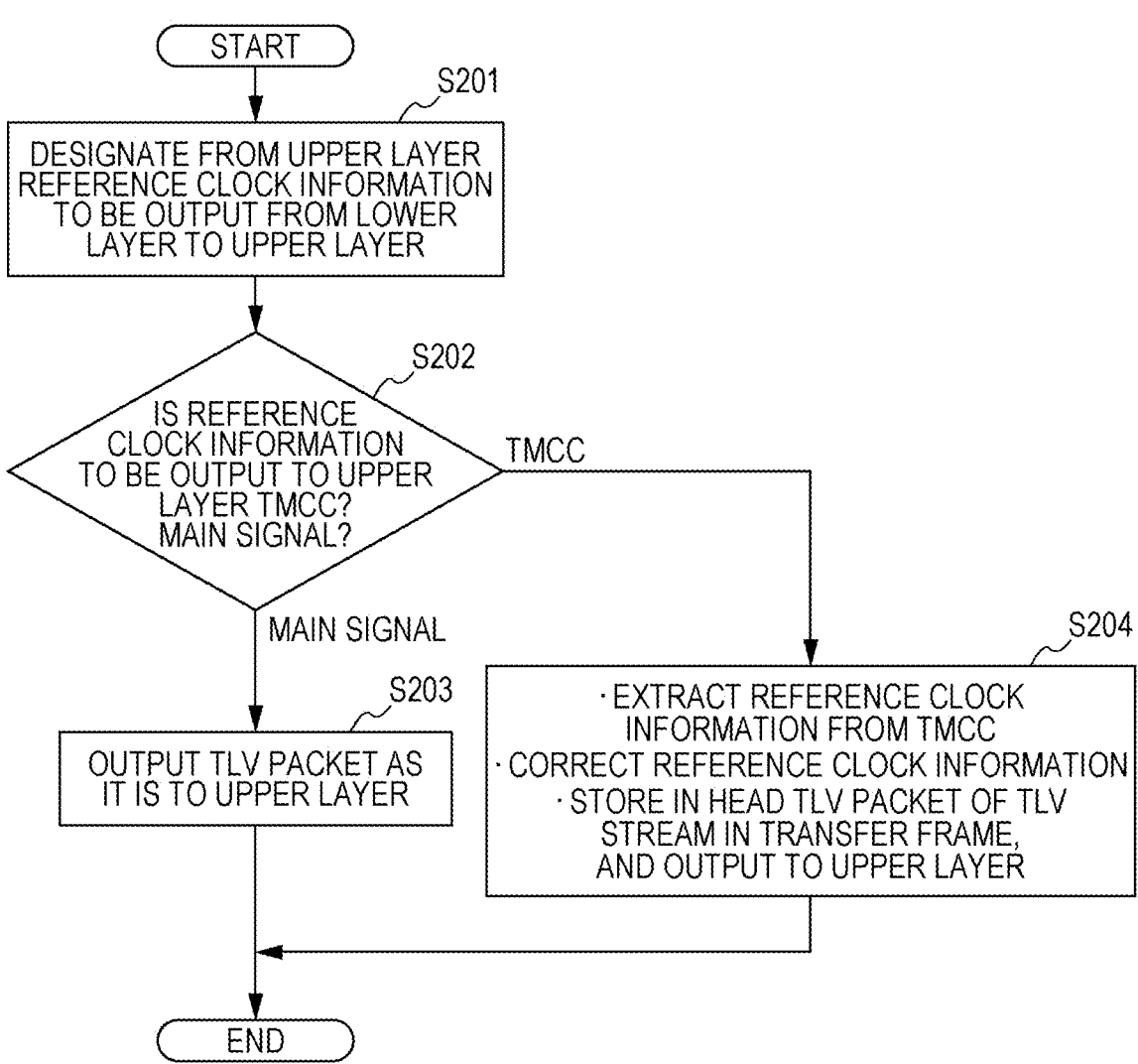
FIG. 40 is a flowchart illustrating an operation of the reception apparatus according to the fourth exemplary embodiment.

FIG. 40 is a flowchart illustrating an operation of reception apparatus 60 including decoder 11.

First, demultiplexing apparatus 62 (upper layer) designates the reference clock information to be output to demultiplexing apparatus 62 from decoding apparatus 61 (S201). When the reference clock information to be output to demultiplexing apparatus 62 is the reference clock information contained in the main signal (main signal in S202), decoding apparatus 61 outputs the TLV packet as it is to demultiplexing apparatus 62 (S203). Meanwhile, when the reference clock information to be output to demultiplexing apparatus 62 is the reference clock information stored in the TMCC control information (TMCC in S202), decoding apparatus 61 extracts the reference clock information from the TMCC control information, corrects the extracted reference clock information, stores the corrected reference clock information in the head TLV packet of the TLV stream in the transfer frame, and outputs the TLV packet to demultiplexing apparatus 62 (S204).

Figure 41:
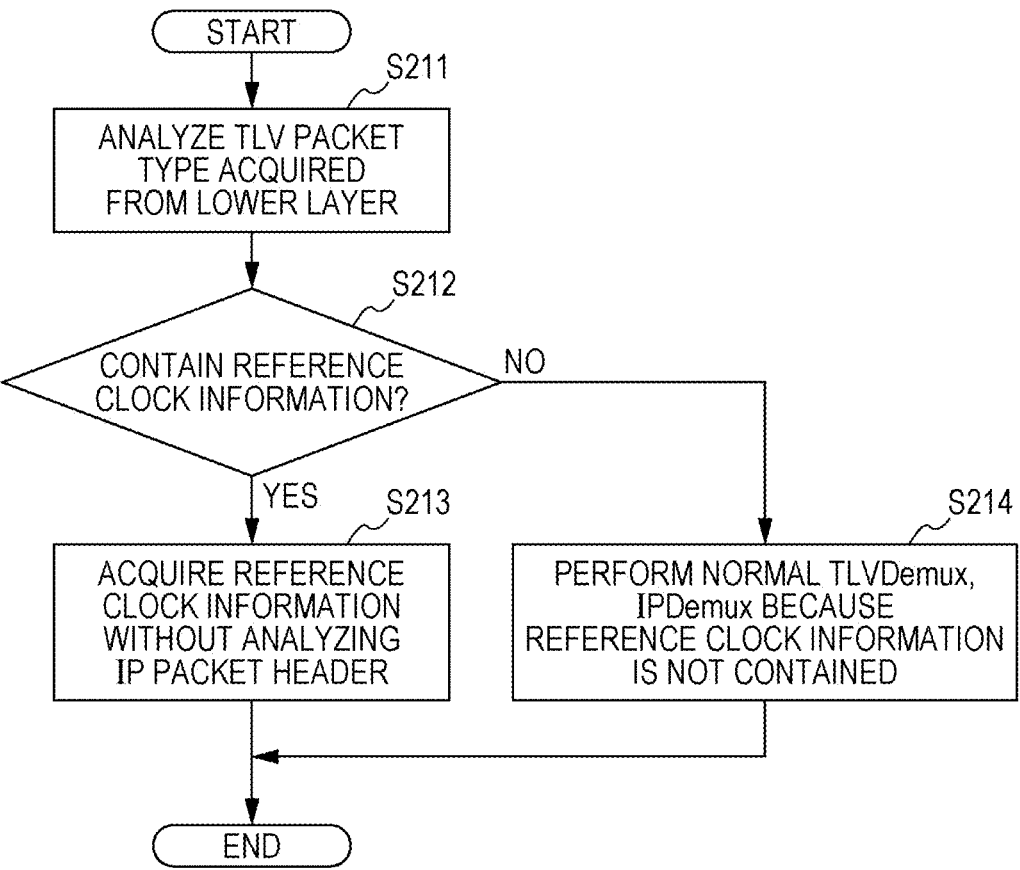
FIG. 41 is a flowchart illustrating an operation of an upper layer according to the fourth exemplary embodiment.

FIG. 41 is a flowchart illustrating an operation of demultiplexing apparatus 62 when decoding apparatus 61 performs signaling in the TLV packet type about whether the TLV packet contains the reference clock information.

First, demultiplexing apparatus 62 analyzes the packet type of TLV packet acquired from decoding apparatus 61 (S211) to determine whether the TLV packet contains the reference clock information (S212).

When the TLV packet contains the reference clock information (Yes in S212), demultiplexing apparatus 62 acquires the reference clock information without analyzing the IP packet header (S213). This enables reduction in processing time and reduction in the amount of processes.

Meanwhile, when the TLV packet does not contain the reference clock information (No in S212), demultiplexing apparatus 62 performs normal TLVDemux and IPDemux because the TLV packet does not contain the reference clock information (S214).

Note that when an IP data flow of broadcasting services has two types including an IP data flow that stores the MMT packet and an IP data flow that stores the reference clock information, reception apparatus 60 identifies the reference clock information in accordance with the TLV packet type, eliminating the need for analysis of the IP address. This is because, by identifying the reference clock information in accordance with the TLV packet type, there is one IP data flow that stores the reference clock information and one IP data flow that stores the MMT packet, eliminating the need for analysis of the IP address for identifying the IP data flow that stores the MMT packet.

As described above, decoding apparatus 61 and demultiplexing apparatus 62 according to the present exemplary embodiment perform the following processes.

Figure 42:
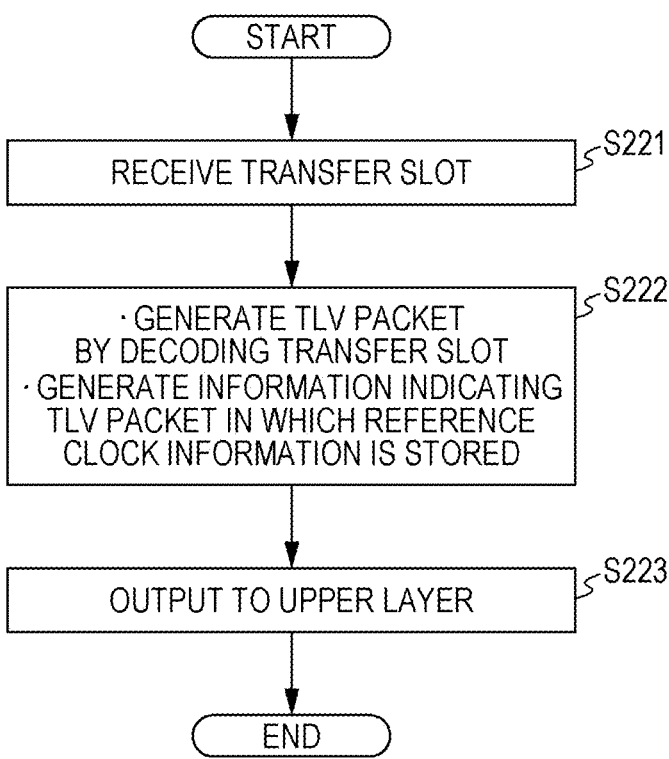
FIG. 42 is a flowchart illustrating an operation of a decoding apparatus according to the fourth exemplary embodiment.

FIG. 42 is a flowchart illustrating an operation of decoding apparatus 61 according to the present exemplary embodiment.

First, receiver 10 receives the transfer slot (S221). The transfer slot is a transfer frame that stores a plurality of slots (second transfer units) that each contain one or more TLV packets (first transfer units) obtained by multiplexing the content, as illustrated in FIG. 13. In addition, as described above, the TLV packet positioned at a head within the head slot within the transfer slot contains the reference clock information.

Next, decoder 11 acquires a plurality of TLV packets by decoding the transfer slot. In addition, decoder 11 further generates information for identifying the TLV packet positioned at a head within the head slot within the transfer slot (S222).

Specifically, decoder 11 stores information indicating that the TLV packet contains the reference clock information as management information (packet type) of the TLV packet stored in the TLV packet positioned at a head within the head slot within the transfer slot. Alternatively, the information for identifying the TLV packet positioned at a head within the head slot within the transfer slot is information that indicates the TLV packet positioned at a head within the head slot within the transfer slot among the plurality of TLV packets within the transfer slot.

That is, decoder 11 generates the information for identifying the TLV packet positioned at a head within the head slot within the transfer slot, and notifies the information to demultiplexing apparatus 62. Specifically, decoder 11 adds the information within the TLV packet, or notifies the information to demultiplexing apparatus 62 by another signal.

Next, decoder 11 outputs the TLV packet containing the information, or the TLV packet and the information to demultiplexing apparatus (S223).

Figure 43:
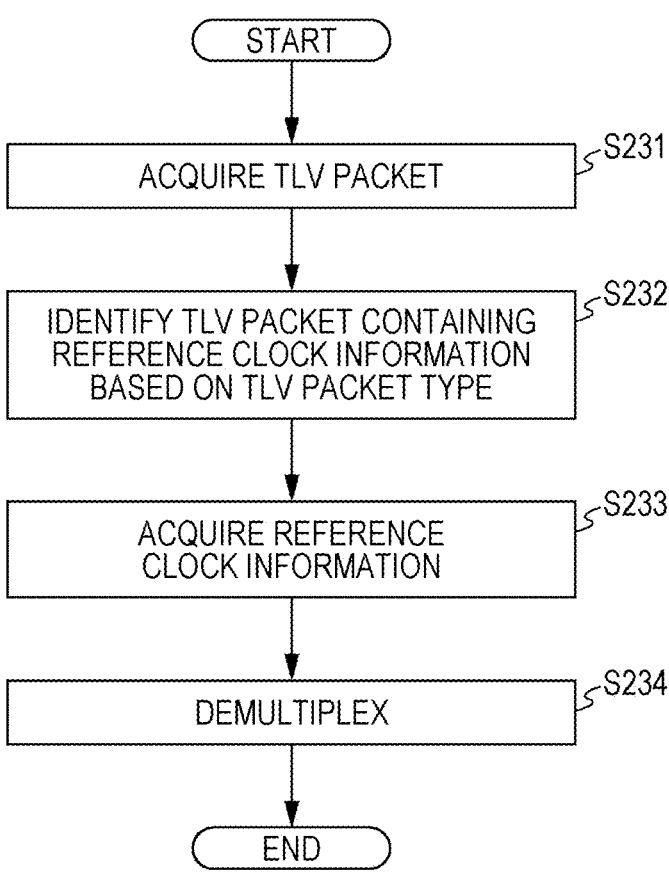
FIG. 43 is a flowchart illustrating an operation of a demultiplexing apparatus according to the fourth exemplary embodiment.

FIG. 43 is a flowchart illustrating an operation of demultiplexing apparatus 62 according to the present exemplary embodiment.

First, acquirer 63 acquires the transfer slot from decoding apparatus 61 (S231). Here, when each of the TLV packets contains the reference clock information, the TLV packet contains the management information (packet type) indicating that the TLV packet contains the reference clock information.

Demultiplexer 64 identifies the TLV packet containing the reference clock information based on the management information (S232), and acquires the reference clock information from the identified TLV packet (S233). In addition, demultiplexer 64 acquires the content by demultiplexing the plurality of TLV packets (S234).

As described above, in reception apparatus 60 according to the present exemplary embodiment, the information for identifying the TLV packet containing the reference clock information is notified from decoding apparatus 61 to demultiplexing apparatus 62. This allows demultiplexing apparatus 62 to acquire the reference clock information without analyzing the IP packet header and the like, achieving reduction in the amount of processes and high speed.

Fifth Exemplary Embodiment

The present exemplary embodiment describes a method for configuring a broadcast service (this may be described as a program, which has an equivalent meaning).

First, a method for configuring a conventional broadcast program will be described. In conventional broadcast, a multi-channel service can be performed that stores streams indicated by one or more TS-IDs in one physical channel, and stores a plurality of services in the stream indicated by one TS-ID. For example, in a band capable of transferring one program of HD image quality service, the conventional broadcast can transfer three programs of SD image quality simultaneously. Therefore, in the conventional broadcast, a so-called mixed broadcast service has been performed that switches a plurality of SD programs and one HD program by time sharing for broadcasting in one band.

Figure 44A:
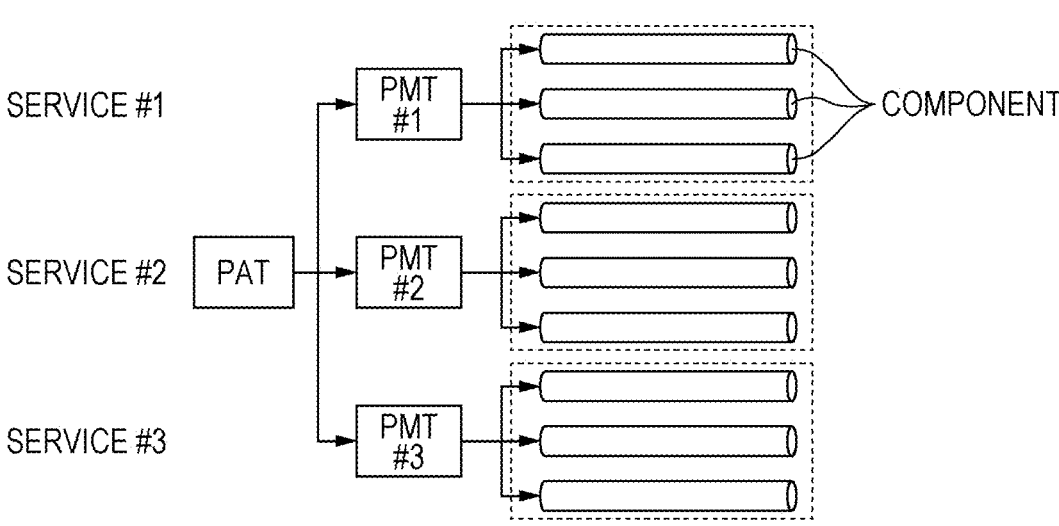
FIG. 44A is a diagram illustrating a configuration example of a service using an MPEG-2 TS scheme according to a fifth exemplary embodiment.
Figure 44B:
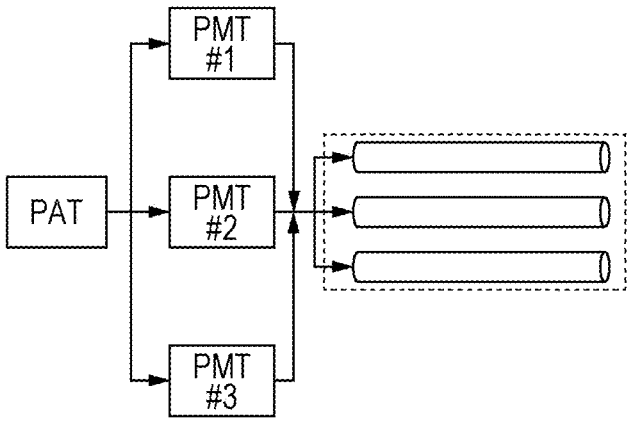
FIG. 44B is a diagram illustrating the configuration example of the service using the MPEG-2 TS scheme according to the fifth exemplary embodiment.

FIG. 44A and FIG. 44B are diagrams each illustrating a service configuration example and control information indicating the service configuration when a conventional MPEG-2 TS scheme is used.

In FIG. 44A, a plurality of services are stored in one stream, and each service is provided with a service ID. For example, the service ID of service #1 is 221, the service ID of service #2 is 222, and the service ID of service #3 is 223.

One service includes a plurality of components (such as video, audio, subtitles, data, and control information). Configuration information on the plurality of components is described in program information for each service. The program information in MPEG-2 TS is PMT (Program Map Table), which indicates PID that identifies a packet for each component. Also, the program information is indicated for each service, and a list of program information is indicated in control information that manages programs. The control information that manages programs in MPEG-2 TS is PAT (Program Association Table), which indicates a list of a plurality of service IDs of program information (PMT) and the PID that identifies packets. Also, the PID of the PAT is already known and is determined in advance.

The service ID corresponding to the selected service will be notified to a reception apparatus by a user performing a channel selection operation. The reception apparatus acquires the PAT by using the already known PID (step 1), and acquires the PID of the PMT corresponding to the designated service ID from the list of the PMT inside the PAT (step 2). The reception apparatus acquires the PMT by using the acquired PID, specifies the PID of the component that constitutes the service, and acquires the component using the specified PID (step 3). As described above, in MPEG-2 TS, three steps are always needed to component acquisition.

FIG. 44B is a diagram illustrating an example in which one service is stored in one stream. In this case, since there is one service, one PMT is needed. Also in this case, the PID of the component that constitutes the service can be specified by using the above-described method; however, when mixed broadcast is performed, even if there is one service, three PMTs and service IDs are needed assuming that there are virtually three services. In this case, three PMTs each indicates identical component. This provides an advantage that a number of services and a service list inside the PAT do not change even when mixed broadcast is performed by time sharing. Here, three PMTs illustrated in FIG. 44B describe identical content except for the service IDs.

Figure 45A:
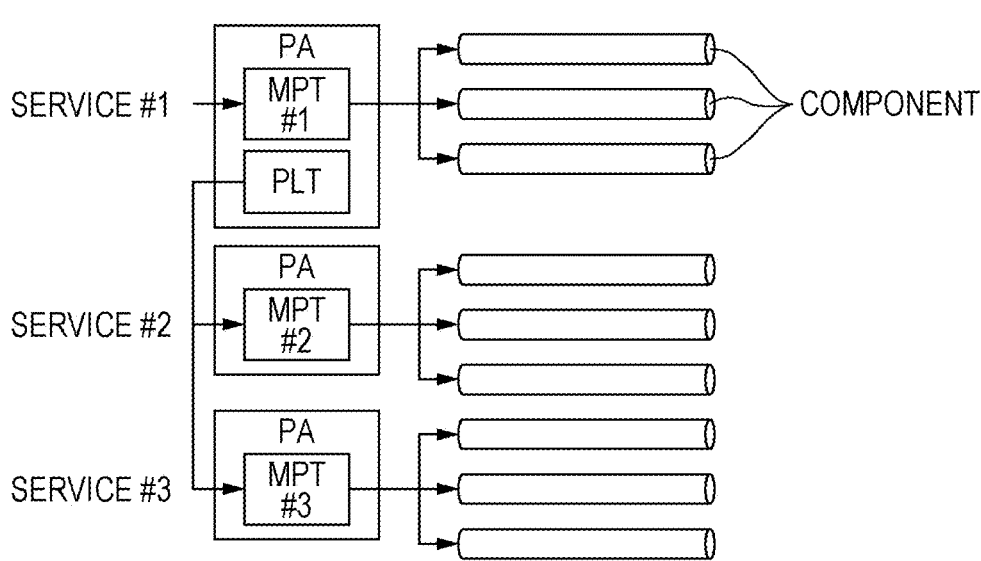
FIG. 45A is a diagram illustrating a configuration example of a service using an MMT/TLV scheme according to the fifth exemplary embodiment.
Figure 45B:
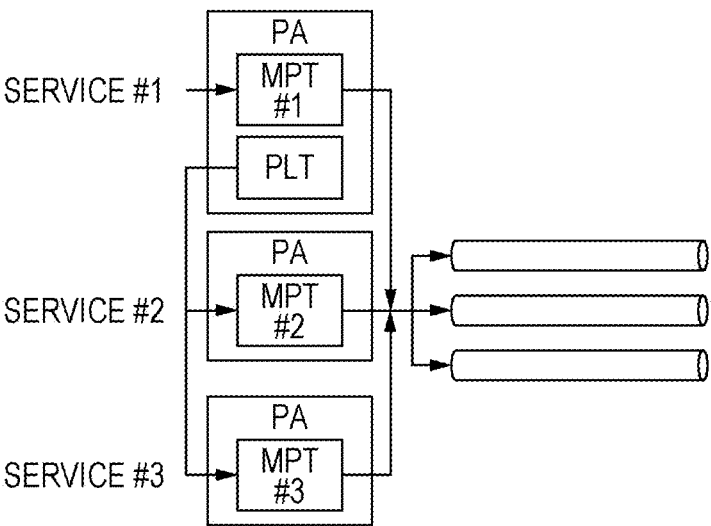
FIG. 45B is a diagram illustrating the configuration example of the service using the MMT/TLV scheme according to the fifth exemplary embodiment.

Next, the service configuration in an MMT/TLV scheme (ARIB STD B-60) will be described. FIG. 45A and FIG. 45B are diagrams each illustrating an example of this service configuration.

In a similar manner to MPEG-2 TS illustrated in FIG. 44A and FIG. 44B, the multi-channel service can be performed that stores streams indicated by one or more TLV-IDs in one physical channel and stores a plurality of services in the stream indicated by one TLV-ID. That is, mixed broadcast can be performed that switches a number of services by time sharing within a given band.

The switching in mixed broadcast may be not only switching between SD and HD but also switching of resolution, such as switching between 4 k broadcast and 8 k broadcast. Also, the switching in mixed broadcast may be not only switching of resolution but also switching of service with a different frame rate or transfer quality. That is, there may be mixed broadcast of combination of services that share a band.

In the MMT/TLV scheme, a packet ID is indicated in an MMT packet instead of the PID in MPEG-2 TS. A unit obtained by combining components is called an MMT package, and this corresponds to one service. MPT (MMT Package Table) has a function equivalent to a function of PMT, and indicates the packet ID of component that constitutes each service. Also, PLT (Package List Table) indicates a list for each package, and indicates the package IDs of the plurality of services and the packet ID of a PA message that transfers MPT indicating the configuration of the service corresponding to each service. Here, in order to indicate the PA message that transfers the MPT indicating the service configuration, the PLT may use not only the packet ID but also an IP address, UDP port number, URL, and the like.

Both the MPT and PLT are indicated in the PA message, and the packet ID identifying the packet that transfers the PA message is associated. The packet ID of the PA message including the PLT is already known and has been determined in advance. Note that a number of bits of the package ID is arbitrary and can also be variable. The MMT/TLV scheme prescribes that the service ID is stored in lower 16 bits.

When a user performs a channel selection operation, the service ID corresponding to the selected service will be notified to the reception apparatus. The reception apparatus receives the PA message including the PLT from the known packet ID (step 1), and determines whether lower 16 bits of the package ID indicated by the MPT included in the PA message matches the service ID. When lower 16 bits of the package ID matches the service ID, the reception apparatus specifies the packet ID of the component based on the MPT, and acquires the component of the specified packet ID (step 2). When lower 16 bits of the package ID does not match the service ID, the reception apparatus refers to the PLT and acquires the packet ID of the PA message that transfers the MPT that matches the service ID. Based on the MPT, the reception apparatus specifies the packet ID of the component and acquires the component of the specified packet ID (step 3).

Thus, according to the MMT/TLV scheme, when the service ID matches lower 16 bits of the package ID in the MPT included in the PA message common to PLT, the component can be acquired in two steps, enabling reduction in channel selection time compared with the MPEG-2 TS scheme.

Currently, operations of "mixed broadcast" using the MMT/TLV scheme (4 k broadcast×3 services, 8 k service×1 service) are assumed.

When 8 k service×1 service is performed in "mixed broadcast", in a similar manner to MPEG-2 TS, although one service is actually performed, it is necessary to virtually prepare three services and three MPTs. In this case, three MPTs indicate an identical component. At this time, three MPTs describe identical content except for the service IDs (package IDs). FIG. 45B is a diagram illustrating a configuration example of 8 k service×1.

In this case, whichever service ID a user may designate out of the three service IDs, the user will watch an identical service.

As described above, while three processing steps are always needed to component acquisition in the MPEG-2 TS scheme, in the MMT/TLV scheme, when service #1 is designated, the component can be acquired in two steps. However, when multi-channel is not used in "mixed broadcast" as described above, although service #1, service #2, and service #3 are an identical service, a number of steps to component acquisition differs depending on the designated service ID, which is not preferable.

Also, whichever service ID may be designated, the reception apparatus first acquires the PA message in which the PLT is stored. This PA message always includes MPT #1 of service #1. That is, when service #2 or service #3 is designated, although the reception apparatus has already obtained desired service information by acquisition of MPT #1, the reception apparatus needs to process the step of acquiring MPT #2 or MPT #3. This leads not only to increase in channel selection time but also to increase in the amount of processes of the reception apparatus.

The following describes a method by which the present exemplary embodiment solves the above-described problem.

The transmission apparatus stores inside the streams information indicating that, even when the plurality of services is present, these are virtual services and there is one substantial service. For example, the transmission apparatus stores in MPT #1 or PLT information indicating that data is not multi-channel in "mixed broadcast."

Alternatively, when a video component descriptor stored in the MPT indicates that video resolution is 8 k, the transmission apparatus may define that there is one substantial service.

The reception apparatus analyzes MPT #1 or PLT based on the above information to determine whether there is one substantial service. When there is one substantial service, the reception apparatus does not acquire MPT #2 or MPT #3, but acquires the component based on MPT #1. This allows the reception apparatus to always acquire the component in two steps regardless of the service ID to designate.

Figure 46A:
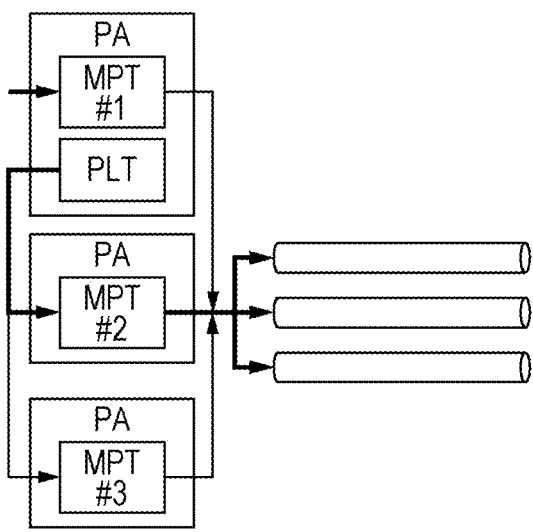
FIG. 46A is a diagram illustrating an operation example of the MMT/TLV scheme according to the fifth exemplary embodiment.
Figure 46B:
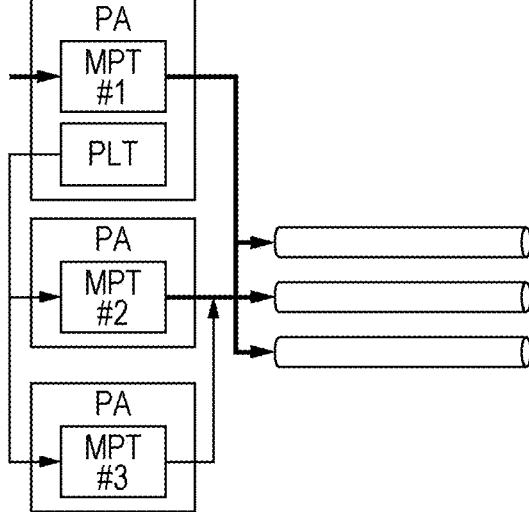
FIG. 46B is a diagram illustrating the operation example of the MMT/TLV scheme according to the fifth exemplary embodiment.

FIG. 46A is a diagram illustrating a conventional operation example when service #2 is designated. FIG. 46B is a diagram illustrating an operation example of the present exemplary embodiment when service #2 is designated. While three processing steps are needed in the conventional method illustrated in FIG. 46A, the processing is reduced to two steps in the method of the present exemplary embodiment illustrated in FIG. 46B.

Figure 47:
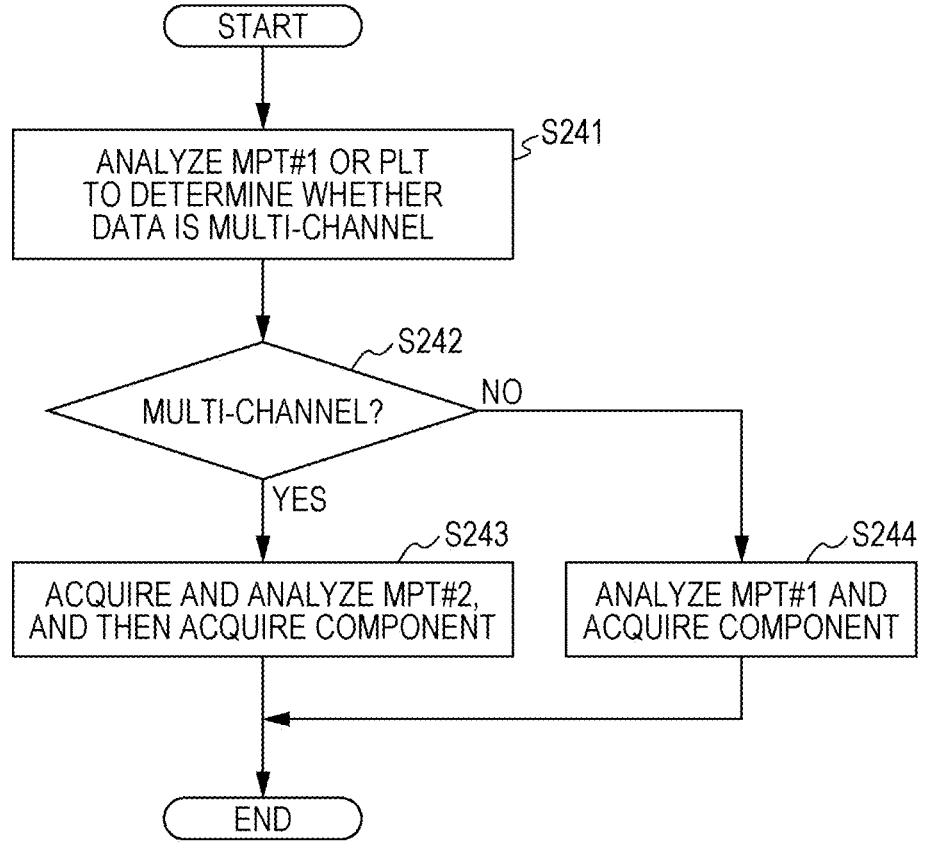
FIG. 47 is a flowchart illustrating an operation of a reception apparatus according to the fifth exemplary embodiment.

FIG. 47 is a diagram illustrating an operation flow of the reception apparatus according to the present exemplary embodiment.

First, the reception apparatus analyzes MPT #1 or PLT to determine whether data is multi-channel (S241). When the data is multi-channel (Yes in S242), the reception apparatus acquires MPT #2 or MPT #3, and analyzes MPT #2 or MPT #3 to acquire the component (S243). On the other hand, when the data is not multi-channel (No in S242), the reception apparatus analyzes MPT #1 to acquire the component (S244).

Figure 48:
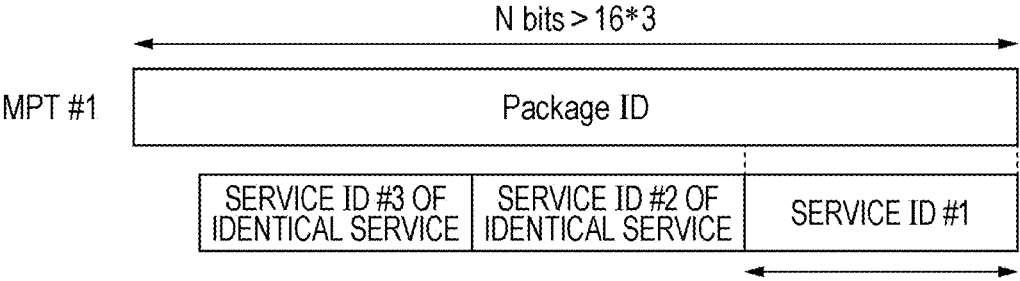
FIG. 48 is a diagram illustrating a configuration example of a package ID according to the fifth exemplary embodiment.

Note that the following method may be used as another example. A region other than lower 16 bits of the package ID in the MPT or PLT is used to store another service ID corresponding to the identical service. For example, when MPT #1 to #3 correspond to the identical service, as illustrated in FIG. 48, the service ID of MPT #2 and MPT #3 may be indicated using a region other than lower 16 bits of the package ID in MPT #1 or PLT. Similarly, another service ID corresponding to the identical service may be indicated in the package ID of MPT #2 and MPT #3.

The reception apparatus can acquire the component without acquiring MPT #2 or MPT #3 by confirming whether the desired service ID (service #1, service #2, or service #3) is included in the package ID of MPT #1.

Also, there is a method for determining the MMT packet ID uniquely inside the TLV stream and a method for determining the MMT packet ID uniquely inside the IP data flow, and the method for determination uniquely inside the TLV stream is assumed. That is, there is one PLT (PA message including the PLT) inside the TLV stream.

Also, in multi-channel, a method for storing the plurality of services (=package) inside one IP data flow is assumed.

However, a user actually watches one service, and the reception apparatus processes data of the service that is not watched, leading to increase in the amount of processes and power consumption, which is not preferable. As reception processes, TLV Demux, IP header extension (recovery of reduced header), IP Demux, MMT Demux, and other processes are needed. When the plurality of services are stored in one IP data flow, after the IP data flow including the desired service is extracted in IP Demux, it is difficult to eliminate the process of service that is not watched before the packet ID of the service that is not watched is identified with reference to the PLT and MPT in MMT Demux.

Therefore, in the process of a preceding stage, data of the service that is not watched will be processed.

Figure 49:
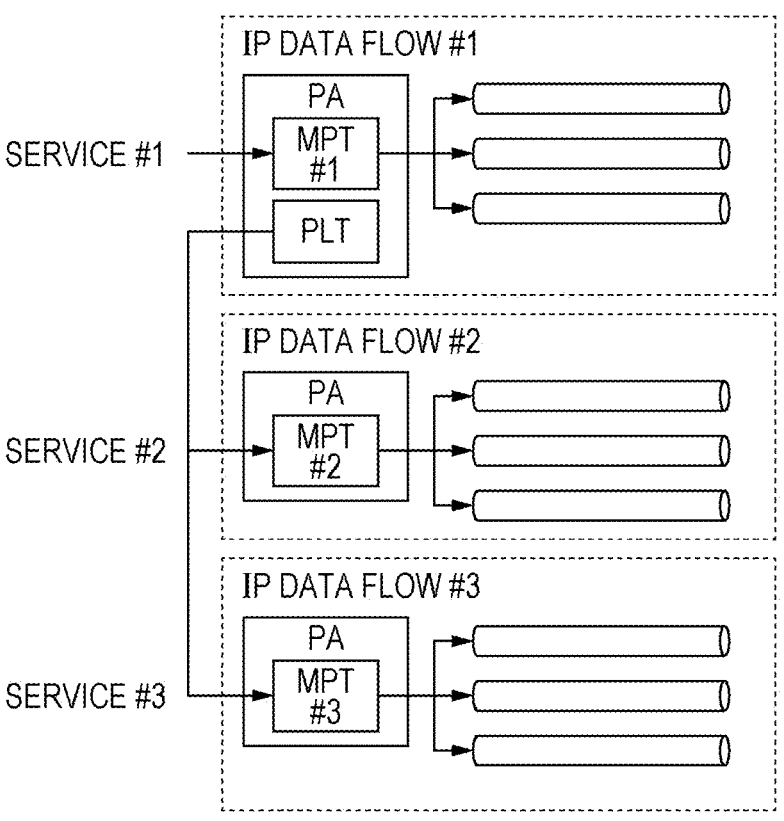
FIG. 49 is a diagram illustrating a configuration example of a service according to the fifth exemplary embodiment.

Therefore, it is preferable that IP data flow=service, as illustrated in FIG. 49. However, although the PLT is control information that stores information extending over the plurality of services, one PLT is not present extending over all the IP data flows, and thus it is difficult to indicate the list of the plurality of services using one PLT. Specifically, for example, when IP data flow #1 is extracted in IP Demux, another IP data flow (service) can be selected because the PLT is present in IP data flow #1. However, when IP data flow #2 is extracted in IP Demux, it is difficult to select another IP data flow (service) because the PLT is not present in IP data flow #2. Also, the packet ID is unique inside the IP data flows, and if the packet ID extends over the IP data flows, it is not guaranteed that the packet ID is unique. Therefore, it is difficult to specify data over the IP data flows with the packet ID.

As a method for solving this problem, any one of the following methods can be used.

A first method is a method for copying the PLT to all the IP data flows and storing the PLT in each IP data flow (service). In this case, the packet ID of the PLT to be stored in each IP data flow is assumed to be identical. Accordingly, even after the reception apparatus extracts the desired IP data flow in IP Demux, the PLT is always present inside the extracted IP data flow. Therefore, the reception apparatus can perform channel selection based on the PLT. Alternatively, when the PLT is not present in the IP data flow, the reception apparatus may perform processing without using the PLT, assuming that there is one service.

Figure 50:
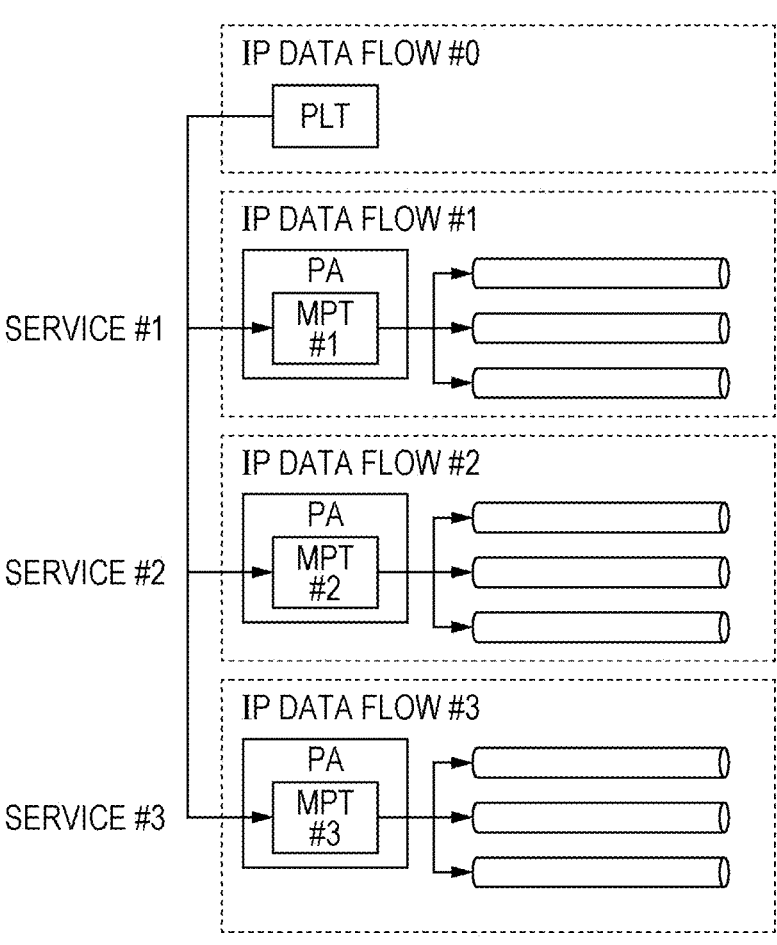
FIG. 50 is a diagram illustrating the configuration example of the service according to the fifth exemplary embodiment.

A second method is a method for storing the PLT in a dedicated IP data flow (IP data flow #0), as illustrated in FIG. 50. That is, the PLT is stored in the IP data flow different from the IP data flow of the MPT and the component. This enables the PLT to exist extending over the IP data flows. For example, by designating the IP data flow (service) and packet ID in the PLT, it is possible to designate the MPT of the desired service.

The above process enables the reception apparatus to extract and process the desired service in IP Demux, and to reduce the amount of processes and power consumption.

Note that the reception apparatus may utilize the IP address of the uncompressed IP packet, a context identifier of the compressed IP packet, and the like to reduce the amount of processes and power consumption by avoiding header extension for services other than the desired service.

Also, when the MMT packet ID is unique inside the IP data flow, there is one PLT in the IP data flow, and there may be a plurality of PLTs for each IP data flow. In this case, one service may be stored in one IP data flow. Also, the PLT may not be used.

Figure 51:
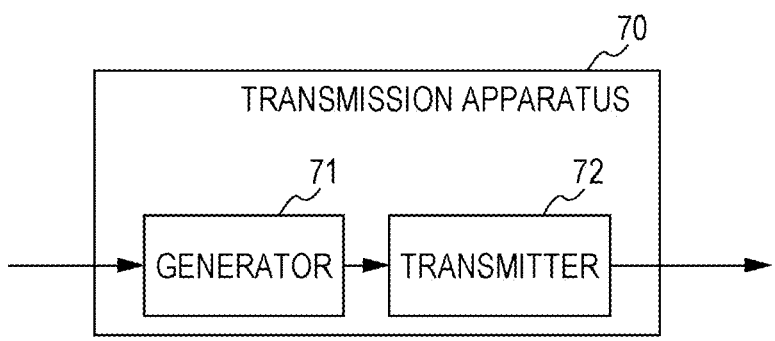
FIG. 51 is a block diagram of a transmission apparatus according to the fifth exemplary embodiment.

As described above, the transmission apparatus according to the present exemplary embodiment stores one or more streams in one channel and stores one or more services in one of the streams for transmission in broadcast. FIG. 51 is a block diagram of transmission apparatus 70 according to the present exemplary embodiment. Transmission apparatus 70 includes generator 71 and transmitter 72.

Figure 52:
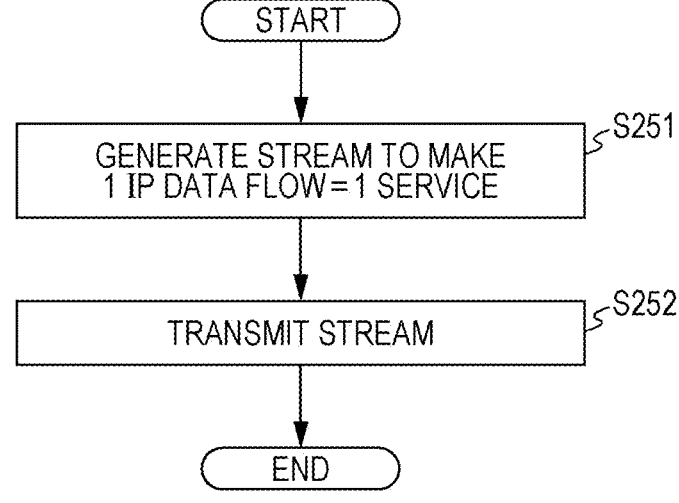
FIG. 52 is a flowchart illustrating an operation of the transmission apparatus according to the fifth exemplary embodiment.

FIG. 52 is a flowchart of the transmission method performed by transmission apparatus 70 according to the present exemplary embodiment. First, as illustrated in FIG. 50, generator 71 generates the stream including the plurality of IP (Internet Protocol) data flows #1 to #3 corresponding one-to-one with the plurality of services #1 to #3, the plurality of IP data flows #1 to #3 storing the corresponding services (S251). Specifically, as illustrated in FIG. 50, generator 71 generates the stream that further includes IP data flow #0 different from the plurality of IP data flows #1 to #3, IP data flow #0 storing the PLT which is program control information indicating correspondence between each of the plurality of services #1 to #3 and specification information that specifies the plurality of IP data flows #1 to #3 (IP address or packet ID).

Next, transmitter 72 transmits the stream generated by generator 71 to the reception apparatus (S252).

Figure 53:
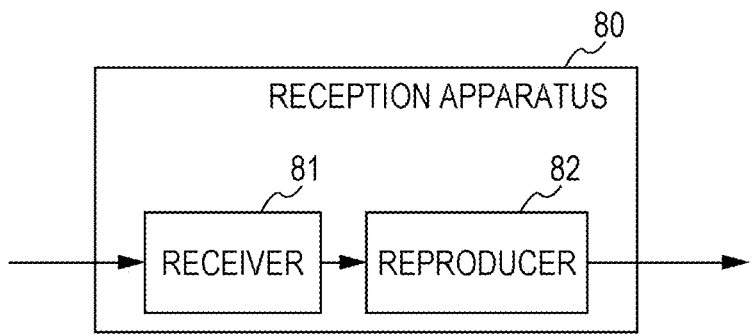
FIG. 53 is a block diagram of the reception apparatus according to the fifth exemplary embodiment.

Also, reception apparatus 80 according to the present exemplary embodiment receives one or more streams stored in one channel, one of the streams storing one or more services in broadcast. FIG. 53 is a block diagram of reception apparatus 80 according to the present exemplary embodiment. Reception apparatus 80 includes receiver 81 and reproducer 82. Note that receiver 81 corresponds to receiver 10 in each of the above-described exemplary embodiments, whereas reproducer 82 corresponds to processors other than receiver 10.

Figure 54:
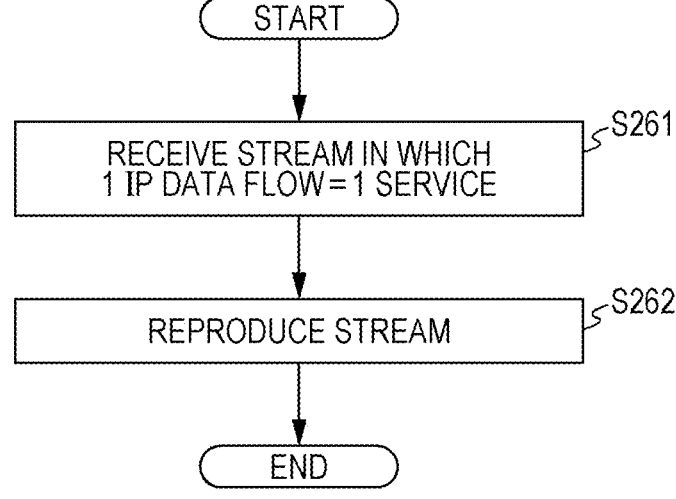
FIG. 54 is a flowchart illustrating an operation of the reception apparatus according to the fifth exemplary embodiment.

FIG. 54 is a flowchart of the reception method performed by reception apparatus 80 according to the present exemplary embodiment. First, receiver 81 receives the stream including the plurality of IP data flows #1 to #3 corresponding one-to-one with the plurality of services #1 to #3, the IP data flows storing the corresponding services (S261). Specifically, as illustrated in FIG. 50, receiver 81 receives the stream that further includes IP data flow #0 different from the plurality of IP data flows #1 to #3, IP data flow #0 storing PLT which is program control information that indicates correspondence between each of the plurality of services #1 to #3 and specification information that specifies the plurality of IP data flows #1 to #3 (IP address or packet ID).

Next, reproducer 82 reproduces one of the plurality of services from the stream (S262). Specifically, reproducer 82 specifies the IP data flow corresponding to the service to be reproduced based on the PLT, and reproduces the service stored in the specified IP data flow.

As described above, reception apparatus 80 does not need to process data of the service that is not watched, allowing reduction in the amount of processes.

Summary of Exemplary Embodiments

A transmission method according to a first aspect of the present disclosure includes: generating a stream including a plurality of IP (Internet Protocol) data flows corresponding one-to-one with a plurality of services in broadcast, the IP data flows respectively storing the corresponding services of the plurality of services; and transmitting the generated stream in a predetermined channel. The transmission method according to a second aspect of the present disclosure is the transmission method according to the first aspect in which the generated stream includes an IP data flow different from the plurality of IP data flows, the IP data flow storing program control information that indicates correspondence between each of the plurality of services and specification information that specifies the plurality of IP data flows that stores the plurality of services. The transmission method according to a third aspect of the present disclosure is the transmission method according to the first aspect in which each of the plurality of services is stored in an MMT (MPEG Media Transport) packet in the corresponding IP data flow. The transmission method according to a fourth aspect of the present disclosure is the transmission method according to the first aspect in which each of the IP data flows is stored in a TLV (Type Length Value) packet. A reception method according to a fifth aspect of the present disclosure includes: receiving a stream including a plurality of IP (Internet Protocol) data flows corresponding one-to-one with a plurality of services in broadcast in a predetermined channel, the IP data flows respectively storing the corresponding services of the plurality of services; and reproducing one of the plurality of services from the received stream. The reception method according to a sixth aspect of the present disclosure is the reception method according to the fifth aspect in which the received stream includes an IP data flow different from the plurality of IP data flows, the IP data flow storing program control information that indicates correspondence between each of the plurality of services and specification information that specifies the plurality of IP data flows that stores the corresponding services of the plurality of services, and the reception method further including: specifying the IP data flow corresponding to the service to be reproduced from the plurality of IP data flows based on the program control information; and reproducing the service stored in the specified IP data flow. The reception method according to a seventh aspect of the present disclosure is the reception method according to the fifth aspect in which each of the corresponding services is stored in an MMT (MPEG Media Transport) packet in the corresponding IP data flow. The reception method according to an eighth aspect of the present disclosure is the reception method according to the fifth aspect in which each of the IP data flows is stored in a TLV (Type Length Value) packet. The transmission apparatus according to a ninth aspect of the present disclosure includes: a generator that generates a stream including a plurality of IP (Internet Protocol) data flows corresponding one-to-one with a plurality of services in broadcast, the IP data flows respectively storing the corresponding services of the plurality of services; and a transmitter that transmits the generated stream in a predetermined channel. The reception apparatus according to a tenth aspect of the present disclosure includes: a receiver that receives a stream including a plurality of IP (Internet Protocol) data flows corresponding one-to-one with a plurality of services in broadcast in a predetermined channel, the IP data flows respectively storing the corresponding services of the plurality of services; and a reproducer that reproduces one of the plurality of services from the received stream.

Note that in the aforementioned exemplary embodiments, components may each include dedicated hardware or may be implemented through execution of a software program suitable for each component. The components may be each implemented by a program execution unit, such as a CPU and a processor, reading and executing the software program recorded in a recording medium such as a hard disk and a semiconductor memory.

In addition, the components may be circuits. These circuits may constitute one circuit as a whole, and may be different circuits. In addition, each of these circuits may be a general-purpose circuit, and may be a dedicated circuit.

For example, in each of the aforementioned exemplary embodiments, processes executed by a specific processor may be executed by another processor. In addition, order of the plurality of processes may be changed, and the plurality of processes may be executed in parallel.

The reception apparatus (reception method) and transmission apparatus (transmission method) according to one or more aspects have been described above based on the exemplary embodiments. However, the present disclosure is not limited to these exemplary embodiments. The present exemplary embodiments to which various modifications conceivable by a person skilled in the art are made, and aspects that are made by combining elements of different exemplary embodiments may also be within the scope of the one or more aspects as long as such aspects do not depart from the gist of the present disclosure.

The transmission method according to the present disclosure is useful as a transmission method capable of reducing the processes in the reception apparatus when the MMT scheme is applied to broadcasting systems.

What is claimed is:

1. A transmission method comprising:

generating a first stream including control information;

generating a second stream which is a stream different from the first stream, the second stream including one service among a plurality of services of MPEG Media Transport (MMT) scheme, and including a MPEG Media Transport Package Table (MPT) corresponding to the one service among the plurality of services; and transmitting the first stream and the second stream, wherein the control information includes ID information identifying the one service among the plurality of services, and information designating the MPT corresponding to the one service among the plurality of services.

\* \* \* \* \*